US012208624B2

(12) United States Patent
Hayashi et al.

(10) Patent No.: US 12,208,624 B2
(45) Date of Patent: Jan. 28, 2025

(54) TANK AND LIQUID CONSUMING APPARATUS INCLUDING THE SAME

(71) Applicant: BROTHER KOGYO KABUSHIKI KAISHA, Nagoya (JP)

(72) Inventors: Masahiro Hayashi, Nagoya (JP); Taichi Shirono, Nagoya (JP); Masako Kawagoe, Nagoya (JP); Yoshinori Osakabe, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/548,967

(22) Filed: Dec. 13, 2021

(65) Prior Publication Data

US 2022/0274414 A1 Sep. 1, 2022

Related U.S. Application Data

(63) Continuation of application No. 16/878,699, filed on May 20, 2020, now Pat. No. 11,198,300, which is a (Continued)

(30) Foreign Application Priority Data

Mar. 31, 2016 (JP) ................................ 2016-073430
Jun. 30, 2016 (JP) ................................ 2016-130799

(51) Int. Cl.
*B41J 2/17* (2006.01)
*B41J 2/175* (2006.01)
(Continued)

(52) U.S. Cl.
CPC ....... *B41J 2/17523* (2013.01); *B41J 2/17509* (2013.01); *B41J 2/17513* (2013.01);
(Continued)

(58) Field of Classification Search
None
See application file for complete search history.

(56) References Cited

U.S. PATENT DOCUMENTS 6,390,611 B1 5/2002 Kobayashi et al.
7,090,341 B1 8/2006 Miyazawa
(Continued)

FOREIGN PATENT DOCUMENTS

CN 1569466 A 1/2005
CN 101500811 A 8/2009
(Continued)

OTHER PUBLICATIONS

Notification of Second Office Action issued in corresponding Chinese Patent Application No. 202010573436.5, dated Jan. 13, 2022.
(Continued)

*Primary Examiner* — Erica S Lin
(74) *Attorney, Agent, or Firm* — Merchant & Gould P.C.

(57) ABSTRACT

There is provided a tank including: a casing; a liquid chamber including first and second chambers; a communicating channel configured by first, second, and third communicating channels; a liquid inlet port; a first communicating port; a second communicating port; an atmosphere open port; a liquid outflow port; and a gas-liquid separating membrane provided in the third communicating channel and blocking flowing (distribution, circulation) of liquid in the third communicating channel. A first end of the second communicating channel is communicated with the second chamber, and a second end of the second communicating channel is communicated with an end of the first communicating channel. A first end of the third communicating channel is communicated with the second end of the second
(Continued)

communicating channel, and a second end of the third communicating channel is communicated with the atmosphere open port.

14 Claims, 20 Drawing Sheets

Related U.S. Application Data continuation of application No. 16/170,163, filed on Oct. 25, 2018, now Pat. No. 10,661,572, which is a continuation of application No. 15/473,893, filed on Mar. 30, 2017, now Pat. No. 10,112,402.

(51) Int. Cl.
*B41J 29/02* (2006.01)
*B41J 29/13* (2006.01)

(52) U.S. Cl.
CPC ....... *B41J 2/17553* (2013.01); *B41J 2/17566* (2013.01); *B41J 29/02* (2013.01); *B41J 29/13* (2013.01); *B41J 2002/17573* (2013.01)

(56) References Cited

U.S. PATENT DOCUMENTS

| | | | | |
|---|---|---|---|---|
| 2002/0109760 | A1 | 8/2002 | Miyazawa | |
| 2006/0232649 | A1* | 10/2006 | Wu | B41J 2/17513 347/86 |
| 2008/0088652 | A1 | 4/2008 | Miyajima et al. | |
| 2008/0303883 | A1 | 12/2008 | Miyazawa | |
| 2009/0102903 | A1 | 4/2009 | Nishihara | |
| 2011/0069126 | A1 | 3/2011 | Feng | |
| 2012/0056938 | A1 | 3/2012 | Ishizawa et al. | |
| 2012/0182364 | A1 | 7/2012 | Takeda et al. | |
| 2014/0043408 | A1 | 2/2014 | Kudo et al. | |
| 2014/0292957 | A1* | 10/2014 | Okazaki | B41J 2/17526 347/86 |
| 2015/0109378 | A1 | 4/2015 | Koike et al. | |
| 2015/0283832 | A1 | 10/2015 | Osakabe et al. | |
| 2016/0121615 | A1 | 5/2016 | Igarashi | |

FOREIGN PATENT DOCUMENTS

| | | | | |
|---|---|---|---|---|
| CN | 104972744 | A | 10/2015 | |
| JP | 2003-266725 | A | 9/2003 | |
| JP | 2003-312016 | A | 11/2003 | |
| JP | 2005-161854 | A | 6/2005 | |
| JP | 2008-44186 | A | 2/2008 | |
| JP | 2010-221477 | A | 10/2010 | |
| JP | 2012-051306 | A | 3/2012 | |
| JP | 2012-144016 | A | 8/2012 | |
| JP | 2014-58083 | A | 4/2014 | |
| JP | 2015-80905 | A | 4/2015 | |
| JP | 2016-87849 | A | 5/2016 | |
| WO | WO-2015047370 | A1 * | 4/2015 | B41J 2/175 |

OTHER PUBLICATIONS

Decision of Rejection issued in corresponding Chinese Patent Application No. 202010573436.5, dated Jun. 13, 2022.

Notification of First Office Action with Search Report issued in related Chinese Patent Application No. 201710188032.2, dated Aug. 27, 2019.

Office Action (Notice of Reasons for Refusal) issued in corresponding Japanese Patent Application No. 2016-073430, dated Feb. 4, 2020.

Notice of Reasons for Refusal issued in corresponding Japanese Patent Application No. 2016-130799, dated Jun. 2, 2020.

Office Action issued in corresponding Chinese Patent Application No. 202010573436.5, dated May 18, 2021.

Office Action issued in parent U.S. Appl. No. 16/878,699 dated Feb. 16, 2021.

Notice of Allowance issued in parent U.S. Appl. No. 16/878,699 dated Jul. 28, 2021.

Office Action (Notice of Reasons for Refusal) issued in corresponding Japanese Patent Application No. 2021-000762, dated Sep. 6, 2022.

* cited by examiner 1000 (1140)
1101
1142
1121
1143
1122
1143
1110
FRONT
8
REAR
RIGHT
9
LEFT 1000 (1140)
1101
1142
1122
1143
1121
1110
FRONT
8
REAR
RIGHT
9
LEFT 1000 (1140)
1101
1122
1142
1121
1121
1143
1122
1110
FRONT
8
REAR
RIGHT
9
LEFT

TANK AND LIQUID CONSUMING APPARATUS INCLUDING THE SAME

CROSS REFERENCE TO RELATED APPLICATION

This application is a continuation of U.S. patent application Ser. No. 16/878,699, now U.S. Pat. No. 11,198,300, filed May 20, 2020, which is a continuation of U.S. patent application Ser. No. 16/170,163, filed Oct. 25, 2018, now U.S. Pat. No. 10,661,572, which is a continuation of U.S. patent application Ser. No. 15/473,893, filed Mar. 30, 2017, now U.S. Pat. No 10,112,402, which claims priority from Japanese Patent Applications No. 2016-073430 filed on Mar. 31, 2016 and No. 2016-130799 filed on Jun. 30, 2016, the disclosures of all of which are incorporated herein by reference in their entireties.

BACKGROUND

Field of the Invention

The present invention relates to a tank which is configured such that a liquid can be supplemented to the tank via a liquid inlet port, and a liquid consuming apparatus including the tank.

Description of the Related Art

There is known a printer provided with a tank which is configured to store an ink therein and which is configured such that the ink can be supplemented thereto, and a recording head which is configured to jet the ink supplied from the tank so as to record an image on a paper (paper sheet, or sheet) with the jetted ink. In a case that the ink inside the tank is consumed, a user can supplement the ink stored in a bottle to the tank via the liquid inlet port of the tank.

The tank is provided with an atmosphere open port configured to maintain the pressure inside the tank at the atmospheric pressure. Further, a semipermeable membrane is provided in an atmosphere channel from the inside of the tank and up to the atmosphere open port, in some cases. The semipermeable membrane generally means a membrane (film) which allows a part of components of a solution, a gas mixture, etc., to pass (permeate) therethrough but does not allow another part of the components to pass therethrough. However, a semipermeable membrane used in the atmosphere channel means a gas-liquid separating membrane which allows a gas to pass therethrough but does not allow a liquid to pass therethrough. Thus, even when the ink stored in the tank enters the atmosphere channel, flowing (distribution, circulation) of the ink is stopped by the gas-liquid separating membrane. This prevents the ink from leaking from the atmosphere open port to the outside of the tank.

SUMMARY

However, in a case that the gas-liquid separating membrane is wetted by the ink, there is such a fear that the gas-liquid separating membrane is clogged or blocked by the ink. In a case that the gas-liquid separating membrane is blocked by the ink, there is such a fear that the ink might not allow the gas to pass therethrough. As a result, there is such a fear that the pressure inside the tank might not be maintained at the atmospheric pressure.

The present teaching has been made in view of the above-described situations, and an object of the present teaching is to provide a tank capable of lowering any adhesion of a liquid to a gas-liquid separating membrane.

According to a first aspect of the present teaching, there is provided a tank for storing liquid to be supplied to a liquid consuming device, including:

a casing;

a liquid chamber including a first chamber and a second chamber which are configured to store the liquid;

a communicating channel including a first communicating channel, a second communicating channel, and a third communicating channel;

a liquid inlet port via which the liquid is poured into the first and second chambers;

a first communicating port communicating the first chamber and a first end of the first communicating channel;

a second communicating port communicating the first and second chambers;

an atmosphere open port communicating the third communicating channel and an outside of the tank;

a liquid outflow port via which the liquid stored in the first and second chambers is allowed to flow out of the first and second chambers and toward the liquid consuming device; and a gas-liquid separating membrane located in the third communicating channel and blocking flowing of the liquid in the third communicating channel, wherein a first end of the second communicating channel is communicated with the second chamber, and a second end of the second communicating channel is communicated with a second end of the first communicating channel, and a first end of the third communicating channel is communicated with the second end of the second communicating channel, and a second end of the third communicating channel is communicated with the atmosphere open port.

In the above configuration, in order to allow the liquid in the first chamber to enter the third communicating channel and make contact with the gas-liquid separating membrane, the liquid is required to flow through the first communicating channel. Further, in order to allow the liquid in the second chamber to enter the third communicating channel and make contact with the gas-liquid separating membrane, the liquid is required to flow through the second communicating channel.

In the above configuration, a communication portion between the first and second communicating channels and the third communicating channel makes the first and second communicating channels communicate with each other. Thus, at least a part of the liquid flowing from the first communicating channel to the communication portion enters the second communicating channel rather than the third communicating channel. Further, at least a part of the liquid flowing from the second communicating channel to the communication portion enters the first communicating channel rather than the third communicating channel.

Thus, in the above configuration, the liquid stored in the first chamber and second chamber is prevented from making contact with the gas-liquid separating membrane.

According to the present teaching, a tank is stationarily provided on an apparatus having a liquid consuming section configured to consume a liquid. The tank includes a casing provided with a liquid chamber defined by a first surface and a second surface which face each other and are parallel to each other in a width direction, and a communicating channel being communicated with the liquid chamber. The casing includes: a liquid inlet port via which the liquid is poured into the liquid chamber; a liquid outflow port via which the liquid stored in the liquid chamber is allowed to flow out of the liquid chamber and toward the liquid consuming section; an atmosphere open port communicating the communicating channel and an outside of the tank; a first film configuring at least a part of the first surface; and a second film configuring at least a part of the second surface. The communicating channel includes a first part and a second part, the first part being defined by one of the first film and the second film and being communicated with the liquid chamber, the second part being defined by the other of the first film and the second film and being communicated with the atmosphere open port. At least a part of the first part overlaps with at least a part of the second part as viewed in the width direction.

In the above configuration, the tank is partitioned into spaces (the liquid chamber and communicating channel).

In the above configuration, the films (first film and second film) are provided on the first surface and the second surface of the liquid chamber, respectively. The first part of the communicating channel overlaps with the second part of the communicating channel as viewed in the width direction. Thus, the first part may be defined by the first film and the second part may be defined by the second film. Further, the second part may be defined by the first film and the first part may be defined by the second film. Furthermore, a part of the first part may be defined by the first film, a part, of the second part, corresponding to the part of the first part may be defined by the second film, a remaining part, of the first part, except for the part of the first part may be defined by the second film, and a part, of the second part, corresponding to the remaining part of the first part may be defined by the first film. The above configuration allows a space occupied by the tank to be small.

The tank of the present teaching may reduce adhesion of the liquid to the gas-liquid separating membrane. Further, the tank of the present teaching may make a space occupied by the tank small even when the interior thereof is partitioned into spaces.

BRIEF DESCRIPTION OF THE DRAWINGS

FIGS. 1A and 1B are perspective views each depicting the outer appearance of a multi-function peripheral 10, wherein FIG. 1A is a perspective view depicting a state in which a cover 70 is at a closed position, and FIG. 1B is a perspective view depicting a state in which the cover 70 is at an opened position.

FIGS. 20A to 20C are plan views each schematically depicting the ink tank 1000, wherein FIG. 20A depicts a configuration in which a first part 121 is defined by a film 1142 and a second part 122 is defined by a film 1143, FIG. 20B depicts a configuration in which the first part 121 is defined by the film 1143 and the second part 112 is defined by the film 1142, and FIG. 20C is a configuration in which a part of the first part 121 and a part of the second part 122 are defined by the film 1142 and a remaining part of the first part 121 and a remaining part of the second part 122 are defined by the film 1143.

DESCRIPTION OF THE EMBODIMENTS

Figure 1A:
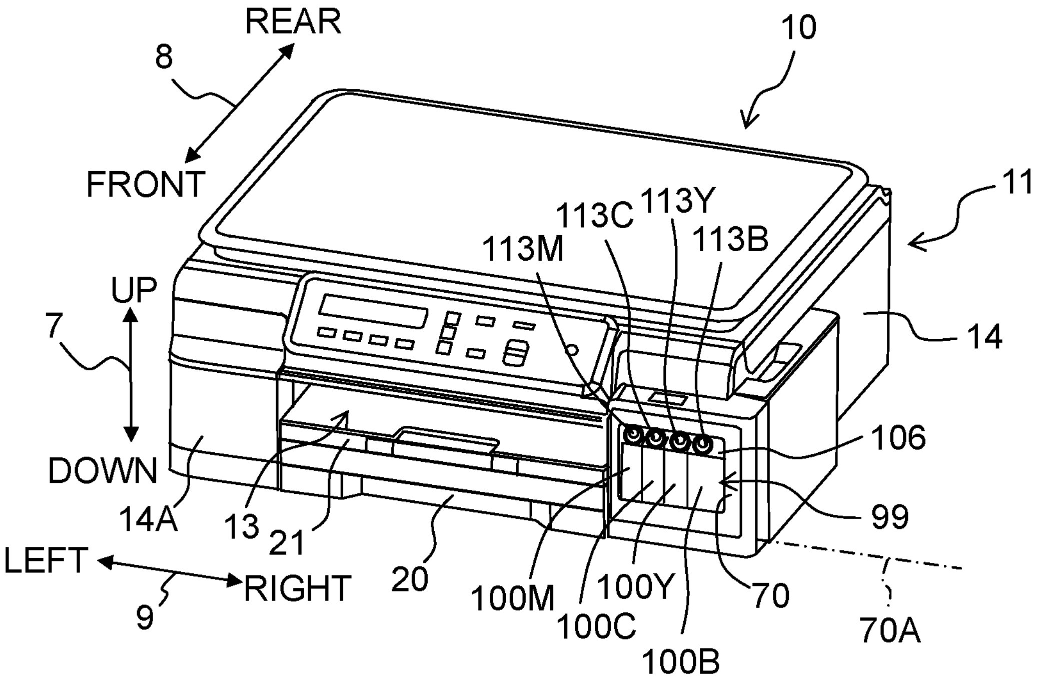

In the following, two embodiments (a first embodiment and a second embodiment) of the present teaching will be described, with reference to the drawings. Note that, however, each of the two embodiments described below is merely an example of the present teaching; it goes without saying that it is possible, for example, to make any appropriate change(s) in, or combine, the two embodiments of the present teaching without departing from the gist and/or scope of the present teaching. Further, in the following explanation, advancement (movement) from a starting point to an end point of an arrow is expressed as an "orientation" and coming and going on a line connecting the starting point and the end point of the arrow is expressed as a "direction". In other words, the orientation is a component of the direction. Furthermore, a posture in which the multi-function peripheral 10 and an ink tank 100 stationarily provided (arranged) on the multi-function peripheral 10 are usably installed in a horizontal plane (a posture depicted in FIGS. 1A and 1B) will be referred to as a "usable posture", in some cases. An up/down direction 7 is defined with the "usable posture" as the reference. Further, a front/rear direction 8 is defined, with a side on which an opening 13 of the multi-function peripheral 10 is provided is designated as the frontward side (front surface or front side), and a left/right direction 9 is defined as viewing the multi-function peripheral 10 from the frontward side (front surface). In the embodiment, the up/down direction 7 corresponds to the vertical direction, and each of the front/rear direction 8 and the left/right direction 9 corresponds to the horizontal direction in the usable posture. In the following, the first embodiment will be explained.

<Overall Configuration of Multi-Function Peripheral 10>

Figure 1B:
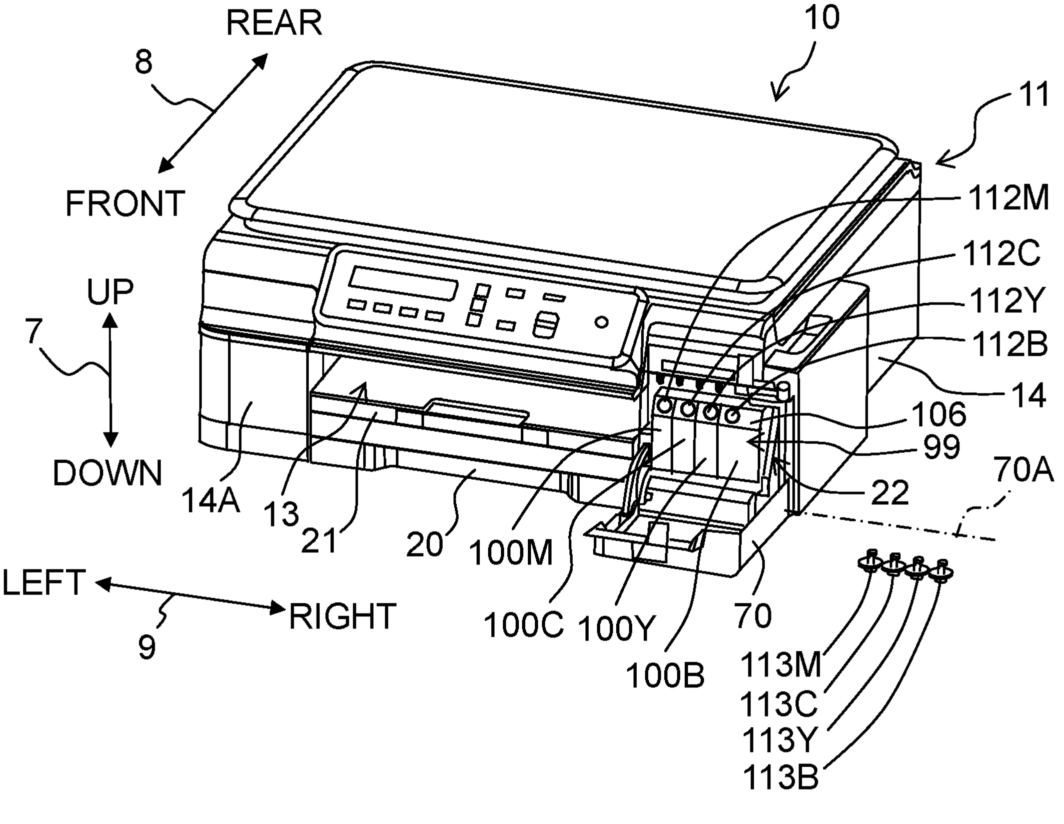
Figure 2:
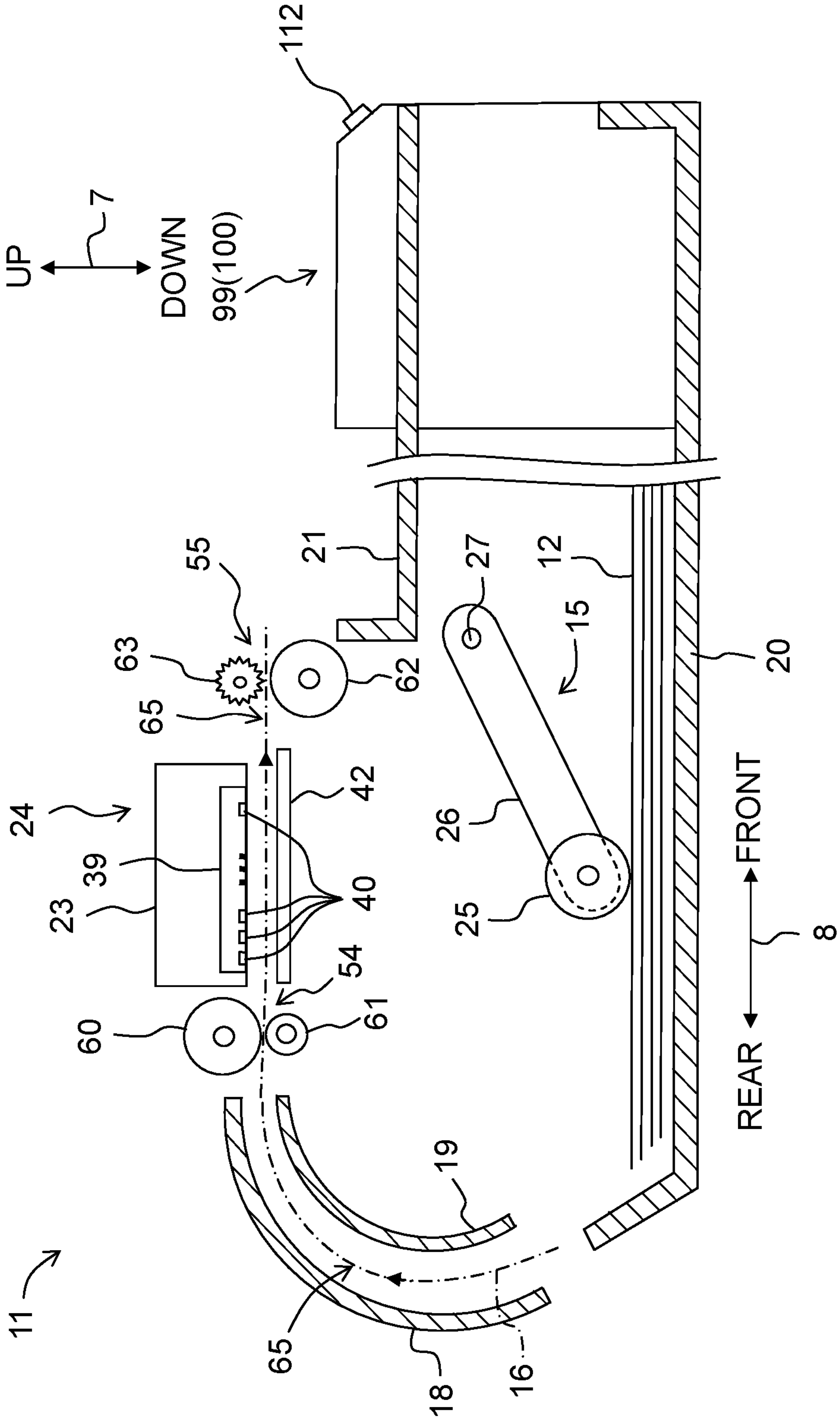
FIG. 2 is a vertical cross-sectional view schematically depicting the internal structure of a printer unit 11.

As depicted in FIGS. 1A and 1B, the multi-function peripheral 10 (an example of an apparatus) is formed to have a substantially rectangular parallelepiped shape. The multi-function peripheral 10 includes, at a lower portion of the multi-function peripheral 10, a printer unit 11 which records an image onto a paper 12 (see FIG. 2) by an ink-jet recording method. The printer unit 11 has a casing 14 including a front wall 14A and an opening 13 formed in the front wall 14A. As depicted in FIG. 2, a feeding section 15, a feed tray 20, a discharge tray 21, a conveyance roller section 54, a recording section 24, a discharge roller section 55, a platen 42, and a tank set 99 are arranged in the inside of the casing 14. Further, the multi-function peripheral 10 has various functions such as a facsimile function, a print function, etc.

<Feed Tray 20, Discharge Tray 21>

As depicted in FIGS. 1A and 1B, the feed tray 20 is inserted into or removed from the multi-function peripheral 10 by a user, in the front/rear direction 8 through the opening 13. The opening 13 is positioned in a central portion in the left/right direction 9 of the front surface of the multi-function peripheral 10. The feed tray 20 is capable of supporting a plurality of sheets of the paper 12 (sheet 12, paper sheet 12) that are stacked in the feed tray 20. The discharge tray 21 is arranged at a position at the upper side of (above) the feed tray 20, and is inserted or removed together with the feed tray 20. The discharge tray 21 supports the paper 12 discharged through a space between the recording section 24 and the platen 42 by the discharge roller section 55.

<Feeding Section 15>

The feeding section 15 feeds the paper 12 supported by the feed tray 20 to a conveyance route 65 (to be described later on). As depicted in FIG. 2, the feeding section 15 includes a feeding roller 25, a feeding arm 26, and a shaft 27. The feeding roller 25 is rotatably supported by the feeding arm 26 at a front end thereof. The feeding roller 25 rotates in a direction for causing the paper 12 to be conveyed in a conveyance direction 16 when a conveyance motor (not depicted in the drawings) is reversely rotated. In the following description, the rotations of the feeding roller 25, a conveyance roller 60 (to be described later on), and a discharge roller 62 (to be described later on) in the direction for causing the paper 12 to be conveyed in the conveyance direction 16 are each referred to as “normal rotation”. The feeding arm 26 is pivotably supported by the shaft 27 supported by a frame of the printer unit 11. A bias is applied to the feeding arm 26 by an elastic force of a spring or by the self-weight of the feeding arm 26 such that the feeding arm 26 is pivoted and urged toward the feed tray 20.

<Conveyance Route 65>

Figure 3:
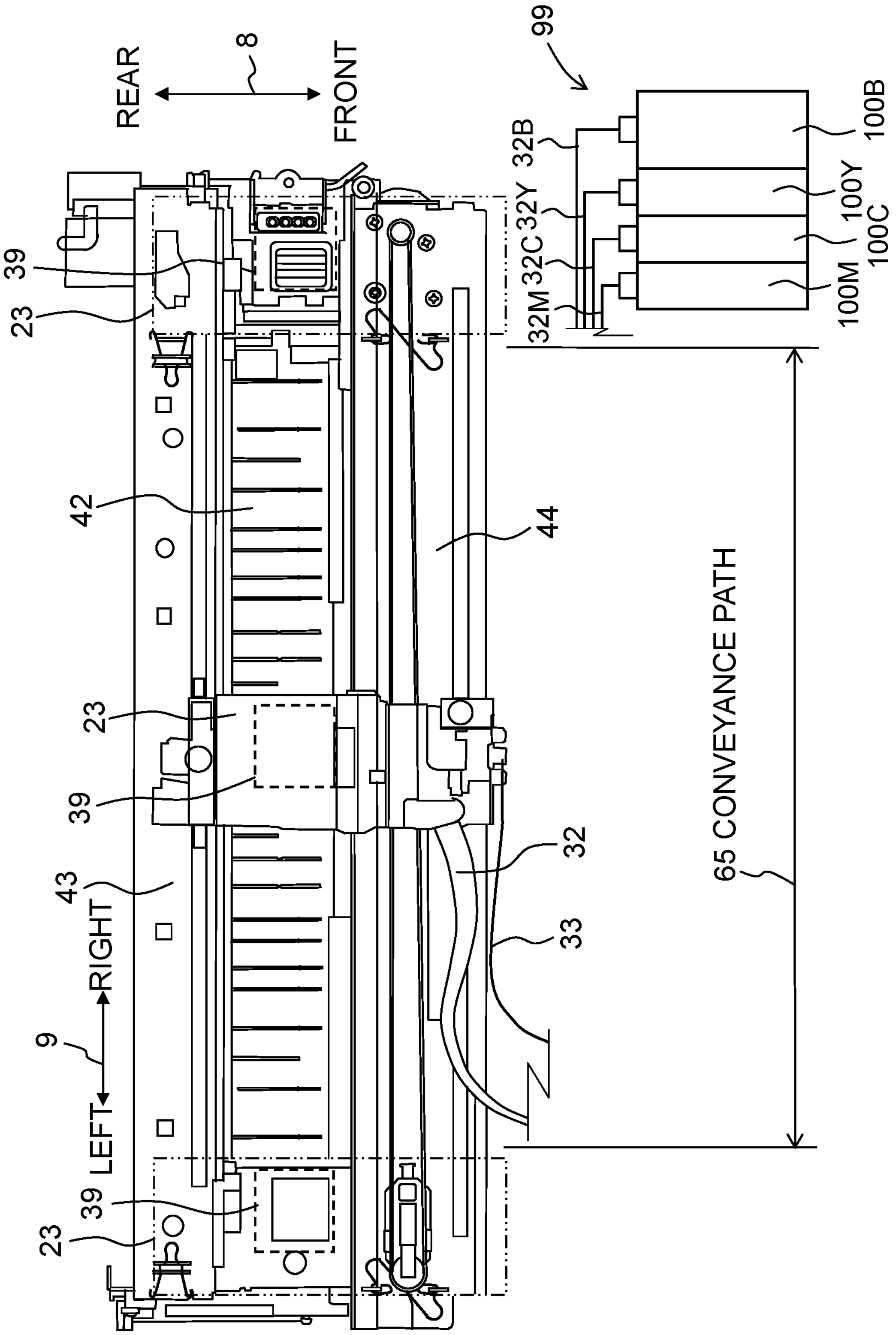
FIG. 3 is a plan view depicting the arrangement of a carriage 23 and a tank set 99.

As depicted in FIG. 2, in the interior of the printer unit 11, a space is defined by an outer guide member 18 and an inner guide member 19 which are arranged to face with each other with a predetermined interval (gap) intervened therebetween. This space constructs a portion of a conveyance route 65. The conveyance route 65 is a route or path which extends from a rear-end portion of the feed tray 20 toward the rear side of the printer unit 11. Further, the conveyance route 65 makes a U-turn frontwardly while extending from the lower side to the upper side, at the rear side of the printer unit 11; and then the conveyance route 65 reaches the discharge tray 21 via the space between the recording section 24 and the platen 42. As depicted in FIGS. 2 and 3, a portion of the conveyance route 65 between the conveyance roller section 54 and the discharge roller section 55 is provided at a substantially central portion in the left/right direction 9 of the multi-function peripheral 10, and extends in the front/rear direction 8. In FIG. 2, the conveyance direction 16 of the paper 12 in the conveyance route 65 is indicated by an arrow of a dot-dash chain line.

<Conveyance Roller Section 54>

As depicted in FIG. 2, the conveyance roller section 54 is arranged at the upstream side of the recording section 24 in the conveyance direction 16. The conveyance roller section 54 includes a conveyance roller 60 and a pinch roller 61 which are facing each other. The conveyance roller 60 is driven by the conveyance motor. The pinch roller 61 rotates following the rotation of the conveyance roller 60. The paper 12 is conveyed in the conveyance direction 16 by being pinched between the conveyance roller 60 and the pinch roller 61 which are rotated normally (positively) by the normal rotation of the conveyance motor.

<Discharge Roller Section 55>

As depicted in FIG. 2, the discharge roller section 55 is arranged at the downstream side of the recording section 24 in the conveyance direction 16. The discharge roller section 55 includes a discharge roller 62 and a spur 63 which are facing each other. The discharge roller 62 is driven by the conveyance motor. The spur 63 rotates following the rotation of the discharge roller 62. The paper 12 is conveyed in the conveyance direction 16 by being pinched between the discharge roller 62 and the spur 63 which are rotated normally by the normal rotation of the conveyance motor.

<Recording Section 24>

As depicted in FIG. 2, the recording section 24 is arranged between the conveyance roller section 54 and the discharge roller section 55 in the conveyance direction 16. The recording section 24 is arranged to face the platen 42, while sandwiching the conveyance route 65 therebetween, in the up/down direction 7. The recording section 24 includes a carriage 23 and a recording head 39 (an example of a liquid consuming apparatus).

As depicted in FIG. 3, the carriage 23 is supported by guide rails 43 and 44 which are extended respectively in the left/right direction 9, at positions separated respectively in the front/rear direction 8. The guide rails 43 and 44 are supported by the frame of the printer unit 11. The carriage 23 is connected to a known belt mechanism disposed on the guide rail 44. The belt mechanism is driven by a carriage motor (not depicted in the drawings). The carriage 23 connected to the belt mechanism reciprocates in the left/right direction 9 by being driven by the carriage motor. The moving range of the carriage 23 expands to locations apart from the conveyance route 65 toward left and right sides, as depicted by a dot-dash chain line of FIG. 3.

Further, an ink tube 32 and a flexible flat cable 33 are extended from the carriage 23.

The ink tube 32 connects the tank set 99 to the recording head 39. The ink tube 32 supplies an ink (an example of a liquid) stored in four ink tanks 100B, 100Y, 100C and 100M (which are collectively referred to also as the “ink tank(s) 100” in some cases) constructing the tank set 99 to the recording head 39. The ink tank 100 is an example of a tank. More specifically, four ink tubes 32B, 32Y, 32C and 32M (which are collectively referred to also as the “ink tube(s) 32” in some cases) via which inks of respective colors (black, magenta, cyan and yellow) are flowed or distributed are extended from the ink tanks 100B, 100Y, 100C and 100M, respectively, and are connected to the carriage 23 in a bundled form (in the following description, these four ink tubes 32B, 32Y, 32C and 32M will be collectively referred to as “ink tube(s) 32” in some cases).

The flexible flat cable 33 electrically connects the recording head 39 to a control circuit board having a controller (not depicted in the drawings) mounted thereon. The flexible flat cable 33 transmits a control signal outputted from the controller to the recording head 39.

As depicted in FIG. 2, the recording head 39 is installed on the carriage 23. A plurality of nozzles 40 is arranged (formed) in the lower surface of the recording head 39. End portions (forward end or tip portions) of the nozzles 40 are exposed from the lower surface of the recording head 39 and from the lower surface of the carriage 23 on which the recording head 39 is installed. In the following description, the surface through which the end portions of the nozzles 40 are exposed will be referred to as a “nozzle surface” in some cases. The recording head 39 jets or discharges the ink as fine ink droplets (minute ink droplets) through the nozzles 40. In a process of movement of the carriage 23, the recording head 39 jets the ink droplets toward the paper 12 supported by the platen 42. Accordingly, an image, etc. is recorded on the paper 12. Further, by this jetting of the ink droplets, the ink(s) stored in the ink tank(s) are consumed.

The printer unit 11 is provided with a maintenance mechanism (not depicted in the drawings). The maintenance mechanism is configured to perform maintenance for the recording head 39. Specifically, the maintenance mechanism executes a purge operation of sucking an ink, air, etc. inside the nozzles 40, a removing operation of removing any foreign matter or substance adhered to the nozzle surface, etc. The maintenance mechanism sends or feeds an ink sucked from the nozzles 40 of the recording head 39 to a waste ink tank (not depicted in the drawings) via a tube (not depicted in the drawings). The maintenance mechanism is arranged at a positon immediately below the carriage 23 positioned at a location on the right side or the left side relative to the conveyance route 65.

Before the purge operation is executed, the carriage 23 is moved to a location immediately above the maintenance mechanism. Afterwards, a cap (not depicted in the drawings) of the maintenance mechanism is moved upwardly so as to cover the nozzle surface. The cap is connected to the waste ink tank via the tube. A tube pump of the rotary system is arranged in the tube. The tube pump is driven to thereby squeeze the tube. With this, the ink inside the recording head 39 is sucked. The sucked ink is discharged to the waste ink tank via the cap and the tube.

Note that the tube is in such a state that the tube is closed, at least in a portion of the tube, by the tube pump of the rotary system.

<Platen 42>

As depicted in FIGS. 2 and 3, the platen 42 is arranged between the conveyance roller section 54 and the discharge roller section 55 in the conveyance direction 16. The platen 42 is arranged so as to face the recording section 24 in the up/down direction 7 with the conveyance path 65 being interposed therebetween, and supports the paper 12, conveyed by the conveyance roller section 54, from therebelow.

<Tank Set 99>

The tank set 99 is configured to store the inks to be supplied to the recording head 39. As depicted in FIGS. 1A and 1B, the tank set 99 is provided with the four ink tanks 100B, 100Y, 100C and 100M. These tanks 100 store different color inks, respectively. Specifically, a black ink is stored in the ink tank 100B, a yellow ink is stored in the ink tank 100Y, a cyan ink is stored in the ink tank 100C, and a magenta ink is stored in the ink tank 100M. Note that, however, the number of the ink tank 100 and the number of the color of the ink are not limited to the above-described examples.

The four ink tanks 100B, 100Y, 100C and 100M are arranged side by side in a row along the left/right direction 9. Among the four ink tanks 100B, 100Y, 100C and 100M, the ink tank 100B is located on the rightmost side, and the ink tank 100M is arranged on the leftmost side. Note that the arrangement positons of the ink tanks 100 are not limited to the above-described example. The ink tank 100B has the size, in particular, a width in the left/right direction 9, greater than those of the other ink tanks 100Y, 100C and 100M. Note that the size magnitude relationship among the ink tanks 100 is not limited to the above-described example. The ink tank 100B has a storing capacity of the ink greater than those of the ink tanks 100Y, 100C and 100M. Note that the storage capacity magnitude relationship among the ink tanks 100 is not limited to the above-described example.

As depicted in FIGS. 1A and 1B, the tank set 99 is arranged stationarily in the inside of the casing 14, at a right front portion of the casing 14. In other words, the tank set 99 is fixed to the multi-function peripheral 10 such that the tank set 99 cannot be easily removed (detached) from the multi-function peripheral 10. Note that the phrase "cannot be easily removed (detached) from" means, for example, a situation in which a user cannot easily remove the tank set 99 from the casing 14 of the multi-function peripheral 10 in a state that the multi-function peripheral 10 is in a normal usage state, but does not encompass such a situation in which an experienced repairer removes the tank set 99 from the casing 14 of the multi-function peripheral 10, for example, in order to perform any repair, etc. Accordingly, it is sufficient that the tank set 99 cannot be easily removed, by the user, from the casing 14 of multi-function peripheral 10 in the normal usage state.

The front surface of each of the ink tanks 100 is exposed to the outside of the multi-function peripheral 10 via an opening 22 formed in a right portion of the front wall 14A of the casing 14. The opening 22 is adjacent to the opening 13 in the left/right direction 9. Further, the casing 14 is provided with a cover 70 pivotable (rotatable) between a closed position at which the cover 70 covers the opening 22 (the position as depicted in FIG. 1A), and an opened position at which the cover 70 is opened to thereby allow the opening 22 to be exposed to the outside of the multi-function peripheral 10 and at which the cover 70 does not cover the opening 22 (the position as depicted in FIG. 1B). The cover 70 is supported by the casing 14 to be pivotable about a rotational axis line 70A of a rotational axis (not depicted in the drawings) which extends in the left/right direction 9 in the vicinity of a lower end portion in the up/down direction 7 of the casing 14.

In the following, the configuration of the ink tank 100 will be explained in detail. Since the ink tanks 100Y, 100C and 100M have a same configuration, one of the ink tanks 100Y, 100C and 100M is referred to as the ink tank 100, and the configuration of the one ink tank will be explained. Further, since the configuration of the ink tank 100B is similar to that of the ink tanks 100Y, 100C and 100M, the configuration of the ink tanks 100Y, 100C and 100M will be firstly explained, and then the difference between the ink tank 100B and ink tanks 100Y, 100C and 100M will be explained. In this case, a same reference sign or numeral is assigned to a configuration of the ink tank 100B that is similar to a configuration of the ink tanks 100Y, 100C and 100M, even if the shape of the configuration of the ink tank 100B is different from that of the ink tanks 100Y, 100C and 100M to some extent. Note that in the following explanation, the multi-function peripheral 10 and the ink tanks 100 arranged stationarily in the multi-function peripheral 10 are both in the usage posture, unless specifically described otherwise.

<Ink Tank 100>

Figure 4:
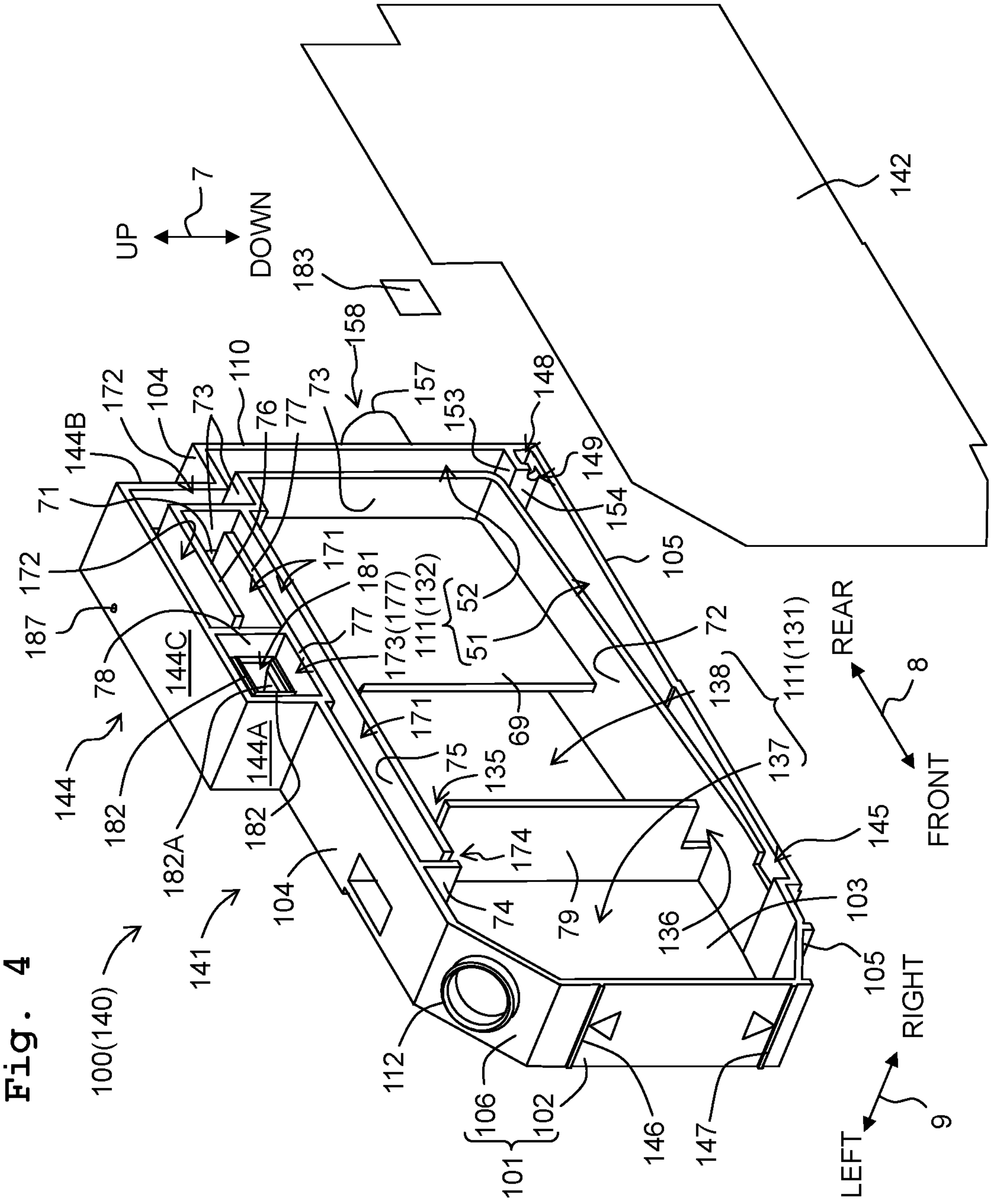
FIG. 4 is a front perspective view of an ink tank 100.
Figure 5:
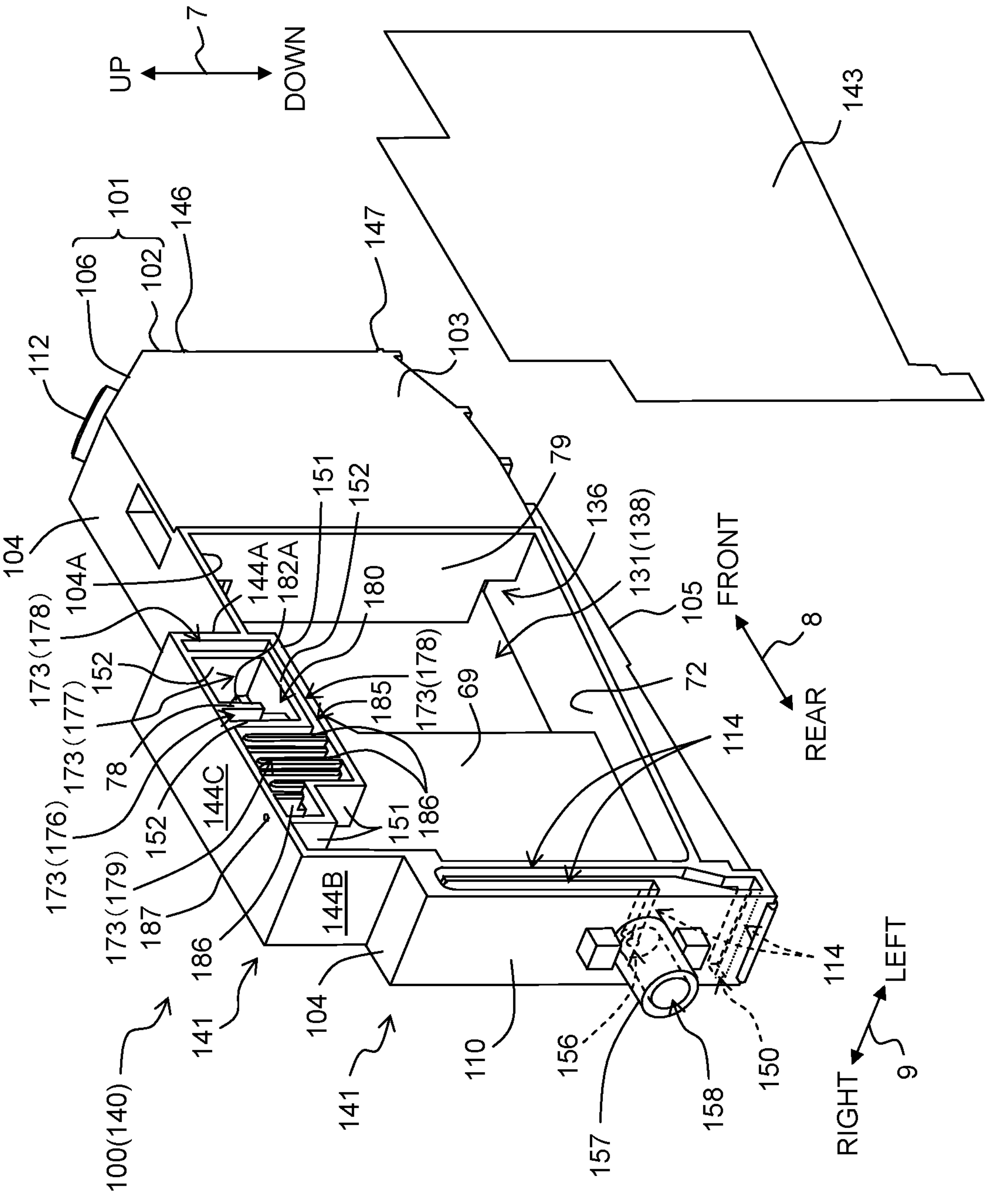
FIG. 5 is a rear perspective view of the ink tank 100.

As depicted in FIGS. 4 and 5, the ink tank 100 is constructed of a casing 140 forming the outer shape of the ink tank. The casing 140 is provided with a frame 141, and two films 142 and 143.

The frame 141 has, as a whole, a shape that is flat, rectangular parallelepiped in which a size along the left/right direction 9 is short, and sizes along the up/down direction 7 and the front/rear direction 8, respectively, are longer than the size in the left/right direction 9. Further, the size in the front/rear direction 8 is longer than the size in the up/down direction 7. Namely, the ink tank 100 has a first side along the front/rear direction 8, a second side along the up/down direction 7 and shorter than the first side, and a third side along the left/right direction 9 and shorter than the second side.

The frame 141 is formed of a resin which has a transparency or translucency to light to such an extent that an ink inside an ink chamber 111 (to be described later on) can be visible from the outside of the ink tank 100. The frame 141 is formed, for example of polypropylene. The frame 141 is integrally formed by, for example, performing injection molding with a resin material. The rigidity of the frame 141 is higher than that of the films 142 and 143.

Note that the frame 141 may be formed of a material different from the resin. Further, the frame 141 may have a configuration in which a plurality of members are combined. For example, it is allowable that a first ink chamber 131 and a second ink chamber 132 (to be described later on) are respectively constructed of two casings which are separate from each other, and that these two casings are connected via a tube, etc.

The frame 141 is provided with a front wall 101 (an example of a first wall), a left wall 103, an upper wall 104, a lower wall 105, a rear wall 110 (an example of a second wall), and inner walls 69, 71 to 79 and 151 to 155.

The front wall 101 constructs a front end (an example of a first end) of the ink tank 100. The front wall 101 is constructed of a standing wall 102, and an inclined wall 106. The standing wall 102 expands in the up/down direction 7 and the left/right direction 9. The inclined wall 106 is a wall which connects an upper end of the standing wall 102 and a front end of the upper wall 104, and which is inclined with respect to the up/down direction 7 and the front/rear direction 8.

The left wall 103 constructs a left end of the ink tank 100. The left wall 103 is a wall which extends rearwardly (in the rear direction) from a left end of the front wall 101. An upper end of the left wall 103 is connected to a front portion of the upper wall 104. A lower end of the left wall 103 is connected to a front portion of the lower wall 105. In other words, the left wall 103 is a wall which connects a left end of the front wall 101, a front left end of the upper wall 104 and a front left end of the lower wall 105 to one another. Namely, the left wall 103 is provided only on a front portion of the frame 141, but is not provided on a rear portion of the frame 141.

The upper wall 104 constructs an upper end of the ink tank 100. The upper wall 104 extends rearwardly from an upper end of the front wall 101 (rear end of the inclined wall 106). A front portion of the upper wall 104 is connected to an upper end of the left wall 103. A projection 144 is formed in the frame 141 such that the projection 144 is projected upwardly and expands from a substantially central portion to a rear portion in the front/rear direction 8 of the upper wall 104. The projection 144 is provided with a front wall 144A projected upwardly from the substantially central portion in the front/rear direction 8 of the upper wall 104, a rear wall 144B projected upwardly from a rear portion of the upper wall 104, and an upper wall 144C connecting an upper end of the front wall 144A and an upper end of the rear wall 144B.

The lower wall 105 constructs a lower end facing the upper end of the ink tank 100 in the up/down direction 7. The lower wall 105 is a wall which extends rearwardly from a lower end of the front wall 101. The lower wall 105 is formed to be away from the upper wall 104 to be positioned below the upper wall 104 in the up/down direction 7. As described above, the front portion of the lower wall 105 is connected to the lower end of the left wall 103. A left end portion of the lower wall 105 is bent upwardly. An upper end of the bent lower wall 105 is connected to a lower surface of an inner wall 72 (to be described later on; see FIG. 5).

The rear wall 110 constructs a rear end (an example of a second end) of the ink tank 100 which faces the front end of the ink tank 100 in the front/rear direction 8. The rear wall 110 is formed to be located on the rear side (behind) the front wall 101. The rear wall 110 is formed to be away from the front wall 101 in the front/rear direction 8 (an example of a horizontal direction). As described above, the upper end of the rear wall 110 is connected to the rear end of the upper wall 104. The lower end of the rear wall 110 is connected to the rear end of the lower wall 105. A left portion of the rear wall 110 is formed to be longer in the front/rear direction 8 than a right portion of the rear wall 110. An ink outflow channel 114 (to be described later on) is formed in the left portion, of the rear wall 110, which is formed to be longer than the right portion thereof.

Figure 6:
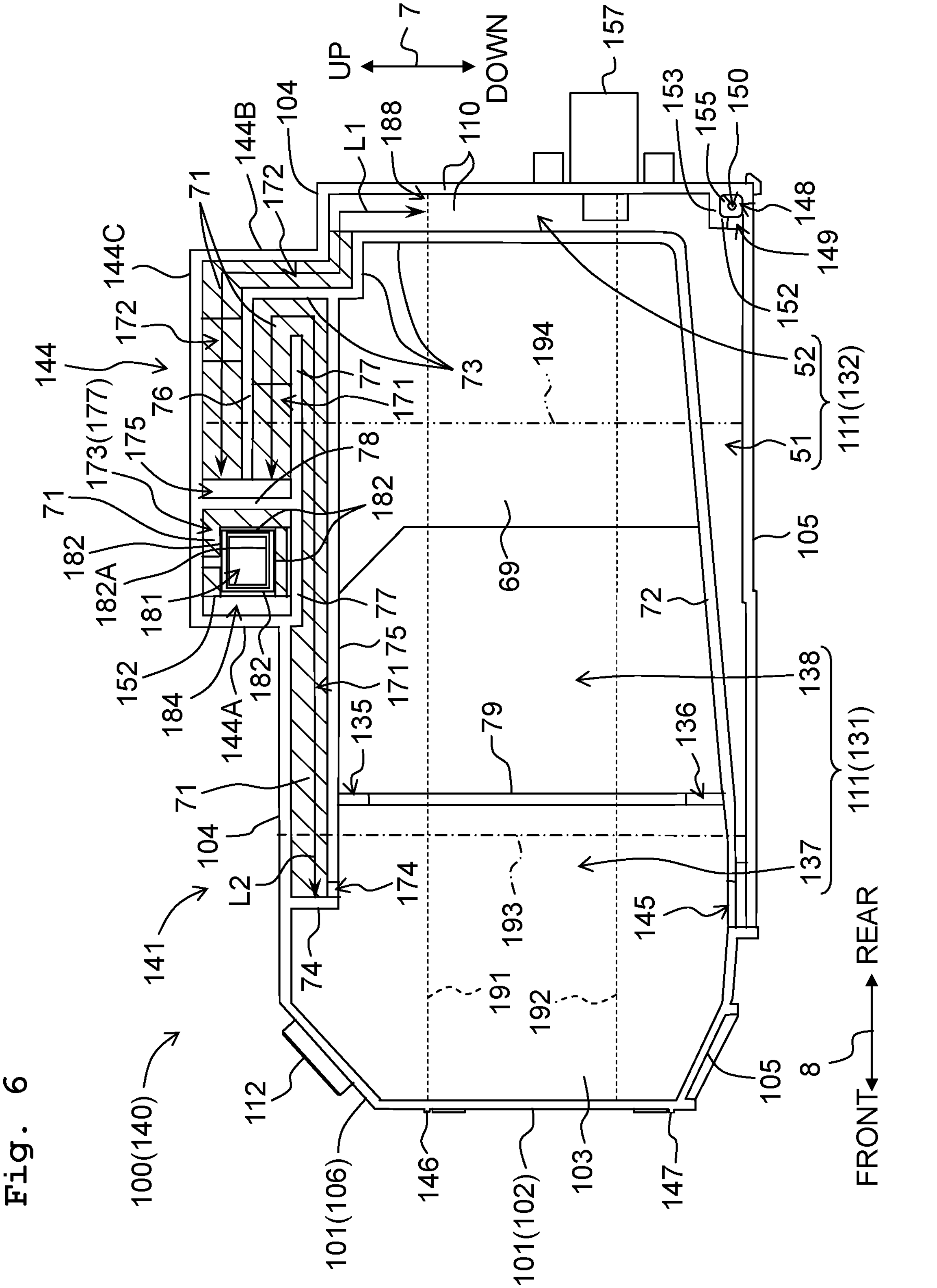
FIG. 6 is a right side view of the ink tank 100.
Figure 7:
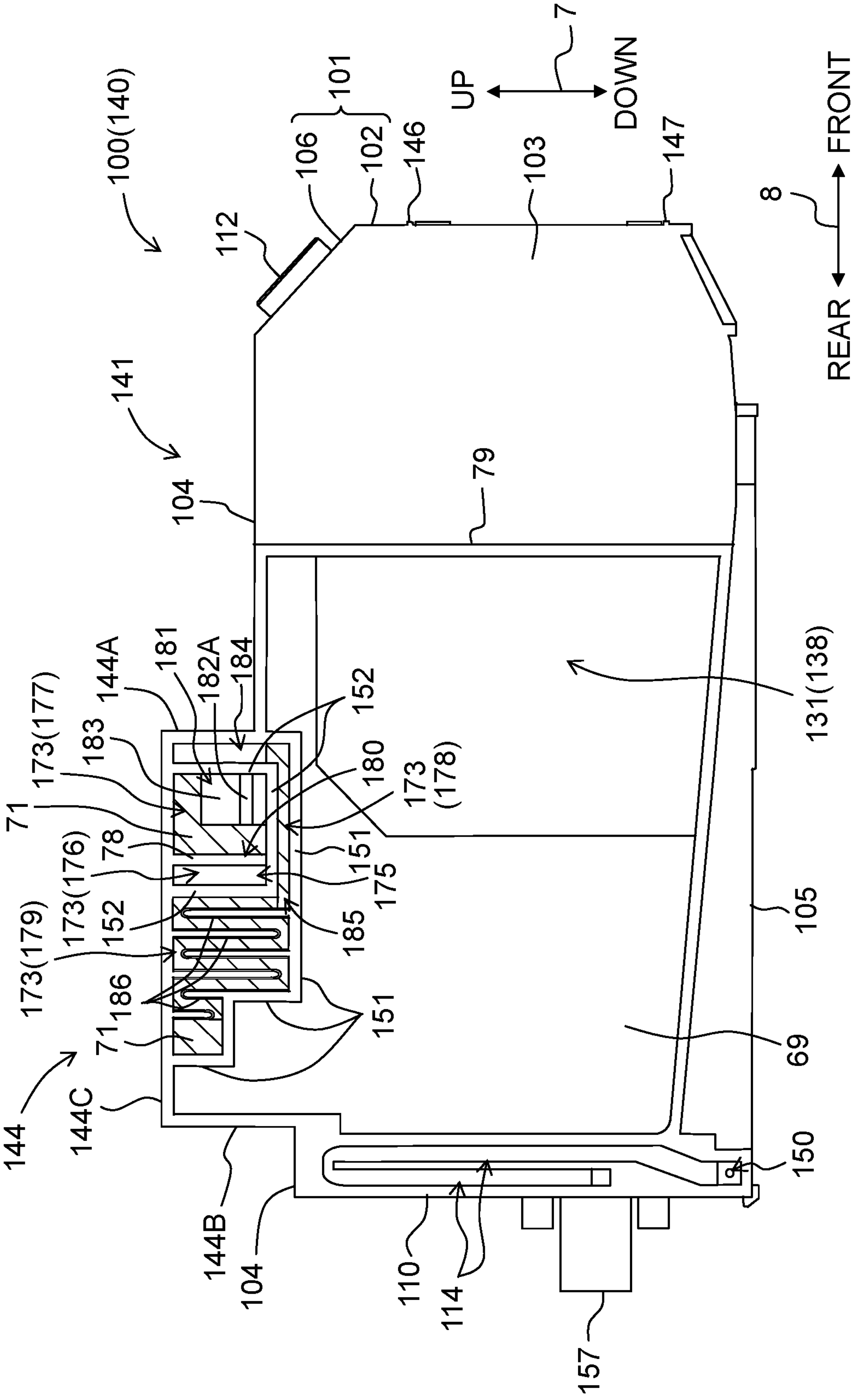
FIG. 7 is a left side view of the ink tank 100.

As depicted in FIGS. 6 and 7, the inner wall 71 extends downwardly from the upper wall 104 and from the upper wall 144C of the projection 144. The inner wall 71 is a wall which expands in the up/down direction 7 and the front/rear direction 8. The inner wall 71 is provided on a hatched range depicted in FIGS. 6 and 7. The inner wall 71 is arranged at any position between the right and left ends of the frame 141. For example, the inner wall 71 is arranged at a substantially central portion of the frame 141 in the left/right direction 9. With this, the inner portion (inside) of the frame 141 is divided into left and right portions at the location at which the inner wall 71 is arranged. Further, the inner wall 71 may be arranged at a position closer to the right end of the frame 141 in the left/right direction 9, or at a position closer to the left end of the frame 141 in the left/right direction 9. Note that the inner wall 71 is preferably arranged at a location which does not include the right end and the left end of the frame 141, since the inner wall 71 defines a portion of a communicating channel (to be described later on).

As depicted in FIGS. 4 and 5, the inner wall 72 is arranged at a location in the vicinity of the lower wall 105 between the upper wall 104 and the lower wall 105 in the up/down direction 7. The inner wall 72 extends rearwardly from a front end portion to a rear end portion of the lower wall 105, while being inclined upwardly. A front end of the inner wall 72 is connected to a location, of the lower wall 105, closer to the front end portion of the lower wall 105. A rear end of the inner wall 72 is located to be on the front side (in front) of the rear wall 110 and away (separate) from the rear wall 110.

The inner wall 73 extends substantially upwardly from a rear end of the inner wall 72, in the up/down direction 7, while maintaining a constant spacing distance (gap) between the inner wall 73 and the rear wall 110. The inner wall 73 extends up to the inside of the projection 144 while bending so as to conform to the outer shape of the projection 144. An upper end of the inner wall 73 is located at a position below (on the lower side of) the upper wall 144C of the projection 144 and away from the upper wall 144C. A portion (a portion located below an inner wall 75 which is to be described later on) of the inner wall 73 is provided to span from the right end to the left end of the frame 144. On the other hand, a remaining portion, of the inner wall 73, different from the portion, is provided to span from the right end of the frame 141 to the inner wall 71.

The inner wall 69 expands in the up/down direction 7 and the front/rear direction 8. The inner wall 69 is positioned between the inner wall 72 and the inner wall 75 (to be described later on) in the up/down direction 7. The inner wall 69 is positioned in front of the inner wall 73. The inner wall 69 is arranged in the frame 141 at a substantially central portion thereof in the left/right direction 9. With this, a rear ink chamber 138 of a first ink chamber 131 (to be described later on) is divided into left and right portions at the location at which the inner wall 69 is arranged. A lower end of the inner wall 69 is connected to a rear portion of the inner wall 72. An upper end of the inner wall 69 is connected to a rear portion of the inner wall 75. A rear end of the inner wall 69 is connected to the inner wall 73.

The inner walls 74 to 77 to be explained below extend rightwardly from the inner wall 71 (see FIG. 6). In other words, the inner walls 74 to 77 are arranged to span from the inner wall 71 to the right end of the frame 141.

As depicted in FIGS. 4 and 6, the inner wall 74 extends downwardly at a front portion of a lower surface 104A of the upper wall 104. A left end of the inner wall 74 is connected to the left wall 103, and the rear surface in the front/rear direction 8 of the inner wall 74 is connected to a front end of the inner wall 71.

The inner wall 75 extends rearwardly from a lower end of the inner wall 74. A rear end of the inner wall 75 is connected to the inner wall 73.

The inner wall 76 extends frontwardly from an upper end of the inner wall 73. Namely, the inner wall 76 is located at a position above the inner wall 75. A front end of the inner wall 76 is located at a position behind a through hole 175 (to be described later on). In the front/rear direction 8, there is a gap 195 between the front end of the inner wall 76 and the through hole 175.

The inner wall 77 extends rearwardly from a lower end of the front wall 144A of the projection 144. A front portion of the inner wall 77 is positioned between the upper wall 144C of the projection 144 and the inner wall 75 in the up/down direction 7, and faces each of the upper wall 144C and the inner wall 75 in the up/down direction 7. A rear portion of the inner wall 77 is positioned between the inner wall 76 and the inner wall 75, and faces each of the inner wall 76 and the inner wall 75 in the up/down direction 7. A rear end of the inner wall 77 is located in front of the inner wall 73 and away from the inner wall 73.

The inner walls 78 and 79 to be explained below extend rightwardly and leftwardly from the inner wall 71 (see FIGS. 6 and 7). In other words, the inner walls 78 and 79 are arranged to span from the right end to the left end of the frame 141.

As depicted in FIGS. 4 and 5, the inner wall 78 expands in the up/down direction 7 and the left/right direction 9. The inner wall 78 is arranged at a location behind the front wall 144A of the projection 144 and away from the front wall 144A. The inner wall 78 faces the inner wall 76 in the front/rear direction 8, with the through hole 175 being interposed therebetween. Namely, the inner wall 78 is arranged between the front wall 144A and the through hole 175 in the front/rear direction 8.

The inner wall 79 expands in the up/down direction 7 and the left/right direction 9. The inner wall 79 is positioned behind the inner wall 74 and in front of the inner wall 69 in the front/rear direction 8. An upper end of the inner wall 79 is connected to the inner wall 75. A lower end of the inner wall 79 is connected to the inner wall 72. A left end of the inner wall 79 is connected to the left wall 103.

The inner walls 151 and 152 to be explained below extend leftwardly from the inner wall 71 (see FIG. 7). In other words, the inner walls 151 and 152 are arranged to span from the inner wall 71 to the left end of the frame 141.

As depicted in FIGS. 5 and 7, the inner wall 151 is a wall connecting a lower end of the front wall 144A of the projection 144 and a rear portion of the upper wall 144C of the projection 144. The inner wall 151 extends rearwardly from the lower end of the front wall 144A, then extends upwardly, then extends rearwardly, then extends upwardly and reaches the upper wall 144C.

The inner wall 152 is a wall connecting two locations (portions) of the upper wall 144C of the projection 144. The two locations are a front end portion of the upper wall 144C and a central portion in the front/rear direction 8 of the upper wall 144C. The inner wall 152 extends downwardly from the lower surface of the front end portion of the upper wall 144C, then extends rearwardly, then extends upwardly, and reaches the lower surface of the central portion in the front/rear direction 8 of the upper wall 144C. The inner wall 152 is surrounded by the upper wall 144C and the inner wall 151 in a side view seeing the ink tank 100 from the left side thereof.

As depicted in FIG. 4, the right surface of the frame 141 is open (uncovered, released). By fixing a film 142 by welding to the right surfaces of the front wall 101, the lower wall 105, the rear wall 110, the upper wall 104, the inner walls 72 to 79, the front wall 144A of the projection 144, the rear wall 144B of the projection 144 and the upper wall 144C of the projection 144, the right surface of the frame 141 is sealed.

As depicted in FIG. 5, the rear portion of the left surface of the frame 141 is open (uncovered, released). By fixing a film 143 by welding to the left surfaces of the rear wall 110, the upper wall 104, the inner walls 72, 79, 151 and 152, the front wall 144A of the projection 144, the rear wall 144B of the projection 144, the upper wall 144C of the projection 144, and a left surface of a partition wall 186 (to be described later on), the left surface of the frame 141 is sealed.

As depicted in FIG. 4, the outer surface (front surface) of the standing wall 102 of the front wall 101 is provided with a first line 146 and a second line 147.

The first line 146 extends in the left/right direction 9. Under a condition that a maximum amount of the ink, which is an amount of the ink storable in the ink tank 100 in the usable posture, is stored in the ink chamber 111, the position in the up/down direction 7 of the first line 146 is at a height which is same as the liquid surface of the maximum amount of the ink. Note that the position in the up/down direction 7 of the first line 146 is not limited to the liquid surface of the maximum amount of the ink under the condition that the maximum amount of the ink is stored in the ink chamber 111.

The second line 147 extends in the left/right direction 9. The second line 147 is located to be below the first line 146 in the up/down direction 7. Specifically, under a condition that an amount which is smaller than the maximum amount of the ink is stored in the ink chamber 111 in the ink tank 100 in the usable posture, the position in the up/down direction 7 of the second line 147 is at a height which is same as the liquid surface of the amount of the ink which is smaller than the maximum amount. In the embodiment, under a condition that a minimum storing amount of the ink, which requires supplement of the ink, is stored in the ink chamber 111 in the ink tank 100 in the usable posture, the position in the up/down direction 7 of the second line 147 is at a height which is same as the liquid surface of the minimum storing amount of the ink.

<Ink Chamber 111>

As depicted in FIGS. 4 and 5, the casing 140 has an ink chamber 111 in the inside thereof. The ink chamber 111 is an internal space of the ink tank 100 and an ink is stored in the ink chamber 111. The ink chamber 111 is provided with a first ink chamber 131 (an example of a first chamber) and a second ink chamber 132 (an example of a second chamber).

The first ink chamber 131 is provided with a space to be explained below, and a first communicating channel 171 of an atmosphere communicating channel which is communicated with this space. The second ink chamber 132 is provided with a space to be explained below, a second communicating channel 172 of the atmosphere communicating channel which is communicated with this space, a buffer chamber 148 and an ink outflow channel 114. The atmosphere communicating channel, the buffer chamber 148 and the ink outflow channel 114 will be described later on.

The first ink chamber 131 is defined by the front wall 101, the left wall 103, the lower wall 105, the rear wall 110, the inner wall 72, the inner wall 73, the inner wall 74, the inner wall 75, the upper wall 104, the inner wall 151, the upper wall 144C of the projection 144, the film 142 and the film 143. The front wall 101 defines a front surface of the first ink chamber 131. The lower wall 105 and the inner wall 72 define a lower surface of the first ink chamber 131. The inner wall 73 defines a rear surface of the first ink chamber 131. The inner wall 75, the inner wall 74 and the upper wall 104 define an upper surface of the first ink chamber 131. The film 142 defines a right surface of the first ink chamber 131. The left wall 103 and the film 143 define a left surface of the first ink chamber 131.

The first ink chamber 131 is divided into a front ink chamber 137 and a rear ink chamber 138 by the inner wall 79. The front surface of the inner wall 79 defines the rear surface of the front ink chamber 137. The rear surface of the inner wall 79 defines the front surface of the rear ink chamber 138.

An upper end portion of the inner wall 79 is cut out leftwardly from the right end of the upper end portion. With this, an opening 135 is formed in the upper end portion of the inner wall 79. The opening 135 is defined by the inner wall 79, the inner wall 75 and the film 142. A lower end portion of the inner wall 79 is cut out leftwardly from the right end of the lower end portion. With this, an opening 136 is formed in the lower end portion of the inner wall 79. The opening 136 is defined by the inner wall 79, the inner wall 72 and the film 142. The front ink chamber 137 and the rear ink chamber 138 are communicated with each other by the openings 135 and 136.

As depicted in FIGS. 4 and 6, the second ink chamber 132 is positioned to be below and behind the first ink chamber 131. The second ink chamber 132 has a substantially L-shape in a side view seeing the ink tank 100 from the left side thereof. The second ink chamber 132 is provided with a lower ink chamber 51 and an upper ink chamber 52. The lower ink chamber 51 is positioned below the first ink chamber 131 in the up/down direction 7. The upper ink chamber 52 extends upwardly from a rear end portion of the lower ink chamber 51. The upper ink chamber 52 is positioned behind the rear ink chamber 138 of the first ink chamber 131 in the front/rear direction 8.

The lower ink chamber 51 is defined by the lower wall 105, the inner wall 72 and the film 142. The lower wall 105 defines the front surface, the lower surface and the left surface of the lower ink chamber 51. The inner wall 72 defines the upper surface of the lower ink chamber 51. The film 142 defines the right surface of the lower ink chamber 51. The rear surface of the lower ink chamber 51 is opened (uncovered or released). In the rear surface, the lower ink chamber 51 is communicated with the upper ink chamber 52.

A front end portion of the inner wall 72 is cut out leftwardly from the right end of the front end portion. With this, an opening 145 (an example of a second communication port) is formed in the front end portion of the inner wall 72. The opening 145 is defined by the inner wall 72, the lower wall 105 and the film 142. The front ink chamber 137 of the first ink chamber 131 and the lower ink chamber 51 of the second ink chamber 132 are communicated with each other by the opening 145.

The upper ink chamber 52 is defined by the rear wall 110, the inner wall 73 and the film 142. The rear wall 110 defines the rear surface and the left surface of the upper ink chamber 52. The inner wall 73 defines the front surface of the upper ink chamber 52. The film 142 defines the right surface of the upper ink chamber 52. The lower surface of the upper ink chamber 52 is opened (uncovered or released). In the lower surface, the upper ink chamber 52 is communicated with the lower ink chamber 51.

The upper surface of the upper ink chamber 52 is opened (uncovered or released). Here, the upper surface is a virtual surface (virtual plane) and is at a height same as the first line 146. Namely, under a condition that the maximum amount of the ink which is storable in the ink tank 100 in the usable posture is stored in the ink chamber 111, the upper surface of the upper ink chamber 52 is at a height which is same as the liquid surface of the maximum amount of the ink. Further, in the upper surface, the upper ink chamber 52 is communicated with the second communicating channel 172 of the atmosphere communicating channel (to be described later on). Namely, the upper surface is the boundary between the upper ink chamber 52 and the second communicating channel 172. The upper surface is a boundary positon 188 (see FIG. 6) between the second ink chamber 132 and the second communicating channel 172. Note that the position of the boundary is not limited to the above-described positon, and the position of the boundary may be, for example, a position above or below the first line 146.

In a state that the ink tank 100 is in the usable posture, in other words that the upper wall 104 constructs the upper portion of the ink tank 100 and that the lower wall 105 constructs the lower portion of the ink tank 100 and under the condition that the maximum amount of the ink storable in the ink tank 100 in the usable posture is stored in the ink chamber 111, the liquid surface of the ink is at a position indicated by a broken line 191 in FIG. 6. Namely, as described above, the liquid surface of the ink is at the height same as the first line 146.

In this situation, the liquid surface of the ink stored in the first ink chamber 131 is at a vertical height (height in the up/down direction 7) which is same as the liquid surface of the ink stored in the second ink chamber 132.

Further, in this situation, the liquid surface of the ink in the first ink chamber 131 and the liquid surface of the ink in the second ink chamber 132 are formed independently from each other. Specifically, the liquid surface of the ink in the first ink chamber 131 is surrounded by the front wall 101, the inner wall 73, the film 142, the left wall 103 and the film 143. On the other hand, the liquid surface of the ink in the second ink chamber 132 is surrounded by the rear wall 110, the inner wall 73 and the film 142.

Note that a case wherein the liquid surface of the ink in the first ink chamber 131 and the liquid surface of the ink in the second ink chamber 132 are formed independently from each other is not limited to the case that the maximum amount of the ink, which is storable in the ink tank 100 in the usable posture, is stored in the ink chamber 111. For example, the case wherein the liquid surface of the ink in the first ink chamber 131 and the liquid surface of the ink in the second ink chamber 132 are formed independently from each other may be, for example, a case that the ink is stored in the ink chamber 111 in such an amount that the liquid surface of the ink stored in the ink chamber 111 is at the height same as the second line 147. Of course, it is allowable that the liquid surface of the ink in the first ink chamber 131 and the liquid surface of the ink in the second ink chamber 132 are formed independently from each other under a condition that the maximum amount of the ink which is storable in the ink tank 100 in the usable posture is stored in the ink chamber 111, under a condition that the ink is stored in the ink chamber 111 in such an amount that the liquid surface of the ink stored in the ink chamber 111 is at the height same as the second line 147, and/or under a condition that any other amount, different from the above-described amounts, of the ink is stored in the ink chamber 111.

Further, even in a case that the ink tank 100 is not in the usable posture, the liquid surface of the ink in the first ink chamber 131 and the liquid surface of the ink in the second ink chamber 132 are formed independently from each other.

For example, in a state that the lower wall 105 constructs the upper portion of the ink tank 100 and that the upper wall 104 constructs the lower portion of the ink tank 100 and under the condition that the maximum amount of the ink, which is storable in the ink tank 100 in the usable posture, is stored in the ink chamber 111, the liquid surface of the ink is at a position indicated by a broken line 192 in FIG. 6, namely, the position indicated by the broken line 192 between the first line 146 and the second line 147 in the up/down direction 7.

Further, for example, in a state that the front wall 101 constructs the upper portion of the ink tank 100 and that the rear wall 110 constructs the lower portion of the ink tank 100 and under the condition that the maximum amount of the ink, which is storable in the ink tank 100 in the usable posture, is stored in the ink chamber 111, the liquid surface of the ink is at a position indicated by a dot-dash chain line 193 in FIG. 6.

Furthermore, for example, in a state that the rear wall 110 constructs the upper portion of the ink tank 100 and that the front wall 101 constructs the lower portion of the ink tank 100 and under the condition that the maximum amount of the ink, which is storable in the ink tank 100 in the usable posture, is stored in the ink chamber 111, the liquid surface of the ink is at a position indicated by a dot-dot-dash chain line 194 in FIG. 6.

<Buffer Chamber 148>

As depicted in FIGS. 4 and 6, the casing 140 has a buffer chamber 148 provided therein. The buffer chamber 148 is an internal space in the ink tank 100, and is interposed between the second ink chamber 132 and the ink outflow channel 114 (to be described later on). Namely, the ink stored in the second ink chamber 132 flows into the ink outflow channel 114 via the buffer chamber 148.

The buffer chamber 148 is provided on a right rear lower portion of the casing 140. The buffer chamber 148 is defined by the inner wall 153, the inner wall 154, the inner wall 155, the lower wall 105, the rear wall 110 and the film 142.

The inner wall 153 projects frontwardly from a front surface in a right lower portion of the rear wall 110, and extends in the left/right direction 9. The inner wall 153 defines the upper surface of the buffer chamber 148. The inner wall 154 projects upwardly from an upper surface in a right rear portion of the lower wall 105, and extends in the left/right direction 9. The inner wall 154 defines the front surface of the buffer chamber 148. The inner wall 155 is a wall which expands in the up/down direction 7 and the front/rear direction 8, and which is surrounded by the inner wall 153, the inner wall 154, the rear wall 110 and the lower wall 105. The inner wall 155 defines the left surface of the buffer chamber 148. The lower wall 105 defines the lower surface of the buffer chamber 148. The rear wall 110 defines the rear surface of the buffer chamber 148. The film 142 defines the right surface of the buffer chamber 148.

A right lower end portion of the inner wall 154 is cut out leftwardly from the right end of the right lower end portion. With this, an opening 149 is formed in the right lower end portion of the inner wall 154. The opening 149 is defined by the inner wall 154 and the film 142. The opening 149 communicates a right rear lower portion of the second ink chamber 132 and the buffer chamber 148. Note that in the embodiment, although the inner wall 154 is cut out in a semicircular shape, the shape of the cutout is not limited to the semicircular shape, and may be, for example, a rectangular shape.

A circular-shaped opening 150 is formed in a central portion of the inner wall 155. The opening 150 communicates the buffer chamber 148 with the ink outflow channel 114. The ink stored in the second ink chamber 132 flows into the opening 150 via the buffer chamber 148. In other words, the opening 150 is an ink inflow port (an example of a liquid inflow port) via which the ink is allowed to flow from the buffer chamber 148 into the ink outflow channel 114. Note that the shape of the opening 150 is not limited to the circular shape, and may be, for example, a rectangular shape.

<Ink Outflow Channel 114>

As depicted in FIGS. 5 and 7, the casing 140 has the ink outflow channel 114. The ink outflow channel 114 is a communicating channel (path or route) via which the ink stored in the second ink chamber 132 is allowed to flow to the outside of the ink tank 100. Note that in the embodiment, since the ink stored in the first ink chamber 131 is moved to the second ink chamber 132 via the opening 145, the ink outflow channel 114 can be also considered as a communicating channel via which the inks stored in the first ink chamber 131 and the second ink chamber 132 are allowed to flow to the outside of the ink tank 100.

The ink outflow channel 114 is communicated with the buffer chamber 148 via the opening 150. The ink outflow channel 114 extends leftwardly from the opening 150, then extends upwardly, then extends downwardly, then extends rightwardly, and reaches an opening 156 (an example of a liquid outflow port).

The ink outflow channel 114 is formed as a groove recessed rightwardly from the left surface of the rear wall 110. A portion, of the ink outflow channel 114, which is different from a portion of the right surface (plane) and the left surface (plane) of the ink outflow channel 114 is defined by the rear wall 110. A surrounding portion, of the right surface of the ink outflow channel 114, which surrounds the opening 156, is defined by the inner wall 155. The left surface of the ink outflow channel 114 is defined by the film 143.

The frame 141 is provided with a cylindrical (tubular) shaped projection 157. The projection 157 is projected rearwardly from a surrounding portion, of the rear wall 110, which surrounds the opening 156. A front end of an internal space of the projection 157 is communicated with the ink outflow channel 114 via the opening 156. A rear end of the internal space of the projection 157 is communicated with the outside of the ink tank 100 via an opening 158. The ink tube 32 is connected to the projection 157 via the opening 158.

As described above, one end of the ink outflow channel 114 is communicated with the second ink chamber 132 via the buffer chamber 148. Further, the other end of the ink outflow channel 114 is communicated with the nozzles 40 of the recording head 39 via the internal space of the projection 157 and via the ink tube 32. Namely, the opening 158 allows the ink flowed into the opening 158 from the opening 150 to flow out toward the recording head 39. Further, in a case that ink droplets of the ink are jetted from the recording head 39 and thereby the ink is consumed, the ink inside the ink outflow channel 114 becomes movable toward the recording head 39.

Here, the ink outflow channel 114 is a flow channel or channel. The term "channel" or "flow channel" means such a space that one end of the space is connected to the ink chamber 111; and in a case that the other end of the space is closed (blocked), the ink stored in the ink chamber 111 does not flow into this space, regardless of the posture of the ink tank 100. In the embodiment, the ink tank 100 is provided with only the ink outflow channel 114 as the channel. However, it is allowable that the ink tank 100 is provided also with a channel which is different from the ink flow channel 114.

A detailed explanation will be given below. As described above, the tube extending from the cap, of the maintenance mechanism, which is capable of covering the nozzles 40 of the recording head 39 is blocked by the pump. Accordingly, in a case that the nozzles 40 are covered by the cap, the other end of the ink outflow channel 114 (an end closer to the projection 157) is communicated with the blocked tube via the internal space of the projection 157, the ink tube 32, the recording head 39 and the cap. Namely, the other end of the ink outflow channel 114 is blocked (closed). Further, the cross section of the ink outflow channel 114 is formed to be sufficiently small as compared with the cross section of the second ink chamber 132. Accordingly, even if the posture of the ink tank 100 is changed to a posture different from the usable posture, namely, regardless of the posture of the ink tank 100, the ink stored in the second ink chamber 132 does not flow into the ink outflow channel 114. Note that in a case that the nozzles 40 are not covered by the cap, the nozzles 40 are open. Namely, the other end of the ink outflow channel 114 is open. Accordingly, the ink stored in the second ink chamber 132 can flow into the ink outflow channel 114.

On the other hand, the opening 145 as described above and the atmosphere communicating channel (to be described later on) are each a boundary. The term "boundary" means a space in which at least one of one end and the other end of the space is connected to the ink chamber 111, and even in a case that the one end or the other end is blocked, the ink stored in the ink chamber 111 can flow into the space. In the embodiment, the ink tank 100 is provided only with the opening 145 and the atmosphere communicating channel, as the boundary. It is allowable, however, that the ink tank 100 is provided also with another boundary which is different from the opening 145 and the atmosphere communicating channel.

<Atmosphere Communicating Channel>

As depicted in FIGS. 4 to 7, the casing 140 has an atmosphere communicating channel (an example of a communicating channel). The atmosphere communicating channel is a communicating channel for communicating the ink chamber 111 with the outside of the ink tank 100. In other words, the atmosphere communicating channel is a communicating channel for releasing (opening) the ink chamber 111 to the atmosphere. The atmosphere communicating channel is provided with the first communicating channel 171 (an example of a first channel) and the second communicating channel 172 which are depicted in FIGS. 4 and 6, and the third communicating channel 173 as depicted in FIGS. 4 to 7. The first communicating channel 171 and the second communicating channel 172 are located on the right side relative to the inner wall 71. The third communicating channel 173 is located both on the right and left side relative to the inner wall 71.

As depicted in FIGS. 4 and 6, the first communicating channel 171 is communicated with the front ink chamber 137 of the first ink chamber 131 via an opening 174 (an example of a first communicating port). The opening 174 is formed by cutting out a right front end portion of the inner wall 75 leftwardly from a right end thereof. The opening 174 is defined by the inner wall 75, the inner wall 74 and the film 142.

The first communicating channel 171 extends rearwardly from the opening 174, then extends frontwardly so as to make a U-turn, and reaches the through hole 175 (see FIGS. 6 and 7). Namely, the first communicating channel 171 extends along the front/rear direction 8 (an example of a first direction). Note that the direction in which the first communicating channel 171 extends is not limited to the front/rear direction 8. For example, the first communicating channel 171 may extend in a direction inclined in the up/down direction 7 relative to the front/rear direction 8. The first communicating channel 171 may extends in a direction having a component in the front/rear direction 8 as an example of the first direction. The through hole 175 is provided in the inner wall 71. The through hole 175 is disposed at a location which is closer to a front portion, of the projection 144 in the front/rear direction 8, to some extent than a central portion of the projection 144 in the front/rear direction 8. The through hole 175 communicates portions, of the first communicating channel 171, which are located respectively on the right side and the left side relative to the inner wall 71.

As described later, the second communicating channel 172 also reaches the through hole 175. Thus, a first end of the first communicating channel 171 is communicated with the first ink chamber 131 and a second end of the first communicating channel 171 is communicated with the second communicating channel 172.

Front and rear surfaces (planes) and upper and lower surfaces (planes) of the first communicating channel 171 are defined by the upper wall 104, the inner wall 73, the inner wall 74, the inner wall 75, the inner wall 76 and the inner wall 77. Further, the left surface of the first communicating channel 171 is defined by the inner wall 71. Further, the right surface of the first communicating channel 171 is defined by the film 142.

The second communicating channel 172 is communicated, at a lower end thereof, with the upper surface (virtual plane) of the upper ink chamber 52 of the second ink chamber 132. The second communicating channel 172 extends upwardly from a position at which the second communicating channel 172 is communicated with the upper ink chamber 52, then extends frontwardly, then extends upwardly, then extends frontwardly, and reaches the through hole 175.

As described above, the second end of the first communicating channel 171 reaches the through hole 175. Thus, a first end of the second communicating channel 172 is communicated with the second ink chamber 132 and a second end of the second communicating channel 172 is communicated with the second end of the first communicating channel 171.

Rear and upper surfaces of the second communicating channel 172 are defined by the rear wall 110, the upper wall 104, the rear wall 144B of the projection 144 and the upper wall 144C of the projection 144. Further, front and lower surfaces of the second communicating channel 172 are defined by the inner wall 73 and the inner wall 76. Furthermore, the left surface of the second communicating channel 172 is defined by the inner wall 71, and the right surface of the second communicating channel 172 is defined by the film 142.

The through hole 175 has openings at right and left sides. As depicted in FIG. 6, the right opening of the through hole 175 is communicated with the second end of the first communicating channel 171 and the second end of the second communicating channel 172. As depicted in FIG. 7, the left opening of the through hole 175 is communicated with a left communicating channel 176 of the third communicating channel 173 described below. Namely, the thorough hole 175 allows the ink to flow from the second end of the first communicating channel 171 and the second end of the second communicating channel 172 to the third communicating channel 173 in the left/right direction 9 (an example of a first direction).

As depicted in FIGS. 5 and 7, the third communicating channel 173 is provided with a left (leftward) communicating channel 176, a right (rightward) communicating channel 177 (an example of a connection channel), a rear (rearward) communicating channel 178 and a labyrinth 179 (an example of a labyrinth).

The left communicating channel 176 extends from the through hole 175 (see FIGS. 6 and 7) leftwardly up to the left end of the frame 141. The left communicating channel 176 is communicated with the first communicating channel 171 and the second communicating channel 172 via the through hole 175. The left communicating channel 176 is communicated with the right communicating channel 177 via an opening 180. The opening 180 is formed by cutting out a left lower end portion of the inner wall 78 rightwardly from a left end thereof. The opening 180 is defined by the inner wall 78, the inner wall 152 and the film 143.

A front surface of the left communicating channel 176 is defined by the inner wall 78; rear and lower surfaces of the left communicating channel 176 are defined by the inner wall 152; an upper surface of the left communicating channel 176 is defined by the upper wall 144C of the projection 144; and a left surface of the left communicating channel 176 is defined by the film 143.

The right communicating channel 177 extends from the opening 180 rightwardly up to the right end of the frame 141. As depicted in FIGS. 4, 6 and 7, the portion, in the inner wall 71, in which the right communicating channel 177 is formed, is formed with an opening 181. Portions, in the right communicating channel 177, which are located respectively on the left side and the right side relative to the inner wall 71 are communicated with each other by the opening 181.

As depicted in FIG. 4, a surrounding wall 182 is projected rightwardly from a peripheral or circumferential edge portion, in the inner wall 71, which surrounds the opening 181. A lower inner surface 182A of the surrounding wall 182 is inclined such that a right end of the lower inner surface 182A is located at a position above a left end of the lower inner surface 182A. A gas-liquid separating membrane 183 (see FIG. 4) is attached to a projection forward end surface of the surrounding wall 182, namely the right surface of the surrounding wall 182. With this, the right communicating channel 177 is blocked (closed) by the gas-liquid separating membrane 183.

The gas-liquid separating membrane 183 is a porous membrane (film) having minute (fine) holes which shut off passing of the ink therethrough and allow a gas to pass therethrough. For example, the gas-liquid separating membrane 183 is formed of a fluoro resin such as polytetrafluoroethylene, polychlorotrifluoro-ethylene, a tetrafluoroethylene-hexafluoropropylene copolymer, a tetrafluororethyelen-perfluoro alkylvinylether copolymer, a tetrafluoroethylene-ethylene copolymer, etc.

The lower inner surface 182A (an example of an adjacent surface) of the surrounding wall 182 is adjacent to the gas-liquid separating membrane 183 on the left side of the gas-liquid separating membrane 183. Namely, the lower inner surface 182A is adjacent to the gas-liquid separating membrane 183 such that the lower inner surface 182A is positioned closer to the second communicating channel 172 than the gas-liquid separating membrane 183. The lower inner surface 182A defines a part of a lower end of the right communicating channel 177. The lower inner surface 182A is inclined such that a right end of the lower inner surface 182A is located at a position above a left end of the lower inner surface 182A. The right end of the lower inner surface 182A is closer to the gas-liquid separating membrane 183 than the left end of the lower inner surface 182A. Thus, the lower inner surface 182A is inclined to the left/right direction 9 such that a part close to the gas-liquid separating membrane 183 is located at a position above a part away from the gas-liquid separating membrane 183.

The gas-liquid separating membrane 183 depicted in FIG. 4 is attached to the surrounding wall 182. As depicted in FIG. 6, the surrounding wall 182 is positioned in front of the through hole 175. Namely, the gas-liquid separating membrane 183 is provided at a position different from that of the through hole 175 in the front/rear direction 8 (an example of a second direction).

As depicted in FIGS. 5 and 7, front and lower surfaces of a left-side portion, of the right communicating channel 177 which is located on the left side relative to the inner wall 71, are defined by the inner wall 152; a rear surface of the left-side portion is defined by the inner wall 78; an upper surface of the left-side portion is defined by the upper wall 144C of the projection 144; a portion, in a right surface of the left-side portion, which is different from the opening 181, is defined by the inner wall 71 (see FIG. 6); and a left surface of the left-side portion is defined by the film 143.

Further, as depicted in FIGS. 4 and 6, a front surface of a right-side portion, of the right communicating channel 177 which is located on the right side relative to the inner wall 71, is defined by the front wall 144A of the projection 144; a lower surface of the right-side portion is defined by the inner wall 77 and the lower inner surface 182A of the surrounding wall 182; a rear surface of the right-side portion is defined by the inner wall 78; an upper surface of the right-side portion is defined by the upper wall 144C of the projection 144; a portion, in a left surface of the right-side portion, which is different from the opening 181 is defined by the inner wall 71; and a right surface of the right-side portion is defined by the film 142.

As depicted in FIGS. 5 and 7, the rear communicating channel 178 is communicated with the right-side portion, of the right communicating channel 177, which is located on the right side relative to the inner wall 71, via an opening 184 (see FIGS. 6 and 7) formed between the front wall 144A of the projection 144 and the inner wall 71. The rear communicating channel 178 extends leftwardly from the opening 184, then extends rearwardly, and reaches the labyrinth 179 via an opening 185 formed between the inner wall 151 and the inner wall 152.

Lower and front surfaces of the rear communicating channel 178 are defined by the inner wall 151 and the front wall 144A of the projection 144; rear and upper surfaces of the rear communicating channel 178 are defined by the inner wall 152; a right surface of the rear communicating channel 178 is defined by the inner wall 71; and a left surface of the rear communicating channel 178 is defined by the film 143.

The labyrinth 179 is formed by arranging a plurality of pieces of a partition wall 186, which extend in the up/down direction 7, side by side in the front/rear direction 8 such that the labyrinth 179 is provided as a communicating channel extending along the front/rear direction 8 while repeating U-turns in the up/down direction 7. An end (front lower end) of the labyrinth 179 is communicated with the rear communicating channel 178 via the opening 185; the other end (rear upper end) of the labyrinth 179 is communicated with an atmosphere open port 187 (see FIG. 5).

The atmosphere open port 187 is constructed as a hole penetrating through the upper wall 144C of the projection 144 in the up/down direction 7. The lower end of the atmosphere open port 187 is communicated with the labyrinth 179. The upper end of the atmosphere open port 187 is communicated with the outside of the ink tank 100. In the state that the ink tank 100 is in the usable posture and under the condition that the maximum amount of the ink which is storable in the ink tank 100 in the usable posture is stored in the ink chamber 111, the atmosphere open port 187 is located at a positon above the liquid surface of the maximum amount of the ink.

As described above, the one end of the third communicating channel 173 is communicated with the other end of the first communicating channel 171 and the other end of the second communicating channel 172 via the through hole 175. The other end of the third communicating channel 173 is communicated with outside of the ink tank 100 via the atmosphere open port 187.

As described above, the atmosphere communicating channel is communicated with the first ink chamber 131 of the ink chamber 111 at the opening 174, and is communicated with the second ink chamber 132 of the ink chamber 111 at the lower end of the second communicating channel 172, as depicted in FIG. 4. On the other hand, the atmosphere communicating channel is communicated with the outside of the ink tank 100 at the atmosphere open port 187, as depicted in FIG. 5.

<Ink Tank 100B>

Figure 8:
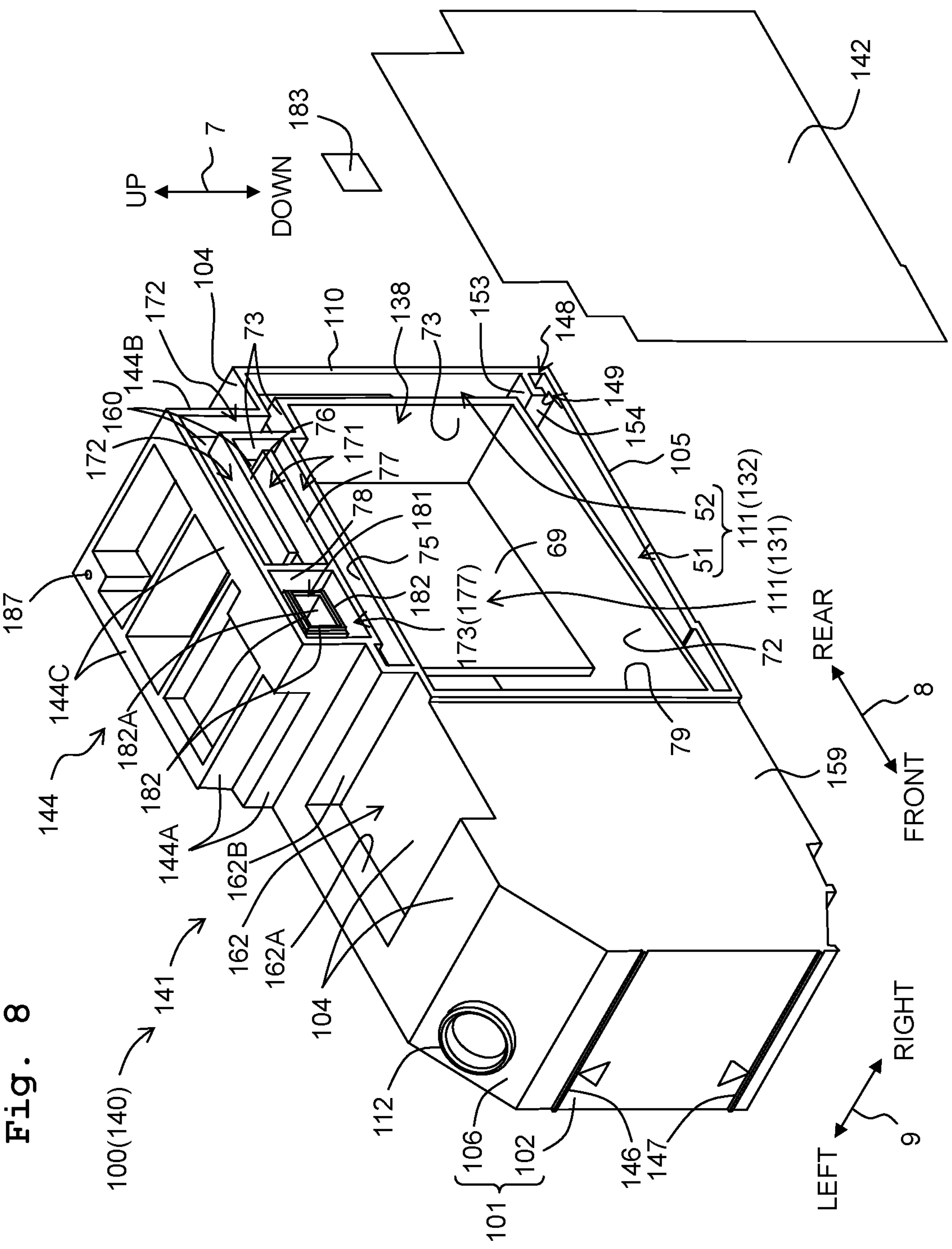
FIG. 8 is a front perspective view of an ink tank 100B.
Figure 9:
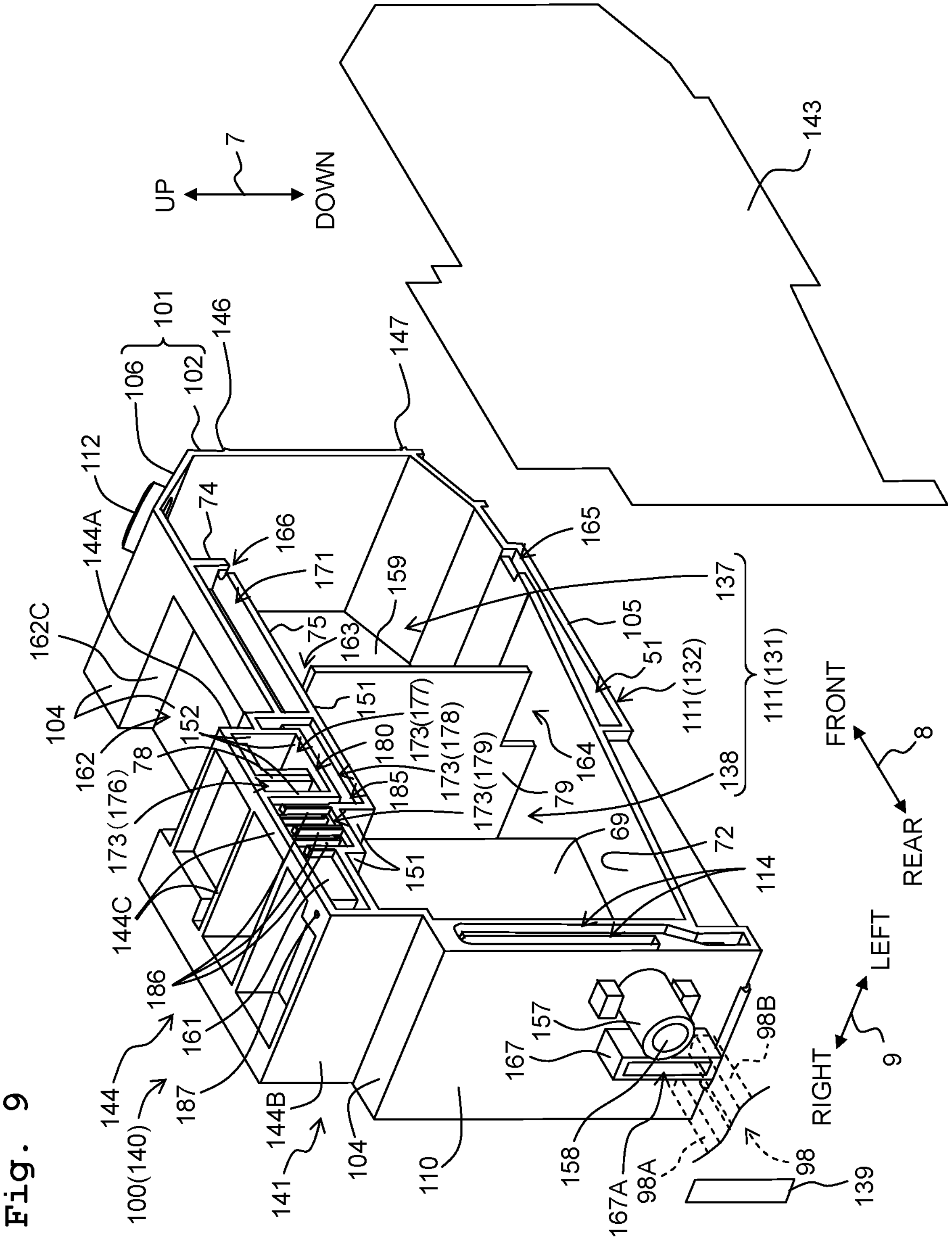
FIG. 9 is a rear perspective view of the ink tank 100B.

In the following, the configuration of the ink tank 100B will be explained with reference to FIGS. 8 to 11. As depicted in FIGS. 8 and 9, the ink tank 100B has a length in the left/right direction 9 which is longer than those of the ink tanks 100Y, 100C and 100M (see FIGS. 4 and 5).

In the following, regarding the ink tank 100B, an explanation will be given about the difference between the ink tank 100B and the ink tanks 100Y, 100C and 100M. Note that regarding a configuration, a portion, a part, a component, etc., of the ink tank 100B which is (are) same as that of each of the ink tanks 100Y, 100C and 100M, a same reference sign or numeral in FIGS. 4 to 7 is assigned to the configuration, etc., of the ink tank 100B that is same as those of the ink tanks 100Y, 100C and 100M, and any explanation therefor will be omitted. Further, in a case that the difference between the configuration of a predetermined (certain) portion or part of the ink tank 100B and those of the ink tanks 100Y, 100M and 100C corresponding thereto is only the point that the configuration of the predetermined portion or part of the ink tank 100B is longer in the left/right direction 9 than those of the ink tanks 100Y, 100M and 100C, then a same reference sign or numeral in FIGS. 4 to 7 is assigned to the configuration of the predetermined portion or part of the ink tank 100B, and any explanation therefor will be omitted.

As depicted in FIGS. 8 and 9, the cashing 140 of the ink tank 100B is provided with a frame 141, and three films 139, 142 and 143.

Figure 10:
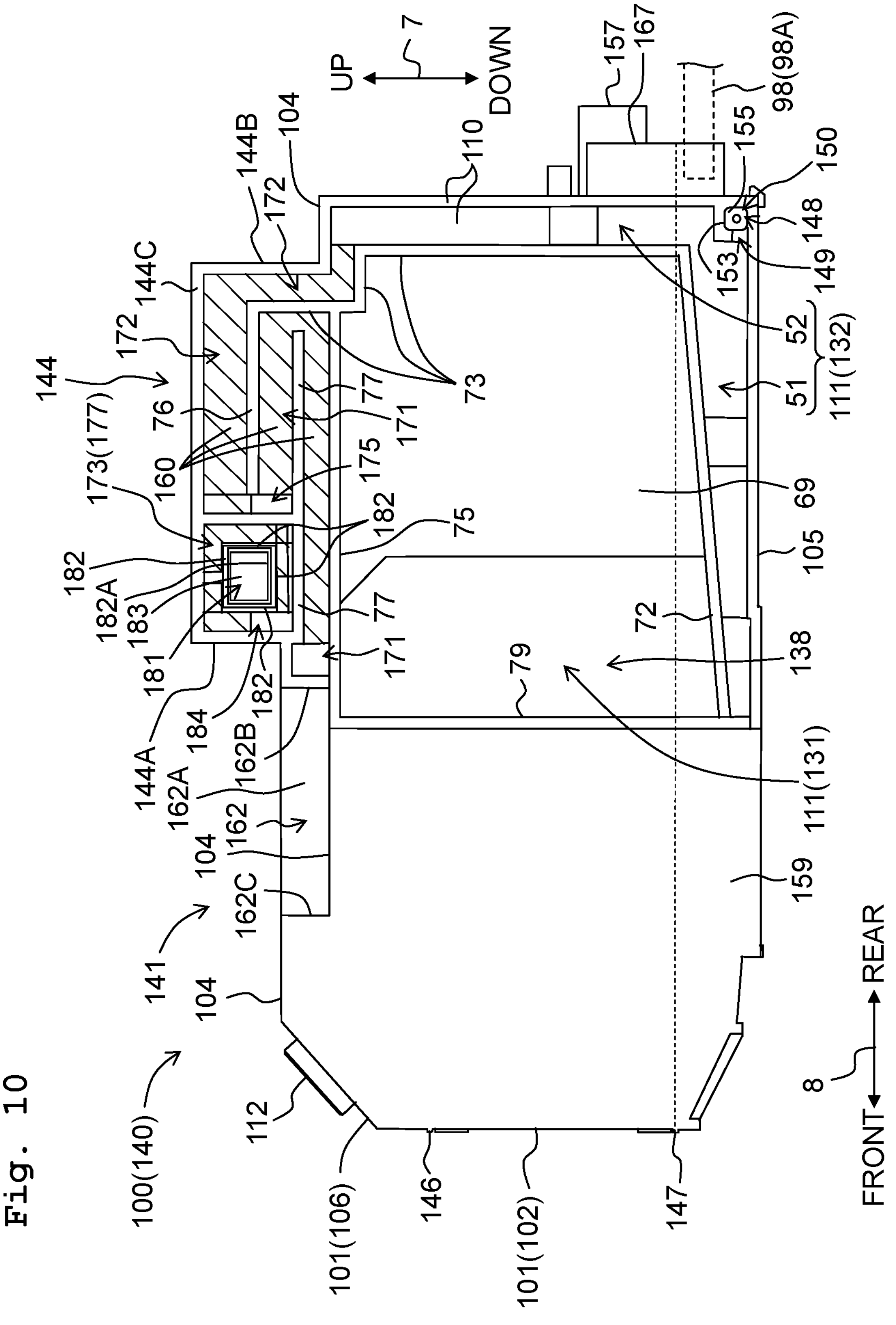
FIG. 10 is a right side view of the ink tank 100B.

As depicted in FIGS. 8 and 10, the ink tank 100B is not provided with the left wall 103 (see FIG. 5) which is provided on each of the ink tanks 100Y, 100C and 100M, but the ink tank 100B is provided with a right wall 159. The right wall 159 is a wall extending rearwardly from a right end of the front wall 101. An upper end of the right wall 159 is connected to a front portion of the upper wall 104. A lower end of the right wall 159 is connected to a front portion of the lower wall 105. In other words, the right wall 159 is a wall connecting the right end of the front wall 101, the front right end of the upper wall 104 and the front right end of the lower wall 105. Namely, the right wall 159 is provided only on the front portion of the frame 141, but is not provided on the rear portion of the frame 141.

As depicted in FIGS. 8 and 9, a recessed portion 162 is formed in a front portion of the upper wall 104. The recessed portion 162 is defined by a side wall 162A, a side wall 162B, a side wall 162C and the upper wall 104.

The ink tank 100B is not provided with the inner wall 71 (see FIG. 6). The ink tank 100B is provided with an inner wall 160 (see FIGS. 8 and 10) and an inner wall 161 (see FIGS. 9 and 11), as the walls corresponding to the inner wall 71 (see FIG. 6).

The inner wall 160 and the inner wall 161 extend downwardly from the upper wall 104 and the upper wall 144C of the projection 144. Each of the inner wall 160 and the inner wall 161 is a wall expanding in the up/down direction 7 and the front/rear direction 8.

The inner wall 160 is provided in a hatched area as indicated in FIG. 10. The inner wall 160 is arranged, in the left/right direction 9, at any positon between the right end and the left end of the frame 141. For example, the inner wall 160 is arranged at a portion closer to the right side of the frame 141 in the left/right direction 9, than a central portion of the frame 141 in the left/right direction 9.

Figure 11:
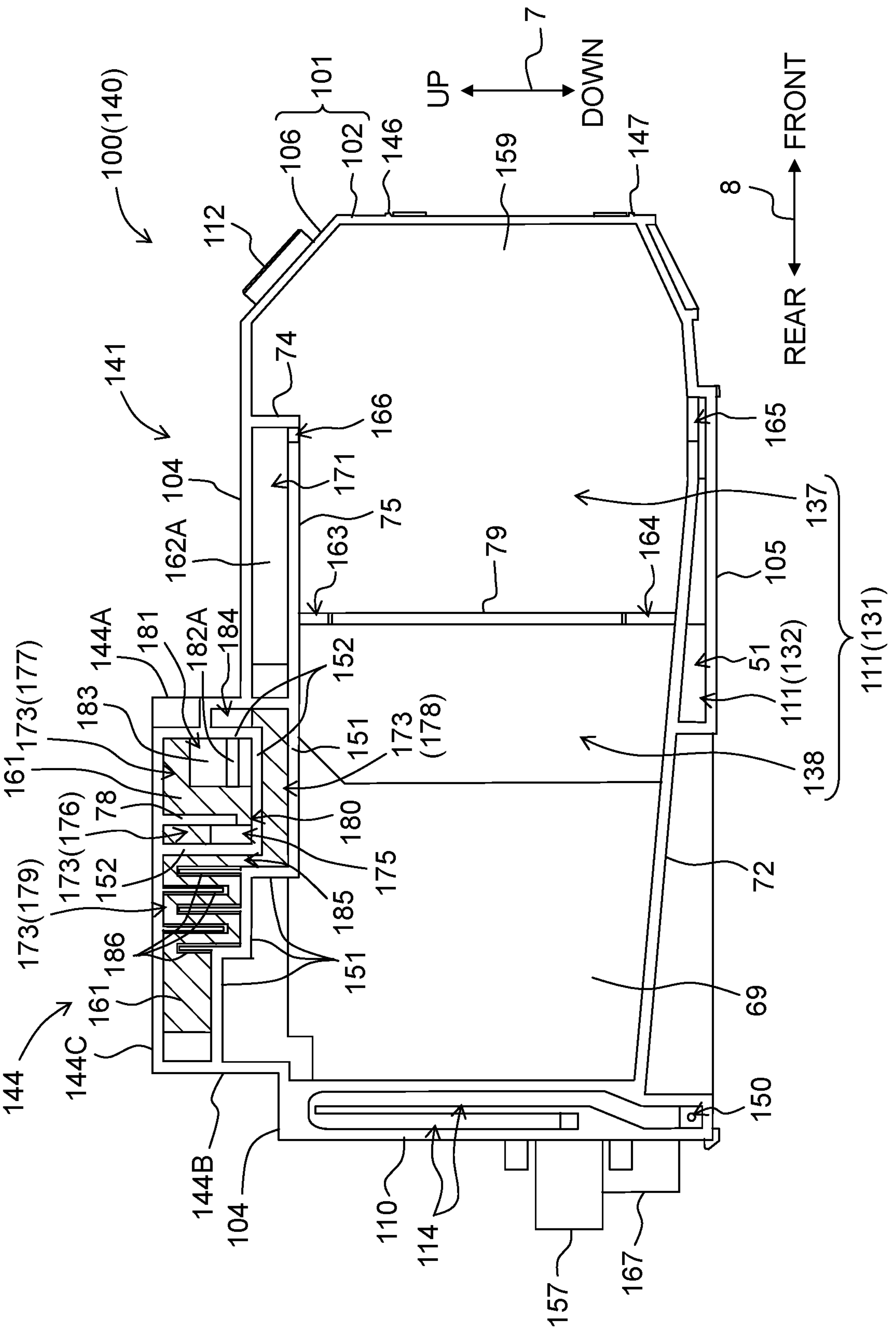
FIG. 11 is a left side view of the ink tank 100B.

The inner wall 161 is provided in a hatched area as indicated in FIG. 11. The inner wall 161 is arranged, in the left/right direction 9, at any positon which is between the right end and the left end of the frame 141 and which is on the left side relative to the inner wall 160. For example, the inner wall 161 is arranged at a portion closer to the left side of the frame 141 in the left/right direction 9, than the central portion of the frame 141 in the left/right direction 9.

As depicted in FIGS. 8 and 10, a portion of the inner wall 73 which is located above the inner wall 75, the inner wall 75, the inner wall 76 and the inner wall 77 extend rightwardly from the inner wall 160. Namely, the portion of the inner wall 73 which is located above the inner wall 75, the inner wall 75, the inner wall 76 and the inner wall 77 are arranged on the right side relative to the inner wall 160.

As depicted in FIGS. 9 and 11, the inner wall 74 and a portion of the inner wall 75 which is located to be closer to the inner wall 74 extend leftwardly from the side wall 162A. Namely, the inner wall 74 and the portion of the inner wall 75 which is located to be closer to the inner wall 74 are arranged on the left side relative to the side wall 162A.

As depicted in FIGS. 8 and 9, the inner wall 74 extends downwardly from the front portion of the upper wall 104. The inner wall 74 is not connected to the inner wall 160 and the inner wall 161, and is connected to the side wall 162A.

The inner wall 75 is projected rearwardly from the lower end of the inner wall 74 and extends in the left/right direction 9. A rear end of a left end portion of the inner wall 75 is connected to the inner wall 151. A right end portion of the inner wall 75 extends rearwardly as depicted in FIG. 8. In this rearwardly-extending portion, of the right end portion of the inner wall 75, which extends rearwardly, the inner wall 75 extends rightwardly from the inner wall 160. A rear end of the rearwardly-extending portion of the inner wall 75 is connected to the inner wall 73. Next, as depicted in FIGS. 8 and 10, the inner wall 75 extends rearwardly. In this rearwardly-extending portion, the inner wall 75 extends rightwardly from the inner wall 160.

The right end of the inner wall 79 is connected to the right wall 159.

As depicted in FIGS. 9 and 11, the inner wall 151 is a wall connecting the lower end of the front wall 144A of the projection 144 and the rear wall 144B of the projection 144. The inner wall 151 extends rearwardly from the lower end of the front wall 144A, then extends upwardly, then extends rearwardly, then extends upwardly, then extends rearwardly, and reaches the rear wall 144B.

As depicted in FIG. 8, the rear portion of the right surface of the frame 141 is opened or uncovered. By fixing the film 142 by welding to right surfaces of the lower wall 105, the rear wall 110, the upper wall 104, the inner walls 72 to 79, the front wall 144A of the projection 144, the rear wall 144B of the projection 144 and the upper wall 144C of the projection 144, the right surface of the frame 141 is sealed.

As depicted in FIG. 9, the left surface of the frame 141 is opened or uncovered. By fixing the film 143 by welding to left surfaces of the rear wall 110, the upper wall 104, the lower wall 105, the inner walls 72, 74, 75, 78, 79, 151 and 152, the front wall 144A of the projection 144, the rear wall 144B of the projection 144, the upper wall 144C of the projection 144 and the partition walls 186, the left surface of the frame 141 is sealed.

As depicted in FIGS. 8 and 9, the first ink chamber 131 is defined by the front wall 101, the right wall 159, the lower wall 105, the rear wall 110, the inner walls 72, 73, 74 and 75, the upper wall 104, the inner wall 151, the film 142 and the film 143. The right wall 159 and the film 142 define the right surface of the first ink chamber 131.

As depicted in FIG. 9, the upper end portion of the inner wall 79 is cut out rightwardly from the left end of the upper end portion. With this, an opening 163 is formed in the upper end portion of the inner wall 79. The opening 163 is defined by the inner wall 79, the inner wall 75 and the film 143. The lower end portion of the inner wall 79 is cut out rightwardly from the left end of the lower end portion. With this, an opening 164 is formed in the lower end portion of the inner wall 79. The opening 164 is defined by the inner wall 79, the inner wall 72 and the film 143. The front ink chamber 137 and the rear ink chamber 138 are communicated with each other by the openings 163 and 164.

The front end portion of the inner wall 72 is cut out rightwardly from the left end of the front end portion. With this, an opening 165 is formed in the front end portion of the inner wall 72. The opening 165 is defined by the inner wall 72, the lower wall 105 and the film 143. The front ink chamber 137 of the first ink chamber 131 and the lower ink chamber 51 of the second ink chamber 132 are communicated with each other by the opening 165.

As depicted in FIGS. 8 and 10, the first communicating channel 171 and the second communicating channel 172 are located on the right side relative to the inner wall 160. As depicted in FIGS. 8 to 11, the third communicating channel 173 is located both on the right and left side relative to the inner wall 160.

As depicted in FIG. 9, the first communicating channel 171 is communicated with the front ink chamber 137 of the first ink chamber 131 via an opening 166. The opening 166 is formed by cutting out a left front end portion of the inner wall 75 rightwardly from a left end of the left front end portion. The opening 166 is defined by the inner wall 75, the inner wall 74 and the film 143.

The first communicating channel 171 extends rightwardly from the opening 166. Then, as depicted in FIG. 8, the first communicating channel 171 extends rearwardly, then extends frontwardly to as to make a U-turn, and reaches a through hole 175 (see FIG. 10). The through hole 175 is a hole penetrating through the inner wall 160 and the inner wall 161 in the left/right direction 9, and connecting the first and second communicating channels 171 and 172 with the third communicating channel 173.

As depicted in FIG. 9, a portion, of the first communicating channel 171, which extends rightwardly from the opening 166 is defined by the inner wall 74, the upper wall 104, the inner wall 75, the front wall 144A of the projection 144, and the film 143. As depicted in FIG. 8, a portion, of the first communicating channel 171, which extends rearwardly is defined by the inner walls 71, 73, 74, 75, 76 and 77, and the film 142.

As depicted in FIG. 9, the frame 141 is provided with a projection 167 which is projected rearwardly from the rear wall 110. The projection 167 is irradiated with a light by an optical sensor 98 (to be described later on) to thereby detect the height of the liquid surface of the ink stored in the ink chamber 111 of the ink tank 100 in the usable posture. The projection 167 has a rectangular parallelepiped shape. The projection 167 has an internal space 167A, and a front end and a rear end of the projection 167 are opened (uncovered). The front end of the internal space 167A of the projection 167 is communicated with the upper ink chamber 52 of the second ink chamber 132. Namely, the internal space 167A is provided on the second ink chamber 132. The rear end of the internal space 167A of the projection 167 is opened. The film 139 is attached to the opened rear end of the internal space 167A of the projection 167. With this, the opened rear end of the internal space 167A of the projection 167 is blocked (closed) by the film 139.

In a horizontal cross section, of the ink tank 100, at a height not more than the upper end of the internal space 167A of the projection 167 and not less than the lower end of the internal space 167A, the cross section of the second ink chamber 132 in a case that the horizontal cross section is seen from thereabove is smaller than the cross section of the first ink chamber 131 in the case that the horizontal cross section is seen from thereabove. Further, the internal space 167A of the projection 167 is communicated with the second ink chamber 132 having the small cross section.

Note that in this embodiment, although the internal space 167A of the projection 167 is communicated with the second ink chamber 132, it is allowable that the internal space 167A is communicated with the first ink chamber 131. Namely, the internal space 167A may be provided on the first ink chamber 131. In such a case, the projection 167 may be projected, for example, from the front wall 101 or the left wall 103.

Further, in the embodiment, the projection 167 is provided only on the ink tank 100B, among the ink tanks 100B, 100Y, 100C and 100M. It is allowable, however, that the projection 167 is provided on at least one of the ink tanks 100B, 100Y, 100C and 100M.

<Optical Sensor 98>

The printer unit 11 is provided with an optical sensor 98. The optical sensor 98 is attached to the casing 141. As indicated by a broken line in FIG. 9, the optical sensor 98 is located on the right and left sides of the projection 167 of the frame 141 of the ink tank 100B, in a state that the tank set 99 is stationarily provided in the inside of the casing 14.

The optical sensor 98 is provided with a light emitting section 98A and a light receiving section 98B. The light emitting section 98A and the light receiving section 98B are arranged to sandwich the projection 167 therebetween in the left/right direction 9. The light emitting section 98A is located on the right side relative to the projection 197. The light receiving section 98B is located on the left side relative to the projection 167. Note that the arrangement positions of the light emitting section 98A and the light receiving section 98B may be opposite, regarding the left/right direction 9, to the above-described arrangement positions.

The arrangement positions in the up/down direction 7 of the light projecting section 98A and the light receiving section 98B are determined such that each of a light irradiating position, in the light emitting section 98A, at which the light is emitted by the light emitting section 98A toward the light receiving section 98B, and a light receiving position, in the light receiving section 98B, at which the light emitted by the light emitting section 98A is received by the light receiving section 98B, has a height not more than the second line 147. As depicted in FIG. 10, in the embodiment, the optical sensor 98 is located at a position below the second line 147. Namely, a height of the position, in the projection 167, which corresponds to the optical path of the light irradiated from the optical sensor 98 is at a position lower than a broken line indicated in FIG. 10. Here, the broken line indicates the liquid surface of the minimum storing amount, of the ink, which is an amount of the ink requiring supplement of the ink in the ink tank 100 in the usable posture. As described above, the position in the up/down direction 7 of the projection 167 includes a position below the second line 147.

The optical sensor 98 is electrically connected to the controller (not depicted in the drawings) of the multi-function peripheral 10, via an electric circuit.

The light is irradiated from the light emitting section 98A toward the light receiving section 98B. The irradiated light passes through the projection 167 and enters into the internal space 167A of the projection 167. In a case that the liquid surface of the ink stored in the internal space 167A is located above the optical path of the irradiated light, the light is blocked (shielded) by the ink stored in the internal space 167A and does not reach the light receiving section 98B. This causes the optical sensor 98 to output a low level signal to the controller. On the other hand, in a case that the liquid surface of the ink is located below the optical path, the light advances in the air in the internal space 167A. In such a case, the light passes through the internal space 167A and reaches the light receiving section 98B. This causes the optical sensor 98 to output a high level signal to the controller.

In a case that the signal from the optical sensor 98 is the low level signal, the controller determines that the liquid surface of the ink stored in the ink chamber 111 is higher than the second line 147; in a case that the signal from the optical sensor 98 is the high level signal, the controller determines that the liquid surface of the ink stored in the ink chamber 111 is lower than the second line 147.

<Inlet Port 112>

As depicted in FIGS. 1A and 1B, the inclined walls 106 of the respective ink tanks 100B, 100Y, 100C and 100M are provided with inlet ports 112B, 112Y, 112C, and 112M via which the inks are allowed to flow into the first ink chambers 131 of the ink chambers 111, respectively. In the following, the inlet ports 112B, 112Y, 112C and 112M are collectively referred to as "inlet port(s) 112" in some cases. The inlet port 112 (an example of a liquid inlet port) penetrates through the inclined wall 106 in a direction of the thickness of the inclined wall 106, and makes the corresponding ink chamber 131 communicate with the outside of the ink tank 100. The inner surface of the inclined wall 106 faces (is opposite to) the front ink chamber 137 of the first ink chamber 131. The outer surface of the inclined wall 106 faces the outside of the ink tank 100. Accordingly, the inlet port 112 communicates the first ink chamber 131 directly with the outside of the ink tank 100. Namely, in the embodiment, the inlet port 112 is provided on one of the first and second ink chambers 131 and 132 on which the projection 167 is not provided. Note that the inlet port 112 may be configured to allow the ink to pour into the second ink chamber 132.

The inclined wall 106 and the inlet port 112 provided on the inclined wall 106 are exposed to the outside of the multi-function peripheral 10, via the opening 22, by positioning the cover 70 at the opened position. In the present embodiment, the posture of the ink tank 100 when the ink can be poured into the first ink chamber 131 through the inlet port 112 (pouring posture, refilling posture) coincides with the posture of the ink tank 100 when the ink tank 100 (and consequently, the multi-function peripheral 10 as well) is in the usable posture. Namely, when the ink tank 100 (and consequently, the multi-function peripheral 10 as well) is in the usable posture, the ink is poured or refilled into the first ink chamber 131 through the inlet port 112.

<Cap 113>

As depicted in FIGS. 1A and 1B, the ink tank 100 has a cap 113 (caps 113B, 113Y, 133C and 113M) which is attachable and detachable (removable) with respect to the inclined wall 106 so as to close (block) the inlet port 112. The cap 113 is provided as four caps 113B, 113Y, 133C and 113M corresponding to the four inlet ports 112B, 112Y, 122C and 122M of the ink tank 100. In the following, the caps 113B, 113Y, 113C and 113M are collectively referred to as "cap(s) 113" in some cases. As depicted in FIG. 1A, the cap 113 attached to the inclined wall 106 makes tight contact with a wall surface defining the circumferential edge of the inlet 112 to thereby close (clog) the inlet port 112. On the other hand, as depicted in FIG. 1B, the cap 113 removed (detached) from the inclined wall 106 releases (opens) the inlet port 112. The cap 113 is attached and detached with respect to the inclined wall 106 in a state that the cover 70 is located at the opened position. Further, by removing the cap 113 from the inlet port 112, the ink can be poured into the ink chamber 111 via the inlet port 112.

<Cover 70>

As depicted in FIGS. 1A and 1B, the cover 70 is provided such that the cover 70 is capable of opening and closing the opening 22 formed in the front wall 14A of the casing 14. The cover 70 is configured to be pivotable (rotatable) about the rotational axis line 70A extending in the left/right direction 9. The cover 70 has an outer shape of which size corresponds to the opening 22, and is box-shaped which is open toward the opening 22. In a case that the cover 70 is rotated to (located at) the closed position, the cover 70 covers the standing wall 102 and the inclined wall 106 of the front wall 101 of the ink tank 100. On the other hand, in a case that the cover 70 is rotated to (located at) the opened position, the cover 70 allows the standing wall 102 and the inclined wall 106 of the front wall 101 of the ink tank 100 to be exposed to the outside of the casing 14.

Second Embodiment

In the following, a second embodiment of the present teaching will be explained. The configuration of an ink tank 1000 of the second embodiment is different from the configuration of the ink tank 100 of the first embodiment. The portions, parts, etc., which are different from The configuration of the ink tank are common to the first embodiment and the second embodiment, and thus any detailed explanation therefor will be omitted. Further, regarding the ink tank 1000 of the second embodiment and the ink tank 100 of the first embodiment, any explanation for any common features in the former and the latter will be omitted, and only the difference between the ink tank 1000 and the ink tank 100 will be explained.

Figure 12:
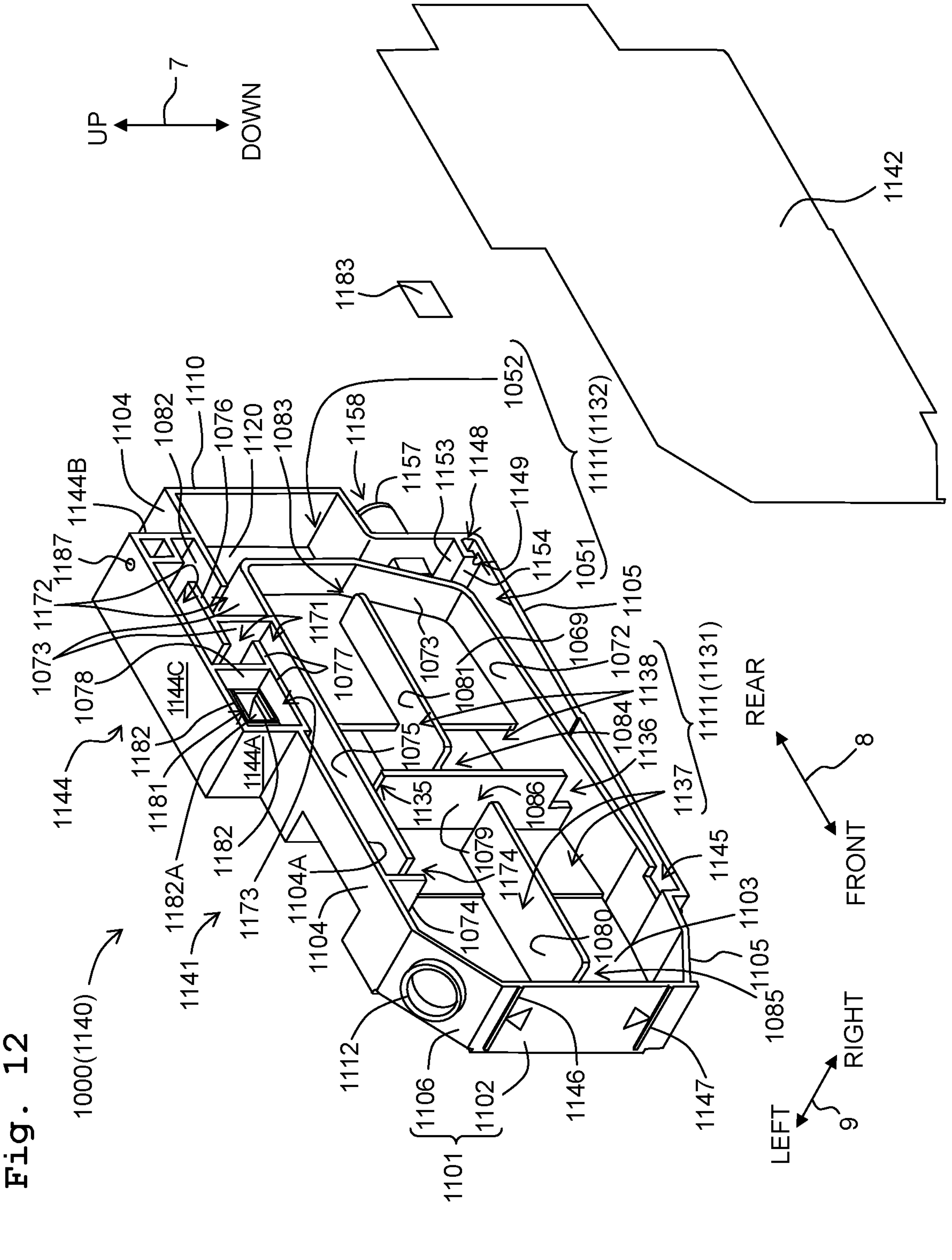
FIG. 12 is a front perspective view of an ink tank 1000.
Figure 13:
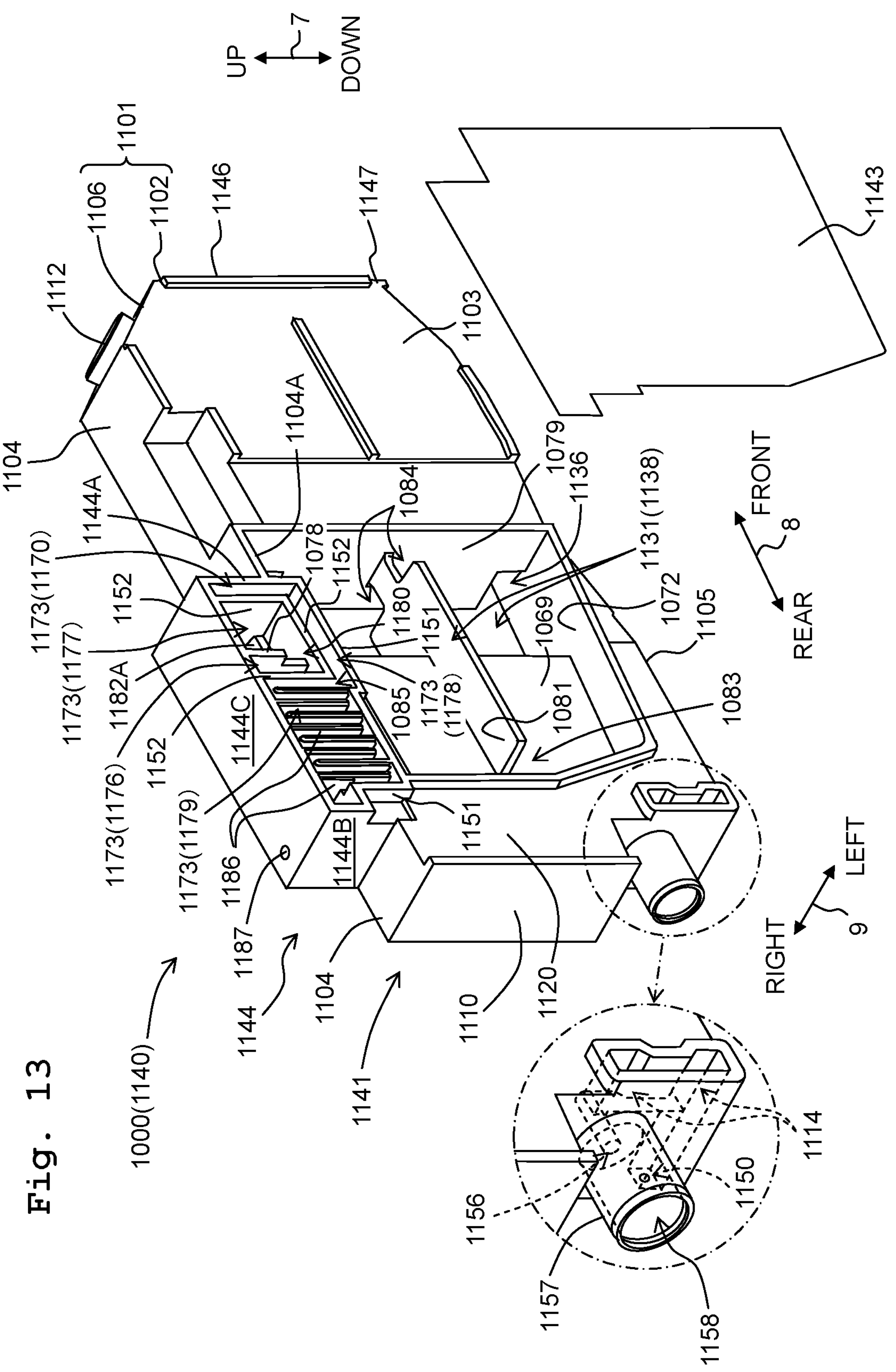
FIG. 13 is a rear perspective view of the ink tank 1000.

As depicted in FIGS. 12 and 13, the ink tank 1000 is constructed of a casing 1140 forming the outer shape of the ink tank. The casing 1140 is provided with a frame 1141, and two films 1142 and 1143. The film 1142 is an example of a first film, and the film 1143 is an example of a second film.

The frame 1141 has, as a whole, a shape that is flat, rectangular parallelepiped in which a size along the left/right direction 9 is short, and sizes along the up/down direction 7 and the front/rear direction 8, respectively, are longer than the size in the left/right direction 9. Further, the size in the front/rear direction 8 is longer than the size in the up/down direction 7. Namely, the ink tank 1000 has a first side along the front/rear direction 8, a second side along the up/down direction 7 and shorter than the first side, and a third side along the left/right direction 9 and shorter than the second side.

The frame 1141 is formed of a resin which has a transparency or translucency to light to such an extent that an ink inside an ink chamber 1111 (to be described later on) can be visible from the outside of the ink tank 1000. The frame 1141 is formed, for example of polypropylene. The frame 1141 is integrally formed by, for example, performing injection molding with a resin material. The rigidity of the frame 1141 is higher than that of the films 1142 and 1143.

Note that the frame 1141 may be formed of a material different from the resin. Further, the frame 1141 may have a configuration in which a plurality of members are combined. For example, it is allowable that a first ink chamber 1131 and a second ink chamber 1132 (to be described later on) are respectively constructed of two casings which are separate from each other, and that these two casings are connected via a tube, etc.

The frame 1141 is provided with a front wall 1101 (an example of a first wall), a left wall 1103, an upper wall 1104, a lower wall 1105, a rear wall 1110 (an example of a second wall), and inner walls 1069, 1071 to 1082 and 1151 to 1155.

The front wall 1101 constructs a front end (an example of a first end) of the ink tank 1000. The front wall 1101 is constructed of a standing wall 1102, and an inclined wall 1106. The standing wall 1102 expands in the up/down direction 7 and the left/right direction 9. The inclined wall 1106 is a wall which connects an upper end of the standing wall 1102 and a front end of the upper wall 1104, and which is inclined with respect to the up/down direction 7 and the front/rear direction 8.

The left wall 1103 constructs a left end of the ink tank 1000. The left wall 1103 is a wall which extends rearwardly (in the rear direction) from a left end of the front wall 1101. An upper end of the left wall 1103 is connected to a front portion of the upper wall 1104. A lower end of the left wall 1103 is connected to a front portion of the lower wall 1105. In other words, the left wall 1103 is a wall which connects a left end of the front wall 1101, a front left end of the upper wall 1104 and a front left end of the lower wall 1105 to one another. Namely, the left wall 1103 is provided only on a front portion of the frame 1141, but is not provided on a rear portion of the frame 1141.

The upper wall 1104 constructs an upper end of the ink tank 1000. The upper wall 1104 extends rearwardly from an upper end of the front wall 1101 (rear end of the inclined wall 1106). A front portion of the upper wall 1104 is connected to the upper end of the left wall 1103. A projection 1144 is formed in the frame 1141 such that the projection 1144 is projected upwardly and expands from a substantially central portion to a rear portion in the front/rear direction 8 of the upper wall 1104. The projection 1144 is provided with a front wall 1144A projected upwardly from the substantially central portion in the front/rear direction 8 of the upper wall 1104, a rear wall 1144B projected upwardly from a rear portion of the upper wall 1104, and an upper wall 1144C connecting an upper end of the front wall 1144A and an upper end of the rear wall 1144B.

The lower wall 1105 constructs a lower end facing the upper end of the ink tank 1000 in the up/down direction 7. The lower wall 1105 is a wall which extends rearwardly from a lower end of the front wall 1101. The lower wall 1105 is formed to be away from the upper wall 1104 to be positioned below the upper wall 1104 in the up/down direction 7. As described above, the front portion of the lower wall 1105 is connected to the lower end of the left wall 1103. A left end portion of the lower wall 1105 is bent upwardly. An upper end of the bent lower wall 1105 is connected to a lower surface of an inner wall 1072 (to be described later on; see FIG. 13).

The rear wall 1110 is formed to be away from the front wall 1101 at a location behind (on the rear side of) the front wall 1101 in the front/rear direction 8. As described above, the upper end of the rear wall 1110 is connected to the rear end of the upper wall 1104. The lower end of the rear wall 1110 is connected to the rear end of the lower wall 1105. A left portion of the rear wall 1110 is formed to be longer in the front/rear direction 8 than a right portion of the rear wall 1110. An ink outflow channel 1114 (to be described later on) is formed in the left portion, of the rear wall 1110, which is formed to be longer than the right portion of the rear wall 1110.

Figure 14:
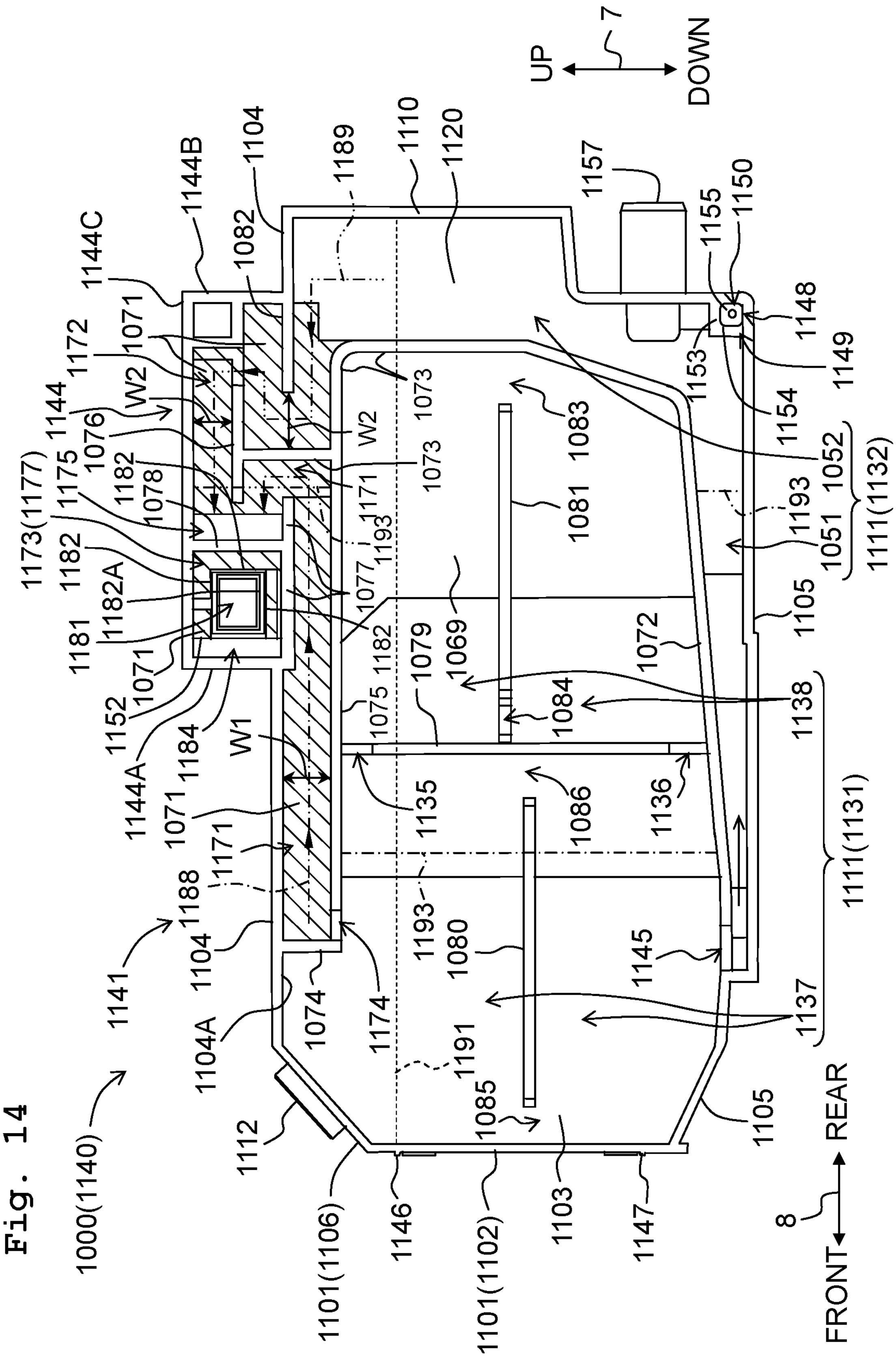
FIG. 14 is a right side view of the ink tank 1000.
Figure 15:
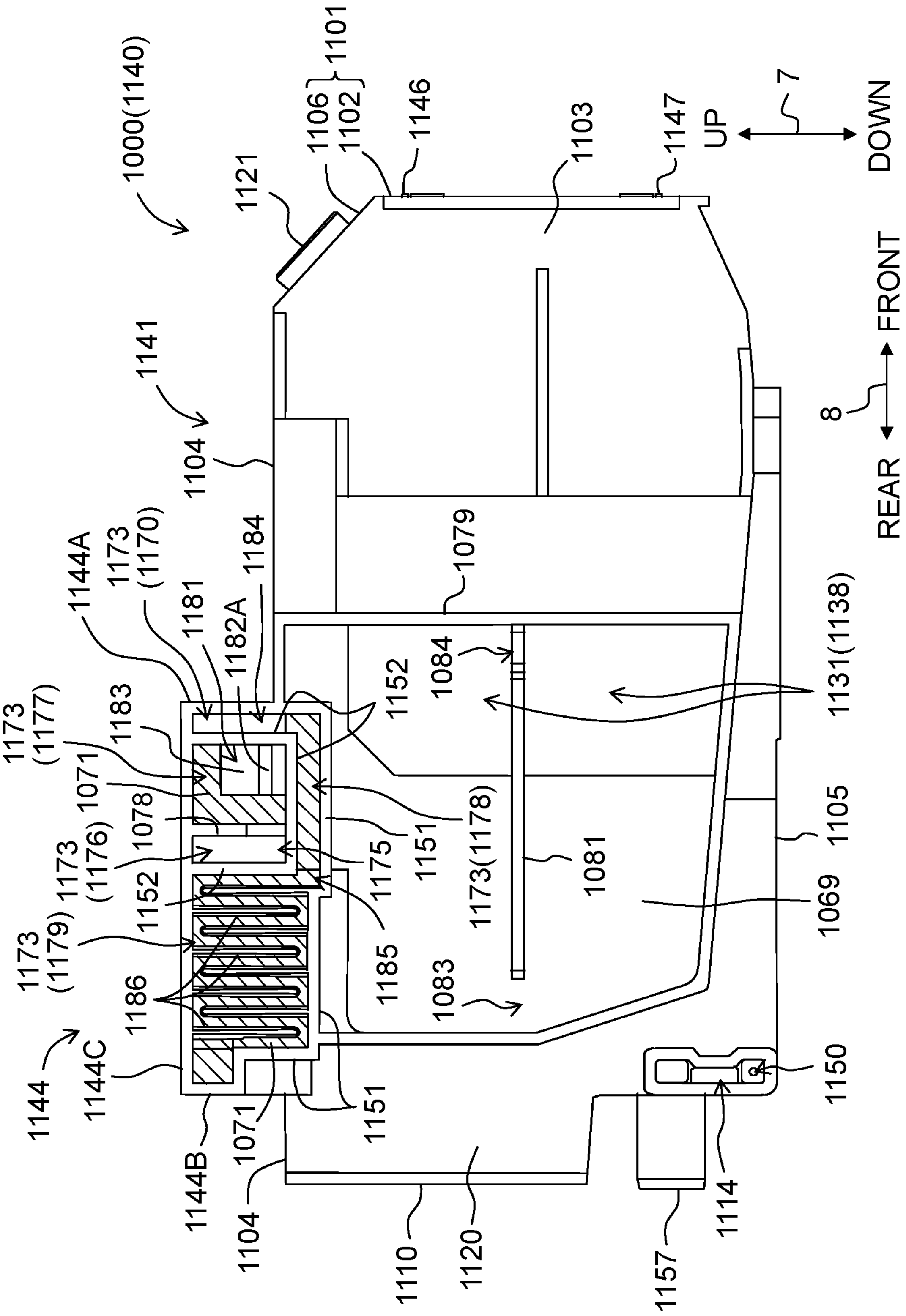
FIG. 15 is a left side view of the ink tank 1000.

As depicted in FIGS. 14 and 15, the inner wall 1071 extends downwardly from the upper wall 1104 and from the upper wall 1144C of the projection 1144. The inner wall 1071 is a wall which expands in the up/down direction 7 and the front/rear direction 8. The inner wall 1071 is provided on a hatched range depicted in FIGS. 14 and 15. The inner wall 1071 is arranged, in the left/right direction 9, at any position between the right and left ends of the frame 1141. With this, the inner portion (inside) of the frame 1141 is divided into left and right portions at the location at which the inner wall 1071 is arranged.

In the embodiment, the inner wall 1071 is located at a position closer to the left side in the left/right direction 9 of the frame 1141 than a central portion in the left/right direction of the frame 1141. Namely, in the left/right direction 9, the distance between the inner wall 1071 and the left end of the frame 1141 is longer than the distance between the inner wall 1071 and the right end of the frame 1141.

Alternatively, the inner wall 1071 may be arranged at a substantially central portion in the left/right direction 9 of the frame 1141 or at a position closer to the right end of the frame 1141 in the left/right direction 9. Note that the inner wall 1071 is arranged at a location which does not include the right end and the left end of the frame 1141, since the inner wall 1071 defines a portion of a communicating channel (to be described later on).

As depicted in FIGS. 12 and 13, the inner wall 1072 is arranged at a location in the vicinity of the lower wall 1105 between the upper wall 1104 and the lower wall 1105 in the up/down direction 7. The inner wall 1072 extends rearwardly from a front end portion to a rear end portion of the lower wall 1105, while being inclined upwardly. A front end of the inner wall 1072 is connected to a location, of the lower wall 1105, closer to the front end portion of the lower wall 1105. A rear end of the inner wall 1072 is located to be on the front side (in front) of the rear wall 1110 and away (separate) from the rear wall 1110.

The inner wall 1073 extends substantially upwardly from a rear end of the inner wall 1072, in the up/down direction 7. The inner wall 1073 extends up to the inside of the projection 1144 while bending so as to conform to the outer shape of the projection 1144. An upper end of the inner wall 1073 is located at a position below (on the lower side of) the upper wall 1144C of the projection 1144 and away from the upper wall 1144C. A portion (a portion located below an inner wall 1075 which is to be described later on) of the inner wall 1073 is provided to span from the right end to the left end of the frame 1141. On the other hand, a remaining portion, of the inner wall 1073, different from the portion, is provided to span from the right end of the frame 1141 to the inner wall 1071.

The inner wall 1069 expands in the up/down direction 7 and the front/rear direction 8. The inner wall 1069 is positioned between the inner wall 1072 and the inner wall 1075 (to be described later on) in the up/down direction 7. The inner wall 1069 is positioned in front of a portion of the inner wall 1073 (the portion, of the inner wall 1073, which is located below the inner wall 1075). The inner wall 1069 is arranged in the frame 1141 at a substantially central portion thereof in the left/right direction 9. With this, a rear ink chamber 1138 of a first ink chamber 1131 (to be described later on) is divided into left and right portions at the location at which the inner wall 1069 is arranged. A lower end of the inner wall 1069 is connected to a rear portion of the inner wall 1072. An upper end of the inner wall 1069 is connected to a rear portion of the inner wall 1075. A rear end of the inner wall 1069 is connected to the portion of the inner wall 1073 (the portion, of the inner wall 1073, which is located below the inner wall 1075).

The inner walls 1074 to 1077 and 1082 to be explained below extend rightwardly from the inner wall 1071 (see FIG. 14). In other words, the inner walls 1074 to 1077 are arranged to span from the inner wall 1071 to the right end of the frame 1141.

As depicted in FIGS. 12 and 14, the inner wall 1074 extends downwardly at a front portion of a lower surface 1104A of the upper wall 1104. A left end of the inner wall 1074 is connected to the left wall 1103, and the rear surface in the front/rear direction 8 of the inner wall 1074 is connected to a front end of the inner wall 1071.

The inner wall 1075 extends rearwardly from a lower end of the inner wall 1074. A rear end of the inner wall 1075 is connected to the inner wall 1073.

The inner wall 1076 extends frontwardly and rearwardly from an upper end of the inner wall 1073. Namely, the inner wall 1076 is located at a position above the inner wall 1075. A front end of the inner wall 1076 is located at a position behind a through hole 1175 (to be described later on).

The inner wall 1077 extends rearwardly from a lower end of the front wall 1144A of the projection 1144. A front portion of the inner wall 1077 is positioned between the upper wall 1144C of the projection 1144 and the inner wall 1075 in the up/down direction 7, and faces each of the upper wall 1144C and the inner wall 1075 in the up/down direction 7. A rear portion of the inner wall 1077 is positioned between the inner wall 1076 and the inner wall 1075, and faces each of the inner wall 1076 and the inner wall 1075 in the up/down direction 7. A rear end of the inner wall 1077 is located in front of a portion of the inner wall 1073 (the portion, of the inner wall 1073, which is located above the inner wall 1075) and away from the inner wall 1073.

The inner wall 1082 is located between the inner wall 1073 and the inner wall 1076 in the up/down direction 7. The inner wall 1082 extends frontwardly from the rear wall 1110, or from a lower end of the rear wall 1144B of the projection 1144. A front end of the inner wall 1082 is located at a position behind (on the rear side of) the portion, of the inner wall 1073 (the portion, of the inner wall 1073, located above the inner wall 1075) and away from the inner wall 1073.

The inner wall 1078 to be explained below extends rightwardly and leftwardly from the inner wall 1071 (see FIGS. 14 and 15). In other words, the inner wall 1078 is arranged to span from the right end to the left end of the frame 1141.

As depicted in FIGS. 12 and 13, the inner wall 1078 expands in the up/down direction 7 and the left/right direction 9. The inner wall 1078 is arranged at a location behind the front wall 1144A of the projection 1144 and away from the front wall 1144A. The inner wall 1078 faces the front end of the inner wall 1076 in the front/rear direction 8, with the through hole 1175 being interposed therebetween. Namely, the inner wall 1078 is arranged between the front wall 1144A and the through hole 1175 in the front/rear direction 8.

The inner wall 1079 expands in the up/down direction 7 and the left/right direction 9. The inner wall 1079 is positioned behind the inner wall 1074 and in front of the inner wall 1069 in the front/rear direction 8. An upper end of the inner wall 1079 is connected to the inner wall 1075. A lower end of the inner wall 1079 is connected to the inner wall 1072. A left end of the inner wall 1079 is connected to the left wall 1103.

The inner wall 1080 expands in the front/rear direction 8 and the left/right direction 9. The inner wall 1080 is located at a position which is behind the standing wall 1102 of the front wall 1101 and which is in front of the inner wall 1079. The inner wall 1080 extends rightwardly from the left wall 1103. At the location at which the inner wall 1080 is arranged, a front ink chamber 1137 of a first ink chamber 1131 (to be described later on) is divided into upper and lower portions in the up/down direction 7. Note that gaps 85 and 86 are formed (defined) in a space between the inner wall 1080 and the standing wall 1102 and in a space between the inner wall 1080 and the inner wall 1079, respectively. With this, the two portions (upper and lower portions) of the front ink chamber 137 which is divided in the up/down direction 7 are communicated with each other.

The inner wall 1081 expands in the front/rear direction 8 and the left/right direction 9. The inner wall 1081 is located at a position which is behind the inner wall 1079 and which is in front of the inner wall 1073. The inner wall 1081 is connected to the inner wall 1069. Further, the inner wall 1081 is connected to the inner wall 1079 at a central portion in the left/right direction 9 thereof. At the location at which the inner wall 1081 is arranged, a rear ink chamber 1138 of the first ink chamber 1131 (to be described later on) is divided into upper and lower portions in the up/down direction 7. Note that an opening 83 is formed (defined) between the inner wall 1081 and the inner wall 1073. Further, the inner wall 1081 has openings 84 which are defined at both ends in the left/right direction 9 of the inner wall 1081, with respect to the inner wall 1079. With this, the two portions (upper and lower portions) of the rear ink chamber 1138 which is divided in the up/down direction 7 are communicated with each other.

The inner walls 1151 and 1152 to be explained below extend leftwardly from the inner wall 1071 (see FIG. 15). In other words, the inner walls 1151 and 1152 are arranged to span from the inner wall 1071 to the left end of the frame 1141.

As depicted in FIGS. 13 and 15, the inner wall 1151 is a wall connecting a lower end of the front wall 1144A of the projection 1144 and the rear wall 1144B of the projection 1144. The inner wall 1151 extends rearwardly from the lower end of the front wall 1144A, then extends upwardly, then extends rearwardly, then extends upwardly, then extends rearwardly, and reaches the rear wall 1144B.

The inner wall 1152 is a wall connecting two locations (portions) of the upper wall 1144C of the projection 1144. The two locations are a front end portion of the upper wall 1144C and a substantially central portion in the front/rear direction 8 of the upper wall 1144C. The inner wall 1152 extends downwardly from the lower surface of the front end portion of the upper wall 1144C, then extends rearwardly, then extends upwardly, and reaches the lower surface of the substantially central portion in the front/rear direction 8 of the upper wall 1144C. The inner wall 1152 is surrounded by the upper wall 1144C and the inner wall 1151 in a side view seeing the ink tank 1000 from the left side thereof.

As depicted in FIG. 12, the right surface of the frame 1141 is open (uncovered, released). By fixing a film 1142 by welding to the right surfaces of the front wall 1101, the lower wall 1105, the rear wall 1110, the upper wall 1104, the inner walls 1072 to 1082, the front wall 1144A of the projection 1144, the rear wall 1144B of the projection 1144 and the upper wall 1144C of the projection 1144, the right surface of the frame 1141 is sealed.

As depicted in FIG. 13, the left surface of the frame 1141 is open (uncovered, released). By fixing a film 1143 by welding to the left surfaces of the rear wall 1110, the upper wall 1104, the inner walls 1072, 1079, 1081, 1151 and 1152, the front wall 1144A of the projection 1144, the rear wall 1144B of the projection 1144, the upper wall 1144C of the projection 1144, and a left surface of a partition wall 1186 (to be described later on), the left surface of the frame 1141 is sealed.

As depicted in FIG. 12, the outer surface (front surface) of the standing wall 1102 of the front wall 1101 is provided with a first line 146 and a second line 147. Since the first and second lines 146 and 147 are same as those in the first embodiment, any explanation therefor will be omitted.

In a case that the execution of printing is continued in the multi-function peripheral 10 while the amount of the ink inside the ink tank 1000 is remained as reduced to be smaller than the minimum amount, there is such a fear that air might be fed from the ink tank 1000 to the ink tube 32, which in turn might cause non-jetting (jetting failure) of the ink in the nozzles 40 of the recording head 39. Accordingly, in the multi-function peripheral 10 in the usable posture, under a condition that the liquid surface of the ink stored in the ink chamber 1111 coincides with the position of the second line 147, the user needs to supplement the ink, to the ink tank 1000, from the inlet port 112 of the ink tank 1000.

<Ink Chamber 1111>

As depicted in FIGS. 12 and 13, the casing 1140 has an ink chamber 1111 in the inside thereof. The ink chamber 1111 is an internal space of the ink tank 1000 and an ink is stored in the ink chamber 1111. The ink chamber 1111 is provided with a first ink chamber 1131 (an example of a first chamber) and a second ink chamber 1132 (an example of a second chamber).

The first ink chamber 1131 is provided with a space to be explained below, and a first communicating channel 1171 of an atmosphere communicating channel which is communicated with this space. The second ink chamber 1132 is provided with a space to be explained below, a second communicating channel 1172 of the atmosphere communicating channel which is communicated with this space, a buffer chamber 1148 and an ink outflow channel 1114. The atmosphere communicating channel, the buffer chamber 1148 and the ink outflow channel 1114 will be described later on.

The first ink chamber 1131 is defined by the front wall 1101, the left wall 1103, the lower wall 1105, the inner wall 1072, the inner wall 1073, the inner wall 1074, the inner wall 1075, the upper wall 1104, the inner wall 1151, the upper wall 1144C of the projection 1144, the film 1142 and the film 1143. The front wall 1101 defines a front surface of the first ink chamber 1131. The lower wall 1105 and the inner wall 1072 define a lower surface of the first ink chamber 1131. The inner wall 1073 defines a rear surface of the first ink chamber 1131. The inner wall 1075, the inner wall 1074 and the upper wall 1104 define an upper surface of the first ink chamber 1131. The film 1142 defines a right surface of the first ink chamber 1131. The left wall 1103 and the film 1143 define a left surface of the first ink chamber 1131.

The first ink chamber 1131 is divided into a front ink chamber 1137 and a rear ink chamber 1138 by the inner wall 1079. The front surface of the inner wall 1079 defines the rear surface of the front ink chamber 1137. The rear surface of the inner wall 1079 defines the front surface of the rear ink chamber 1138. Further, as described above, the front ink chamber 1137 is divided into the two portions (upper and lower portions) by the inner wall 1080. The two portions (upper and lower portions) of the divided front ink chamber 1137 are communicated with each other by the gaps 85 and 86. The rear ink chamber 1138 is divided into the two portions (upper and lower portions) by the inner wall 1081. The two portions (upper and lower portions) of the divided rear ink chamber 1138 are communicated with each other by the openings 83 and 84.

An upper end portion of the inner wall 1079 is cut out leftwardly from the right end of the upper end portion. With this, an opening 1135 is formed in the upper end portion of the inner wall 1079. The opening 1135 is defined by the inner wall 1079, the inner wall 1075 and the film 1142. A lower end portion of the inner wall 1079 is cut out leftwardly from the right end of the lower end portion. With this, an opening 1136 is formed in the lower end portion of the inner wall 1079. The opening 1136 is defined by the inner wall 1079, the inner wall 1072 and the film 1142. The front ink chamber 1137 and the rear ink chamber 1138 are communicated with each other by the openings 1135 and 1136.

As depicted in FIGS. 12 and 14, the second ink chamber 1132 is positioned to be below and behind the first ink chamber 1131. The second ink chamber 1132 has a substantially L-shape in a side view seeing the ink tank 1000 from the left side thereof. The second ink chamber 1132 is provided with a lower ink chamber 1051 and an upper ink chamber 1052. The lower ink chamber 1051 is positioned below the first ink chamber 1131 in the up/down direction 7. The upper ink chamber 1052 extends upwardly from a rear end portion of the lower ink chamber 1051. The upper ink chamber 1052 is positioned behind the rear ink chamber 1138 of the first ink chamber 1131 in the front/rear direction 8.

The lower ink chamber 1051 is defined by the lower wall 1105, the inner wall 1072 and the film 1142. The lower wall 1105 defines the front surface, the lower surface and the left surface of the lower ink chamber 1051. The inner wall 1072 defines the upper surface of the lower ink chamber 1051. The film 1142 defines the right surface of the lower ink chamber 1051. The rear surface of the lower ink chamber 1051 is opened (uncovered or released). In the rear surface, the lower ink chamber 1051 is communicated with the upper ink chamber 1052.

A front end portion of the inner wall 1072 is cut out leftwardly from the right end of the front end portion. With this, an opening 1145 (an example of a communication port) is formed in the front end portion of the inner wall 1072. The opening 1145 is defined by the inner wall 1072, the lower wall 1105 and the film 1142. The front ink chamber 1137 of the first ink chamber 1131 and the lower ink chamber 1051 of the second ink chamber 1132 are communicated with each other by the opening 1145.

The upper ink chamber 1052 is defined by the rear wall 1110, the inner wall 1073 and the film 1142. The rear wall 1110 defines the rear surface and the left surface of the upper ink chamber 1052. The inner wall 1073 defines the front surface of the upper ink chamber 1052. The film 1142 defines the right surface of the upper ink chamber 1052. The lower surface of the upper ink chamber 1052 is opened (uncovered or released). In the lower surface, the upper ink chamber 1052 is communicated with the lower ink chamber 1051.

The upper surface of the upper ink chamber 1052 is opened (uncovered or released). Here, the upper surface is a virtual surface (virtual plane) and is at a height same as the first line 146. Namely, under the condition that the maximum amount of the ink which is storable in the ink tank 1000 in the usable posture is stored in the ink chamber 1111, the upper surface of the upper ink chamber 1052 is at a height which is same as the liquid surface of the maximum amount of the ink. Further, in the upper surface, the upper ink chamber 1052 is communicated with the second communicating channel 172 of the atmosphere communicating channel (to be described later on). Namely, the upper surface is the boundary between the upper ink chamber 1052 and the second communicating channel 172. Note that the position of the boundary is not limited to the above-described positon, and the position of the boundary may be, for example, a position above or below the first line 146.

Accordingly, a right surface (an example of a first surface) of the ink chamber 1111 is defined by a left surface of the film 1142. Namely, the entire right surface of the ink chamber 1111 is configured by the film 1142. A left surface (an example of a second surface) of the ink chamber 1111 is defined by a right surface of the film 1143 and a right surface of the left wall 1103. Namely, the left surface of the ink chamber 1111 is partially configured by the film 1143. The right surface and left surface of the ink chamber 1111 face each other in the left/right direction 9.

The right surface of the ink chamber 1111 may be defined by the film 1142 and the wall. Namely, the right surface of the ink chamber 1111 may be partially configured by the film 1142. The left surface of the ink chamber 1111 may be defined only by the film 1143. Namely, the entire left surface of the ink chamber 1111 may be configured by the film 1143.

In a state that the multi-function peripheral 10 is in the usable posture, in other words that the upper wall 1104 constructs the upper portion of the ink tank 1000 and that the lower wall 1105 constructs the lower portion of the ink tank 1000 and under the condition that the maximum amount of the ink storable in the ink chamber 1111 is stored in the ink chamber 1111, the liquid surface of the ink is at a position indicated by a broken line 1191 in FIG. 14. Namely, as described above, the liquid surface of the ink is at the height same as the first line 1146.

In this situation, the liquid surface of the ink stored in the first ink chamber 1131 is at a vertical height (height in the up/down direction 7) which is same as the liquid surface of the ink stored in the second ink chamber 1132.

Further, in this situation, the liquid surface of the ink in the first ink chamber 1131 and the liquid surface of the ink in the second ink chamber 1132 are formed independently from each other. Specifically, the liquid surface of the ink in the first ink chamber 1131 is surrounded by the front wall 1101, the inner wall 1073, the film 1142, the left wall 1103 and the film 1143. On the other hand, the liquid surface of the ink in the second ink chamber 1132 is surrounded by the rear wall 1110, the inner wall 1073, a left rear wall 1120 and the film 1142. The left rear wall 1120 is a wall connecting a left end of the rear wall 1110 and a left end of the inner wall 1073, and extends frontwardly from the left end of the rear wall 1110.

Note that a case wherein the liquid surface of the ink in the first ink chamber 1131 and the liquid surface of the ink in the second ink chamber 1132 are formed independently from each other is not limited to the case that the maximum amount of the ink, which is storable in the ink chamber 1111, is stored in the ink chamber 1111. For example, the liquid surface of the ink in the first ink chamber 1131 and the liquid surface of the ink in the second ink chamber 1132 are formed independently from each other, also in a such a case that, for example, the ink is stored in the ink chamber 1111 in such an amount that the liquid surface of the ink stored in the ink chamber 1111 is at the height same as the second line 1147. Namely, in the case that the multi-function peripheral 10 is in the usable posture, and under a condition that the ink is stored in both of the ink chambers, namely the first and second ink chambers 1131 and 1132, the liquid surface of the ink in the first ink chamber 1131 and the liquid surface of the ink in the second ink chamber 1132 are formed independently from each other.

Further, even in a case that the multi-function peripheral 10 is not in the usable posture, the liquid surface of the ink in the first ink chamber 1131 and the liquid surface of the ink in the second ink chamber 1132 are formed independently from each other.

For example, in a posture in which the front wall 1101 constructs the upper portion of the ink tank 1000 and the rear wall 1110 constructs the lower portion of the ink tank 1000, under the condition that the maximum amount of the ink which is storable in the ink chamber 1111 is stored in the ink chamber 1111, the liquid surface of the ink is at a position indicated by a dot-dash chain line 193 in FIG. 14. Note that in this situation, the ink is stored separately in the first ink chamber 1131 and the second ink chamber 1132, and thus the liquid surface of the ink, indicated by the dot-dash chain line 193 in FIG. 14, is generated in each of the first and second ink chambers 1131 and 1132.

<Buffer Chamber 1148>

As depicted in FIGS. 12 and 14, the casing 1140 has a buffer chamber 1148 provided therein. The buffer chamber 1148 is an internal space in the ink tank 1000, and is interposed between the second ink chamber 1132 and the ink outflow channel 1114 (to be described later on). Namely, the ink stored in the second ink chamber 1132 flows into the ink outflow channel 1114 via the buffer chamber 1148.

The buffer chamber 1148 is provided on a right rear lower portion of the casing 1140. The buffer chamber 1148 is defined by the inner wall 1153, the inner wall 1154, the inner wall 1155, the lower wall 1105, the rear wall 1110 and the film 1142.

The inner wall 1153 projects frontwardly from a front surface in a right lower portion of the rear wall 1110, and extends in the left/right direction 9. The inner wall 1153 defines the upper surface of the buffer chamber 1148. The inner wall 1154 projects upwardly from an upper surface in a right rear portion of the lower wall 1105, and extends in the left/right direction 9. The inner wall 1154 defines the front surface of the buffer chamber 1148. The inner wall 1155 is a wall which expands in the up/down direction 7 and the front/rear direction 8, and which is surrounded by the inner wall 1153, the inner wall 1154, the rear wall 1110 and the lower wall 1105. The inner wall 1155 defines the left surface of the buffer chamber 1148. The lower wall 1105 defines the lower surface of the buffer chamber 1148. The rear wall 1110 defines the rear surface of the buffer chamber 1148. The film 1142 defines the right surface of the buffer chamber 1148.

A right lower end portion of the inner wall 1154 is cut out leftwardly from the right end of the right lower end portion. With this, an opening 1149 (an example of the liquid outflow port) is formed in the right lower end portion of the inner wall 1154. The opening 1149 is defined by the inner wall 1154 and the film 1142. The opening 1149 communicates a right rear lower portion of the second ink chamber 1132 and the buffer chamber 1148. Note that in the embodiment, although the inner wall 1154 is cut out in a semicircular shape, the shape of the cutout is not limited to the semicircular shape, and may be, for example, a rectangular shape.

A circular-shaped opening 1150 is formed in a central portion of the inner wall 1155. The opening 1150 communicates the buffer chamber 1148 with the ink outflow channel 1114. The ink stored in the second ink chamber 1132 flows into the opening 1150 via the buffer chamber 1148. In other words, the opening 1150 is an ink inflow port via which the ink is allowed to flow from the buffer chamber 1148 into the ink outflow channel 1114. Note that the shape of the opening 1150 is not limited to the circular shape, and may be, for example, a rectangular shape.

<Ink Outflow Channel 1114>

As depicted in FIGS. 13 and 15, the casing 1140 has the ink outflow channel 1114 (an example of a liquid outflow channel). The ink outflow channel 1114 is a communicating channel (path or route) via which the ink stored in the second ink chamber 1132 is allowed to flow to the outside of the ink tank 1000. Note that in the embodiment, since the ink stored in the first ink chamber 1131 is moved to the second ink chamber 1132 via the opening 1145, the ink outflow channel 1114 can be also considered as a communicating channel via which the inks stored in the first ink chamber 1131 and the second ink chamber 1132 are allowed to flow to the outside of the ink tank 1000.

The ink outflow channel 1114 is communicated with the buffer chamber 1148 via the opening 1150. The ink outflow channel 1114 extends leftwardly from the opening 1150, then extends upwardly, then extends rightwardly, and reaches an opening 1156.

The ink outflow channel 1114 is formed as a groove recessed rightwardly from the left surface of the rear wall 1110. A portion, of the ink outflow channel 1114, which is different from a portion of the right surface (plane) and the left surface (plane) of the ink outflow channel 1114, is defined by the rear wall 1110 (specifically, by the lower wall 1115). A surrounding portion, of the right surface of the ink outflow channel 1114, which surrounds the opening 1156 is defined by the inner wall 1155. The left surface of the ink outflow channel 1114 is defined by the film 1143.

The frame 1141 is provided with a cylindrical (tubular) shaped projection 1157. The projection 1157 is projected rearwardly, namely projected toward the outside of the ink tank 1000, from a surrounding portion, of the lower wall 1115 of the rear wall 1110, which surrounds the opening 1156. A front end of an internal space of the projection 1157 is communicated with the ink outflow channel 1114 via the opening 1156. A rear end of the internal space of the projection 1157 is communicated with the outside of the ink tank 1000 via an opening 1158. In the state that the ink tank 1000 is stationarily provided in the inside of the casing 14, the projection 1157 is connected directly, or indirectly, to the ink tube 32. With this, the ink entering into the internal space of the projection 1157 from the ink outflow channel 1114, via the opening 1156, flows out to the ink tube 32.

As described above, the ink stored in the ink chamber 1111 is communicated with the nozzles 40 of the recording head 39 via the ink outflow channel 1114, the internal space of the projection 1157 and via the ink tube 32. Note that it is allowable that the projection 1157 is not directly connected to the ink tube 32. For example, it is allowable that a needle of which one end is connected to the ink tube 32 is provided, and that the other end of the needle is inserted into the projection 1157. In a case that ink droplets of the ink are jetted from the recording head 39 and thereby the ink is consumed, the ink inside the ink outflow channel 1114 becomes movable toward the recording head 39.

Here, the ink outflow channel 1114 is a flow channel or channel. The term “channel” or “flow channel” means such a space that one end of the space is connected to the ink chamber 1111; and in a case that the other end of the space is closed (blocked), the ink stored in the ink chamber 1111 does not flow into this space, regardless of the posture of the ink tank 1000. In the embodiment, the ink tank 1000 is provided with only the ink outflow channel 1114 as the channel. However, it is allowable that the ink tank 1000 is provided also with a channel which is different from the ink flow channel 1114.

A detailed explanation will be given below. As described above, the tube extending from the cap, of the maintenance mechanism, which is capable of covering the nozzles 40 of the recording head 39 is blocked by the pump. Accordingly, in a case that the nozzles 40 are covered by the cap, the other end of the ink outflow channel 1114 (an end closer to the projection 1157) is communicated with the blocked tube via the internal space of the projection 1157, the ink tube 32, the recording head 39 and the cap. Namely, the other end of the ink outflow channel 1114 is blocked (closed). Further, the cross section of the ink outflow channel 1114 is formed to be sufficiently small as compared with the cross section of the second ink chamber 1132. Accordingly, even if the posture of the ink tank 1000 is changed to a posture different from the usable posture, namely, regardless of the posture of the ink tank 1000, the ink stored in the second ink chamber 1132 does not flow into the ink outflow channel 1114. Note that in a case that the nozzles 40 are not covered by the cap, the nozzles 40 are open. Namely, the other end of the ink outflow channel 1114 is open. Accordingly, the ink stored in the second ink chamber 1132 can flow into the ink outflow channel 1114.

On the other hand, the opening 1145 as described above and the atmosphere communicating channel (to be described later on) are each a boundary. The term "boundary" means a boundary with a space in which at least one of one end and the other end of the space is connected to the ink chamber 1111, and even in a case that the one end or the other end is blocked, the ink stored in the ink chamber 1111 can flow into the space. In the embodiment, the ink tank 1000 is provided only with the opening 1145 and the atmosphere communicating channel, as the boundary. It is allowable, however, that the ink tank 1000 is provided also with another boundary which is different from the opening 1145 and the atmosphere communicating channel.

<Atmosphere Communicating Channel>

As depicted in FIGS. 12 to 15, the casing 1140 has an atmosphere communicating channel. The atmosphere communicating channel is a communicating channel for communicating the ink chamber 1111 with the outside of the ink tank 1000. In other words, the atmosphere communicating channel is a communicating channel for releasing (opening) the ink chamber 1111 to the atmosphere. The atmosphere communicating channel is provided with the first communicating channel 1171 and the second communicating channel 1172 which are depicted in FIGS. 12 and 14, and a third communicating channel 1173 as depicted in FIGS. 12 to 15. The first communicating channel 1171 and the second communicating channel 1172 are located on the right side relative to the inner wall 1071. The third communicating channel 1173 is located both on the right and left side relative to the inner wall 1071.

As depicted in FIGS. 12 and 14, the first communicating channel 1171 is communicated with the front ink chamber 1137 of the first ink chamber 1131 via an opening 1174. The opening 1174 is formed by cutting out a right front end portion of the inner wall 1075 leftwardly from a right end thereof. The opening 1174 is defined by the inner wall 1075, the inner wall 1074 and the film 1142.

The first communicating channel 1171 extends rearwardly from the opening 1174, then extends frontwardly so as to make a U-turn, and reaches the through hole 1175 (see FIGS. 14 and 15). The through hole 1175 is provided in the inner wall 1071. The through hole 1175 is disposed at a location which is closer to a front portion, of the projection 1144 in the front/rear direction 8, to some extent than a central portion of the projection 1144 in the front/rear direction 8. The through hole 1175 communicates portions, of the first communicating channel 1171, which are located respectively on the right side and the left side relative to the inner wall 1071.

Front and rear surfaces and upper and lower surfaces of the first communicating channel 1171 are defined by the upper wall 1104, the inner wall 1073, the inner wall 1074, the inner wall 1075, the inner wall 1076 and the inner wall 1077. Further, the left surface of the first communicating channel 1171 is defined by the inner wall 1071. Further, the right surface of the first communicating channel 1171 is defined by the film 1142.

The second communicating channel 1172 is communicated, at a lower end thereof, with the upper surface (virtual plane) of the upper ink chamber 1052 of the second ink chamber 1132. The second communicating channel 1172 extends upwardly from a position at which the second communicating channel 1172 is communicated with the upper ink chamber 1052, then extends frontwardly, then extends upwardly, then extends rearwardly, then extends upwardly, then extends frontwardly, and reaches the through hole 1175.

Rear and upper surfaces of the second communicating channel 1172 are defined by the rear wall 1110, the upper wall 1104, the rear wall 1144B of the projection 1144 and the upper wall 1144C of the projection 1144. Further, front and lower surfaces of the second communicating channel 1172 are defined by the inner wall 1073 and the inner wall 1076. Furthermore, the upper and lower surfaces of the second communicating channel 1172 are defined by the inner wall 1082. Moreover, the left surface of the second communicating channel 1172 is defined by the inner wall 1071, and the right surface of the second communicating channel 1172 is defined by the film 1142.

As depicted in FIGS. 13 and 15, the third communicating channel 1173 is provided with a first channel 1176, a second channel 1177, a third channel 1170, a rear (rearward) communicating channel 1178, and a labyrinth 1179.

The first channel 1176 extends from the through hole 1175 (see FIGS. 14 and 15) leftwardly up to the left end of the frame 1141. Namely, the first channel 1176 extends from the right surface toward the left surface of the ink chamber 1111. In other words, the first channel 1176 is communicated with the first and second communicating channels 1171 and 1172 at positions close to the right surface of the ink chamber 1111 via the though hole 1175 and extends leftwardly toward the film 1143 from the communication positon.

The first channel 1176 is communicated with the second channel 1177 via an opening 1180. The opening 1180 is formed by cutting out a left lower end portion of the inner wall 1078 rightwardly from a left end thereof. The opening 1180 is defined by the inner wall 1078, the inner wall 1152 and the film 1143.

A front surface of the first channel 1176 is defined by the inner wall 1078; rear and lower surfaces of the first channel 1176 are defined by the inner wall 1152; an upper surface of the first channel 1176 is defined by the upper wall 1144C of the projection 1144; and a left surface of the first channel 1176 is defined by the film 1143.

The second channel 1177 extends from the opening 1180 rightwardly up to the right end of the frame 1141. Namely, the second channel 1177 extends from the left surface toward the right surface of the ink chamber 1111. In other words, the second channel 1177 is communicated with the first channel 1176 at position close to the left surface of the ink chamber 1111 and extends rightwardly toward the film 1142 from the communication positon.

As depicted in FIGS. 12, 14 and 15, the portion, in the inner wall 1071, in which the second channel 1177 is formed, is formed with an opening 1181. Portions, in the second channel 1177, which are located respectively on the left side and the right side relative to the inner wall 1071 are communicated with each other by the opening 1181.

As depicted in FIG. 12, a surrounding wall 1182 is projected rightwardly from a peripheral or circumferential edge portion, in the inner wall 1071, which surrounds the opening 1181. A lower inner surface 1182A of the surrounding wall 1182 is inclined such that a right end of the lower inner surface 1182A is located at a position above a left end of the lower inner surface 1182A. A gas-liquid separating membrane 1183 (see FIG. 12) is attached to a projection forward end surface, of the surrounding wall 1182, namely the right surface of the surrounding wall 1182. With this, the second channel 1177 is blocked (closed) by the gas-liquid separating membrane 1183. In other words, the gas-liquid separating membrane 1183 is arranged in the second channel 1177. Namely, the gas-liquid separating membrane 1183 is arranged between the first and second communicating channels 1171, 1172, and a rear communicating channel 1178 and the labyrinth 1179 (to be described later on).

The gas-liquid separating membrane 1183 is a porous membrane (film) having minute (fine) holes which shut off passing of the ink therethrough and allow a gas to pass therethrough. For example, the gas-liquid separating membrane 1183 is formed of a fluoro resin such as polytetrafluoroethylene, polychlorotrifluoro-ethylene, a tetrafluoroethylene-hexafluoropropylene copolymer, a tetrafluororethyelen-perfluoro alkylvinylether copolymer, a tetrafluoroethylene-ethylene copolymer, etc.

As depicted in FIGS. 13 and 15, front and lower surfaces of a left-side portion, of the second channel 1177 which is located on the left side relative to the inner wall 1071, are defined by the inner wall 1152; a rear surface of the left-side portion is defined by the inner wall 1078; an upper surface of the left-side portion is defined by the upper wall 1144C of the projection 1144; a portion, in a right surface of the left-side portion, which is different from the opening 1181, is defined by the inner wall 1071 (see FIG. 14); and a left surface of the left-side portion is defined by the film 1143.

Further, as depicted in FIGS. 12 and 14, a front surface of a right-side portion, of the second channel 1177 which is located on the right side relative to the inner wall 1071, is defined by the front wall 1144A of the projection 1144; a lower surface of the right-side portion is defined by the inner wall 1077 and the lower inner surface 1182A of the surrounding wall 1182; a rear surface of the right-side portion is defined by the inner wall 1078; an upper surface of the right-side portion is defined by the upper wall 1144C of the projection 1144; a portion, in a left surface of the right-side portion, which is different from the opening 1181 is defined by the inner wall 1071 (see FIG. 14); and a right surface of the right-side portion is defined by the film 1142.

As depicted in FIGS. 13 and 15, the third channel 1170 is communicated with the right-side portion, of the second channel 1177, which is located on the right side relative to the inner wall 1071, via an opening 1184 (see FIGS. 14 and 15) formed between the front wall 1144A of the projection 1144 and the inner wall 1071. The third channel 1170 extends leftwardly from the opening 1184. Namely, the third channel 1170 extends from the right surface toward the left surface of the ink chamber 1111. In other words, the third channel 1170 is communicated with a portion, of the second channel 1177, in the vicinity of the right surface of the ink chamber 1111, and extends leftwardly toward the film 1143 from the positon (location) at which the third channel 1177 is communicated with the portion of the second channel 1177 in the vicinity of the right surface of the ink chamber 1111.

A front surface of the third channel 1170 is defined by the front wall 1144A of the projection 1144; a rear surface of the third channel 1170 is defined by the inner wall 1152; an upper surface of the third channel 1170 is defined by the upper wall 1144C of the projection 1144; a lower surface of the third channel 1170 is defined by the inner wall 1151; a right surface of the third channel 1170 is defined by the film 1142; and a left surface of the third channel 1170 is defined by the film 1143.

The rear communicating channel 1178 extends rearwardly from a left end of the third channel 1170, and reaches the labyrinth 1179 via an opening 1185 formed between the inner wall 1151 and the inner wall 1152. Namely, the rear communicating channel 1178 is communicated with the third channel 1170 in the vicinity of the film 1143.

Lower and front surfaces of the rear communicating channel 1178 are defined by the inner wall 1151 and the front wall 1144A of the projection 1144; rear and upper surfaces of the rear communicating channel 1178 are defined by the inner wall 1152; a right surface of the rear communicating channel 1178 is defined by the inner wall 1071; and a left surface of the rear communicating channel 1178 is defined by the film 1143.

The labyrinth 1179 is formed by arranging a plurality of pieces of a partition wall 1186, which extend in the up/down direction 7, side by side in the front/rear direction 8 such that the labyrinth 1179 is provided as a communicating channel extending along the front/rear direction 8 while repeating U-turns in the up/down direction 7.

Front and rear surfaces of the labyrinth 1179 are defined by the partition walls 1186; an upper surface of the labyrinth 1179 is defined by the upper wall 1144C of the projection 1144; a lower surface of the labyrinth 1179 is defined by the inner wall 1151; a right surface of the labyrinth 1179 is defined by the inner wall 1071; and a left surface of the labyrinth 1179 is defined by the film 1143.

An end (front lower end) of the labyrinth 1179 is communicated with the rear communicating channel 1178 via the opening 1185; the other end (rear upper end) of the labyrinth 1179 is communicated with an atmosphere open port 1187 (see FIG. 13).

The atmosphere open port 1187 is constructed as a hole penetrating through the upper wall 1144C of the projection 1144 in the up/down direction 7. The lower end of the atmosphere open port 1187 is communicated with the labyrinth 1179. The upper end of the atmosphere open port 1187 is communicated with the outside of the ink tank 1000. In the state that the ink tank 1000 is in the usable posture and under the condition that the maximum amount of the ink which is storable in the ink tank 1000 in the usable posture is stored in the ink chamber 1111, the atmosphere open port 1187 is located at a positon above the liquid surface of the maximum amount of the ink.

As described above, the atmosphere communicating channel is communicated with the first ink chamber 1131 of the ink chamber 1111 at the opening 1174, and is communicated with the second ink chamber 1132 of the ink chamber 1111 at the lower end of the second communicating channel 1172, as depicted in FIG. 12. On the other hand, the atmosphere communicating channel is communicated with the outside of the ink tank 1000 at the atmosphere open port 1187, as depicted in FIG. 13.

<Relation Between Communicating Channels 1171, 1172 and Rear Communicating Channel 1178 and Labyrinth 1179>

As depicted in FIGS. 12 to 15, the first and second communicating channels 1171 and 1172 partially face the rear communicating channel 1178 and the labyrinth 1179 in the left/right direction 9. Namely, the first and second communicating channels 1171 and 1172 partially face the rear communicating channel 1178 and the labyrinth 1179 as viewed in the left/right direction 9. The first and second communicating channels 1171 and 1172 may entirely face the rear communicating channel 1178 and the labyrinth 1179 in the left/right direction 9. The wording "face" in this context means that the first and second communicating channels 1171 and 1172 are arranged on the front side of the casing 1140 in the left/right direction 9 and the rear communicating channel 1178 and the labyrinth 1179 are arranged on the back side of the casing 1140 in the left/right direction 9, via the inner wall 1071.

As described above, in the left/right direction 9, the distance between the inner wall 1071 and the left end of the frame 1141 is longer than the distance between the inner wall 1071 and the right end of the frame 1141. Namely, the length of the first and second communicating channels 1171 and 1172 in the left/right direction 9 is longer than the length of the rear communicating channel 1178 and the labyrinth 1179 in the left/right direction 9. In other words, the first and second communicating channels 1171 and 1172 are grooves deeper than the rear communicating channel 1178 and the labyrinth 1179.

The width (an example of a first width) of the first and second communicating channels 1171 and 1172 is greater than the width (an example of a second width) of the rear communicating channel 1178 and the labyrinth 1179. The width of the first communicating channel 1171 is indicated, for example, as a width W1 in FIG. 14. The width of the second communicating channel 1172 is indicated, for example, as a width W2 in FIG. 14. Namely, the width of the first communicating channel 1171 is a length along a direction orthogonal to a communicating direction 188 of the first communicating channel 1171 and the left/right direction 9. The width of the second communicating channel 1172 is a length along a direction orthogonal to a communicating direction 189 of the second communicating channel 1172 and the left/right direction 9. The communicating direction 188 of the first communicating channel 1171 is indicated by the dot-dash chain line in FIG. 14. The communicating direction 189 of the second communicating channel 1172 is indicated by the dot-dot-dash chain line in FIG. 14.

As depicted in FIG. 14, the inner walls 1075, 1076, 1077, and 1082 extend in the front/rear direction 8 to define the first communicating channel 1171 and the second communicating channel 1172. As depicted in FIG. 15, the partition wall 1186 defining the labyrinth 1179 extends in the up/down direction 7. A part of each of the inner walls 1075, 1076, 1077, and 1082 faces a part of the partition wall 1186 in the left/right direction 9. Namely, each of the inner walls 1075, 1076, 1077, and 1082 intersects with the partition wall 1186 as viewed in the left/right direction 9. Each of the inner walls 1075, 1076, 1077, and 1082 is an example of a first rib. The partition wall 1186 is an example of a second rib.

When the film 1143 is fixed to the partition wall 1186 by applying pressure from the left side during welding of the film 1143, force acting rightward is applied to the partition wall 1186. Namely, force is applied from the partition wall 1186 to the inner walls 1075, 1076, 1077, and 1082. Since the inner walls 1075, 1076, 1077, and 1082 intersect with the partition wall 1186, they may support the partition wall 1186 to which the force acting rightward is being applied.

When the film 1142 is fixed to the inner walls 1075, 1076, 1077, and 1082 by applying pressure from the right side during welding of the film 1143, force acting leftward is applied to the inner walls 1075, 1076, 1077, and 1082. Namely, force is applied from the inner walls 1075, 1076, 1077, and 1082 to the partition wall 1186. Since the inner walls 1075, 1076, 1077, and 1082 intersect with the partition wall 1186, the partition wall 1186 may support the inner walls 1075, 1076, 1077, and 1082 to which the force acting leftward is being applied.

<Ink Tank 1000B>

Figure 16:
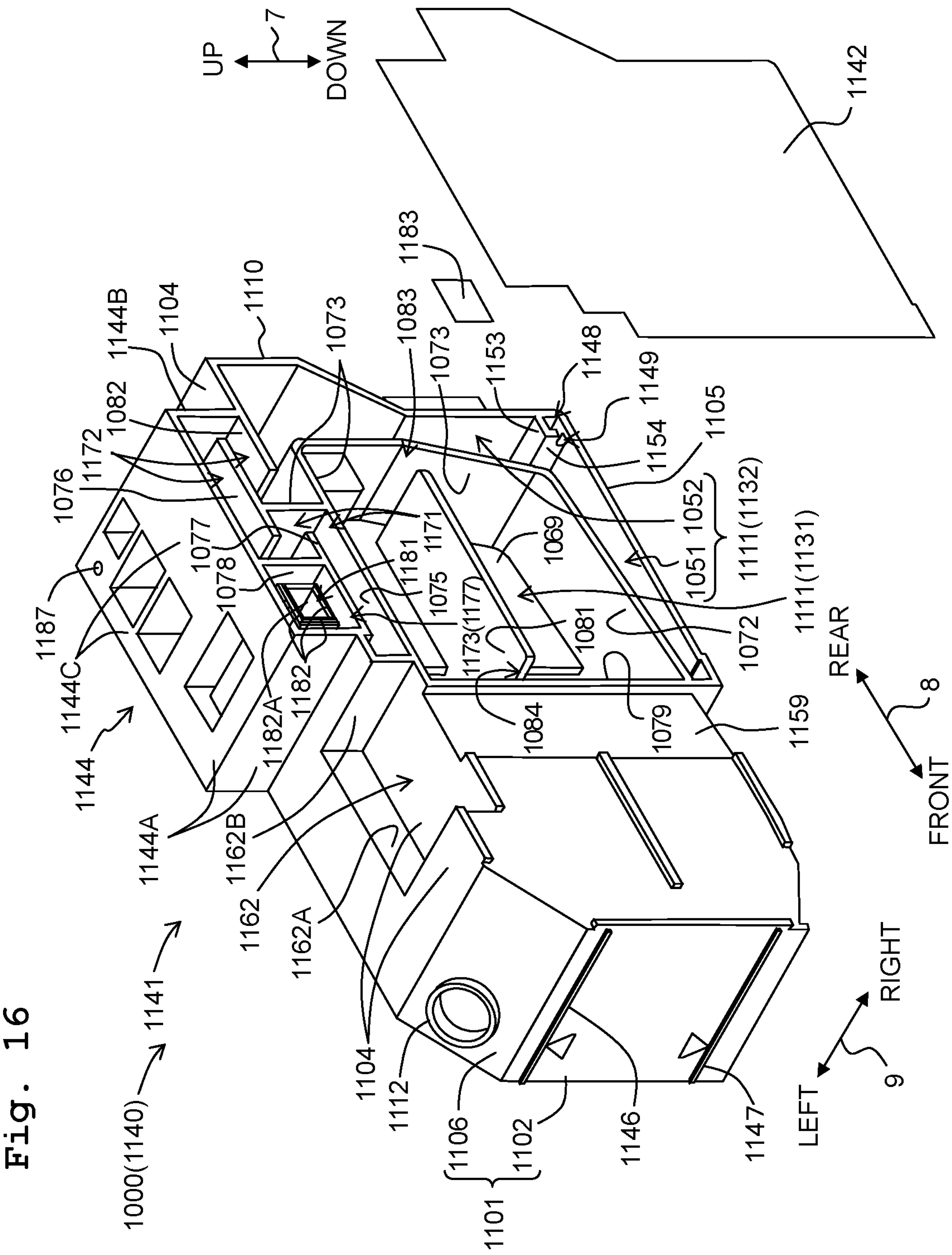
FIG. 16 is a front perspective view of an ink tank 1000B.
Figure 17:
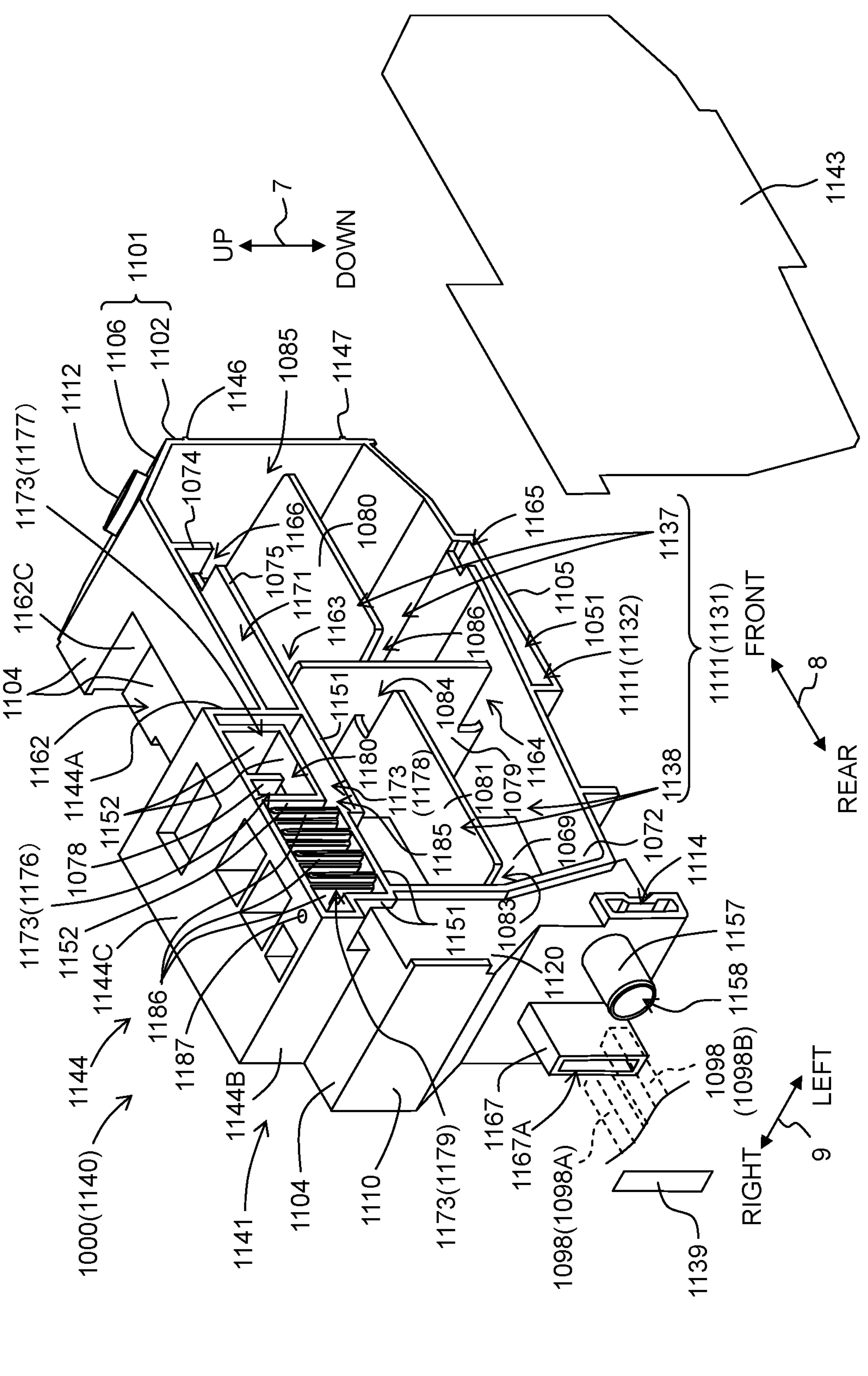
FIG. 17 is a rear perspective view of the ink tank 1000B.

In the following, the configuration of the ink tank 1000B will be explained with reference to FIGS. 16 to 19. As depicted in FIGS. 16 and 17, the ink tank 1000B has a length in the left/right direction 9 which is longer than those of the ink tanks 1000Y, 1000C and 1000M (see FIGS. 12 and 13).

In the following, regarding the ink tank 1000B, an explanation will be given about the difference between the ink tank 1000B and the ink tanks 1000Y, 1000C and 1000M. Note that regarding a configuration, a portion, a part, a component, etc., of the ink tank 1000B which is (are) same as that of each of the ink tanks 1000Y, 1000C and 1000M, a same reference sign or numeral in FIGS. 12 to 15 is assigned to the configuration, etc., of the ink tank 1000B that is same as those of the ink tanks 1000Y, 1000C and 1000M, and any explanation therefor will be omitted. Further, in a case that the difference between the configuration of a predetermined (certain) portion or part of the ink tank 1000B and those of the ink tanks 1000Y, 1000M and 1000C is only the point that the configuration of the predetermined portion or part of the ink tank 1000B is longer in the left/right direction 9 than those of the ink tanks 1000Y, 1000M and 1000C, then a same reference sign or numeral in FIGS. 12 to 15 is assigned to the configuration of the predetermined portion or part of the ink tank 1000B, and any explanation therefor will be omitted.

As depicted in FIGS. 16 and 17, the cashing 1140 of the ink tank 1000B is provided with a frame 1141, and three films 1139, 1142 and 1143.

Figure 18:
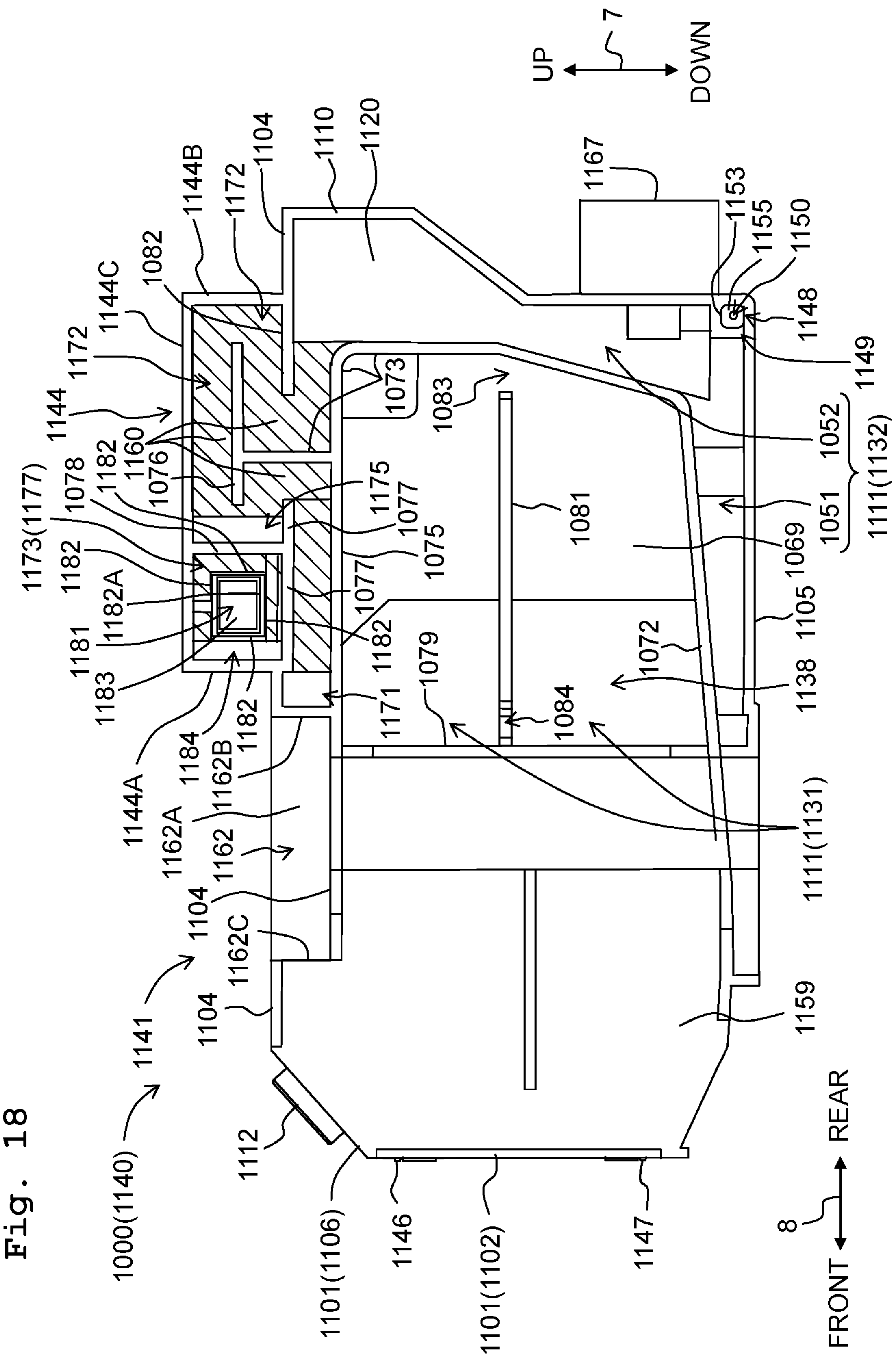
FIG. 18 is a right side view of the ink tank 1000B.

As depicted in FIGS. 16 and 18, the ink tank 1000B is not provided with the left wall 1103 (see FIG. 13) which is provided on each of the ink tanks 1000Y, 1000C and 1000M, but the ink tank 1000B is provided with a right wall 1159. The right wall 1159 is a wall extending rearwardly from a right end of the front wall 1101. An upper end of the right wall 1159 is connected to a front portion of the upper wall 1104. A lower end of the right wall 1159 is connected to a front portion of the lower wall 1105. In other words, the right wall 1159 is a wall connecting the right end of the front wall 1101, the front right end of the upper wall 1104 and the front right end of the lower wall 1105. Namely, the right wall 1159 is provided only on the front portion of the frame 1141, but is not provided on the rear portion of the frame 1141.

As depicted in FIGS. 16 and 17, a recessed portion 1162 is formed in a front portion of the upper wall 1104. The recessed portion 1162 is defined by a side wall 1162A, a side wall 1162B, a side wall 1162C and the upper wall 1104.

The ink tank 1000B is not provided with the inner wall 1071 (see FIG. 14). The ink tank 1000B is provided with an inner wall 1160 (see FIGS. 16 and 18) and an inner wall 1161 (see FIGS. 17 and 19), as the walls corresponding to the inner wall 1071 (see FIG. 14).

The inner wall 1160 and the inner wall 1161 extend downwardly from the upper wall 1104 and the upper wall 1144C of the projection 1144. Each of the inner wall 1160 and the inner wall 1161 is a wall expanding in the up/down direction 7 and the front/rear direction 8.

The inner wall 1160 is provided in a hatched area as indicated in FIG. 18. The inner wall 1160 is arranged, in the left/right direction 9, at any positon between the right end and the left end of the frame 1141. For example, the inner wall 1160 is arranged at a portion closer to the right side of the frame 1141 in the left/right direction 9, than a central portion of the frame 1141 in the left/right direction 9.

Figure 19:
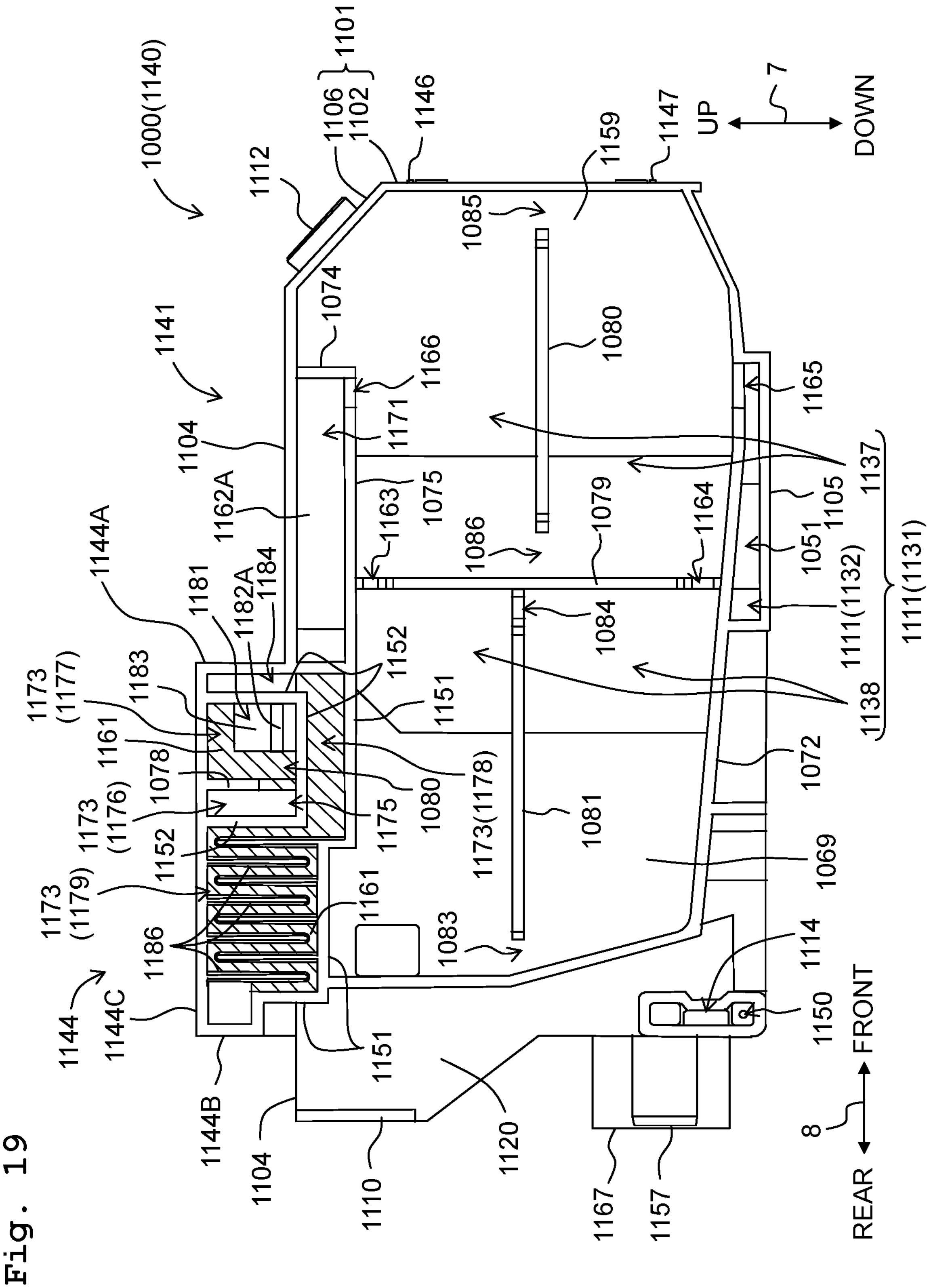
FIG. 19 is a left side view of the ink tank 1000B.

The inner wall 1161 is provided in a hatched area as indicated in FIG. 19. The inner wall 1161 is arranged, in the left/right direction 9, at any positon which is between the right end and the left end of the frame 1141 and which is on the left side relative to the inner wall 1160. For example, the inner wall 1161 is arranged at a portion closer to the left side of the frame 1141 in the left/right direction 9, than the central portion of the frame 1141 in the left/right direction 9.

In the present embodiment, the distance between the inner wall 1160 and the right end of the frame 1141 is longer than the distance between the inner wall 1161 and the left end of the frame 1141.

As depicted in FIGS. 16 and 18, a portion of the inner wall 1073 which is located above the inner wall 1075, a portion of the inner wall 1075 which is located to be closer to the inner wall 1073, the inner wall 1076, the inner wall 1077, and the inner wall 1082 extend rightwardly from the inner wall 1160. Namely, the portion of the inner wall 1073 which is located above the inner wall 1075, the portion of the inner wall 1075 which is located to be closer to the inner wall 1073, the inner wall 1076, the inner wall 1077 and the inner wall 1082 are arranged on the right side relative to the inner wall 1160.

As depicted in FIGS. 17 and 19, the inner wall 1074 and a portion of the inner wall 1075 which is located to be closer to the inner wall 1074 extend leftwardly from the side wall 1162A. Namely, the inner wall 1074 and the portion of the inner wall 1075 which is located to be closer to the inner wall 1074 are arranged on the left side relative to the side wall 1162A.

As depicted in FIGS. 17 and 19, the inner wall 1074 extends downwardly from the left front portion of the upper wall 1104. The inner wall 1074 is not connected to the inner wall 1160 and the inner wall 1161, and is connected to the side wall 1162A.

The inner wall 1075 is projected rearwardly from the lower end of the inner wall 1074. In this rearwardly-extending portion of the inner wall 1075, the inner wall 1075 extends leftwardly from the side wall 1162A. Then, the inner wall 1075 extends rightwardly. In this rightwardly-extending portion of the inner wall 1075, a front end of the inner wall 1075 is connected to the side wall 1162B (see FIG. 16) and a rear end of the inner wall 1075 is connected to the front wall 1144A of the projection 1144 (see FIGS. 16 and 19). Next, as depicted in FIGS. 16 and 18, the inner wall 1075 extends rearwardly. In this rearwardly-extending portion, the inner wall 1075 extends rightwardly from the inner wall 1160.

The right end of the inner wall 1079 is connected to the right wall 1159.

The inner wall 1151 is a wall connecting the lower end of the front wall 1144A of the projection 1144 and the rear wall 1144B of the projection 1144. The inner wall 1151 extends rearwardly from the lower end of the front wall 1144A, then extends upwardly, then extends rearwardly, then extends upwardly, then extends rearwardly, and reaches the rear wall 1144B.

As depicted in FIG. 16, the rear portion of the right surface of the frame 1141 is opened or uncovered. By fixing the film 1142 by welding to right surfaces of the lower wall 1105, the rear wall 1110, the upper wall 1104, the inner walls 1072, 1073, 1075 to 1080, 1082, the side wall 1162B of the recessed portion 1162, the front wall 1144A of the projection 1144, the rear wall 1144B of the projection 1144 and the upper wall 1144C of the projection 1144, the right surface of the frame 1141 is sealed.

As depicted in FIG. 17, the left surface of the frame 1141 is opened or uncovered. By fixing the film 1143 by welding to left surfaces of the rear wall 1110, the upper wall 1104, the lower wall 1105, the inner walls 1072, 1074, 1075, 1078, 1079 to 1081, 1151 and 1152, the front wall 1144A of the projection 1144, the rear wall 1144B of the projection 1144, the upper wall 1144C of the projection 1144 and the partition walls 1186, the left surface of the frame 1141 is sealed.

As depicted in FIGS. 16 and 17, the first ink chamber 1131 is defined by the front wall 1101, the right wall 1159, the lower wall 1105, the rear wall 1110, the inner walls 1072, 1073, 1074 and 1075, the upper wall 1104, the inner wall 1151, the film 1142 and the film 1143. The right wall 1159 and the film 1142 define the right surface of the first ink chamber 1131.

As depicted in FIG. 17, the upper end portion of the inner wall 1079 is cut out rightwardly from the left end of the upper end portion. With this, an opening 1163 is formed in the upper end portion of the inner wall 1079. The opening 1163 is defined by the inner wall 1079, the inner wall 1075 and the film 1143. The lower end portion of the inner wall 1079 is cut out rightwardly from the left end of the lower end portion. With this, an opening 1164 is formed in the lower end portion of the inner wall 1079. The opening 1164 is defined by the inner wall 1079, the inner wall 1072 and the film 1143. The front ink chamber 1137 and the rear ink chamber 1138 are communicated with each other by the openings 1163 and 1164.

The front end portion of the inner wall 1072 is cut out rightwardly from the left end of the front end portion. With this, an opening 1165 is formed in the front end portion of the inner wall 1072. The opening 1165 is defined by the inner wall 1072, the lower wall 1105 and the film 1143. The front ink chamber 1137 of the first ink chamber 1131 and the lower ink chamber 1051 of the second ink chamber 1132 are communicated with each other by the opening 1165.

The right surface of the ink chamber 1111 is defined by the right wall 1159 and the left surface of the right wall 1159 and the film 1142. Namely, the right surface of the ink chamber 1111 is partially configured by the film 1142.

The left surface of the ink chamber 1111 is defined by the right surface of the film 1143. Namely, the left surface of the ink chamber 1111 is entirely configured by the film 1143.

The right surface and left surface of the ink chamber 1111 face each other in a state that they are separated from each other. Namely, the right surface and left surface of the ink chamber 1111 are surfaces facing each other.

As depicted in FIGS. 16 and 18, the first communicating channel 1171 and the second communicating channel 1172 are located on the right side relative to the inner wall 1160. As depicted in FIGS. 16 to 19, the third communicating channel 1173 is located both on the right and left side relative to the inner wall 1160.

As depicted in FIG. 17, the first communicating channel 1171 is communicated with the front ink chamber 1137 of the first ink chamber 1131 via an opening 1166. The opening 1166 is formed by cutting out a left front end portion of the inner wall 1075 rightwardly from a left end of the left front end portion. The opening 1166 is defined by the inner wall 1075, the inner wall 1074 and the film 1143.

The first communicating channel 1171 extends rearwardly from the opening 1166, and then extends rightwardly. Then, as depicted in FIG. 16, the first communicating channel 1171 extends rearwardly, then extends frontwardly to as to make a U-turn, and reaches the opening 1175 (see FIG. 18). The through hole 1175 is a hole penetrating through the inner wall 1160 and the inner wall 1161 in the left/right direction 9, and connecting the first and second communicating channels 1171 and 1172 with the third communicating channel 1173.

As depicted in FIG. 17, a portion, of the first communicating channel 1171, which extends rearwardly from the opening 1166 is defined by the upper wall 1104, the side wall

1162A of the recessed portion 1162, the inner wall 1074, the inner wall 1075, and the film 1143. A portion, of the first communicating channel 1171, which extends rightwardly is defined by the upper wall 1104, the side wall 1162B of the recessed portion 1162, the inner wall 1075, and the front wall 1144A of the projection 1144. As depicted in FIG. 16, a portion, of the first communicating channel 1171, which is located on the right side relative to the inner wall 1160 is defined by the inner walls 1160, 1073, 1075, 1076 and 1077, and the film 1142.

As depicted in FIG. 17, the frame 1141 is provided with a projection 1167 which is projected rearwardly from the rear wall 1110. The projection 1167 is irradiated with a light by the above-described optical sensor 98 to thereby detect the height of the liquid surface of the ink stored in the ink chamber 1111 of the ink tank 1000 in the usable posture. The projection 1167 has a rectangular parallelepiped shape. The projection 1167 has an internal space 1167A, and a front end and a rear end of the projection 1167 are opened (uncovered). The front end of the internal space 1167A of the projection 1167 is communicated with the upper ink chamber 1052 of the second ink chamber 1132. Namely, the internal space 1167A is provided on the second ink chamber 1132. The rear end of the internal space 1167A of the projection 1167 is opened. The film 1139 is attached to the opened rear end of the internal space 1167A of the projection 1167. With this, the opened rear end of the internal space 1167A of the projection 1167 is blocked (closed) by the film 1139.

In a horizontal cross section, of the ink tank 1000, at a height not more than the upper end of the internal space 1167A of the projection 1167 and not less than the lower end of the internal space 1167A, the cross section of the second ink chamber 1132 in a case that the horizontal cross section is seen from thereabove is smaller than the cross section of the first ink chamber 1131 in the case that the horizontal cross section is seen from thereabove. Further, the internal space 1167A of the projection 1167 is communicated with the second ink chamber 1132 having the small cross section.

Note that in this embodiment, although the internal space 1167A of the projection 1167 is communicated with the second ink chamber 1132, it is allowable that the internal space 1167A is communicated with the first ink chamber 1131. Namely, the internal space 1167A may be provided on the first ink chamber 1131. In such a case, the projection 1167 may be projected, for example, from the front wall 1101 or the left wall 1103.

Further, in the embodiment, the projection 1167 is provided only on the ink tank 1000B, among the ink tanks 1000B, 1000Y, 1000C and 1000M. It is allowable, however, that the projection 1167 is provided on at least one of the ink tanks 1000B, 1000Y, 1000C and 1000M.

Effect of the Embodiment

According to the first embodiment, in order to allow the ink in the first ink chamber 131 to enter the third communicating channel 173 so as to make contact with the gas-liquid separating membrane 183, the ink in the first ink chamber 131 is required to flow through the first communicating channel 171. Further, in order to allow the ink in the second ink chamber 132 to enter the third communicating channel 173 so as to make contact with the gas-liquid separating membrane 183, the ink in the second ink chamber 132 is required to flow through the second communicating channel 172.

According to the first embodiment, a communication portion between the first and second communicating channels 171, 172 and the third communicating channel 173 makes the first and second communicating channels 171, 172 communicate with each other. Thus, at least a part of the ink flowing from the first communicating channel 171 to the communication portion enters the second communicating channel 172 rather than the third communicating channel 173. Further, at least a part of the ink flowing from the second communicating channel 172 to the communication portion enters the first communicating channel 171 rather than the third communicating channel 173.

Thus, according to the first embodiment, it is possible to prevent the ink stored in the first ink chamber 131 and the second ink chamber 132 from making contact with the gas-liquid separating membrane 183. Also in the second embodiment, the similar effect can be achieved.

According to the first embodiment, the through hole 175 allows the ink to flow from the first and second communicating channels 171 and 172 to the third communicating channel 173 in the left/right direction 9. Thus, the ink flowing from the first and second communicating channels 171 and 172 to the third communicating channel 173 through the through hole 175 flows in the left/right direction 9. Further, according to the first embodiment, the gas-liquid separating membrane 183 is provided at a position different from that of the through hole 175 in the front/rear direction 8. Thus, the ink entering the third communicating channel 173 does not reach the gas-liquid separating membrane 183, unless the ink flowing direction changes from the left/right direction 9 to the front/rear direction 8. Thus, according to the first embodiment, it is possible to prevent the ink flowing from the first and second communicating channels 171 and 172 and entering the third communicating channel 173 through the through hole 175 from making contact with the gas-liquid separating membrane 183. Also in the second embodiment, the similar effect can be achieved.

According to the first embodiment, in order to allow the ink flowing from the first and second communicating channels 171 and 172 and entering the third communicating channel 173 to make contact with the gas-liquid separating membrane 183, the ink is required to flow on the lower inner surface 182A inclined upwardly. This reduces the contact of the ink with the gas-liquid separating membrane 183. Also in the second embodiment, the similar effect can be achieved.

According to the first embodiment, the labyrinth 179 is provided between the gas-liquid separating membrane 183 and the atmosphere open port 187. Thus, if an accident, such as a break or damage of the gas-liquid separating membrane 183, occurs to cause the ink to pass through the gas-liquid separating membrane 183, the ink is prevented from flowing to the outside of the ink tank 100 through the atmosphere open port 187. Also in the second embodiment, the similar effect can be achieved.

According to the second embodiment, the ink tank 1000 is partitioned into spaces (ink chamber 1111 and the atmosphere communicating channel).

According to the second embodiment, the films 1142 and 1143 are provided on the right surface and the left surface of the ink chamber 1111, respectively. The first and second communicating channels 1171 and 1172 (first part) of the atmosphere communicating channel overlap with the rear communicating channel 1178 and the labyrinth 1179 (second part) as viewed in the left/right direction 9. Thus, the first part may be defined by the film 1142 and the second part may be defined by the film 1143. Further, the second part may be defined by the film 1142 and the first part may be defined by the film 1143. Furthermore, a part of the first part may be defined by the film 1142, a part, of the second part, corresponding to the part of the first part may be defined by the film 1143, a remaining part, of the first part, except for the part of the first part may be defined by the film 1143, and a part, of the second part, corresponding to the remaining part of the first part may be defined by the film 1142. The above configuration allows a space occupied by the ink tank 1000 to be small.

According to the second embodiment, the first and second communicating channels 1171 and 1172 are elongated in the left/right direction 9, that is, the first and second communicating channels 1171 and 1172 are deep. This allows ink to smoothly flow through the first and second communicating channels 1171 and 1172. Here, the first and second communicating channels 1171 and 1172 are communicated with the ink chamber 1111. Thus, the ink that flows from the ink chamber 1111 and enters the first and second communicating channels 1171 and 1172 due to, for example, inclination of the ink tank 1000, may return to the ink chamber 1111 quickly.

According to the second embodiment, the first and second communicating channels 1171 and 1172 may be arranged on the right side, and the rear communicating channel 1178 and the labyrinth 1179 may be arranged at the left side. This simplifies the configuration of the ink tank 1000.

According to the second embodiment, the first and second communicating channels 1171 and 1172 are large in width. Thus, ink may flow through the first and second communicating channels 1171 and 1172 smoothly. Here, the first and second communicating channels 1171 and 1172 are communicated with the ink chamber 1111. Thus, the ink that flows from the ink chamber 1111 and enters the first and second communicating channels 1171 and 1172 due to, for example, inclination of the ink tank 1000, may return to the ink chamber 1111 quickly.

According to the second embodiment, the inner walls 1075, 1076, 1077, and 1082 intersect with the partition wall 1186. Thus, the inner walls 1075, 1076, 1077, and 1082 may support the partition wall 1186, when force acting toward the inner walls 1075, 1076, 1077, and 1082 is applied to the partition wall 1186 in the left/right direction 9 through fixation of the film 1143 to the partition wall 1186 by use of pressure during, for example, welding of the film 1143. Further, the partition wall 1186 may support the inner walls 1075, 1076, 1077, and 1082, when force acting toward the partition wall 1186 is applied to the inner walls 1075, 1076, 1077, and 1082 in the left/right direction 9 through fixation of the film 1142 to the inner walls 1075, 1076, 1077, and 1082 by use of pressure during, for example, welding of the film 1142. Accordingly, the ink tank 1000 may have high strength.

According to the second embodiment, in order that the ink flowing from the ink chamber 1111 and entering the first communicating channels 1171 and 1172 makes contact with the gas-liquid separating membrane 1183, the ink is required to enter the second channel 1177 by making a U-turn from the first channel 1176. This prevents the ink from adhering to the gas-liquid separating membrane 1183.

<Modifications>

In the above embodiment(s), as depicted in FIG. 6, a length L1 of the second communicating channel 172 between the boundary position 188 and the through hole 175 in an ink flow direction is shorter than a length L2 of the first communicating channel 171 between the opening 174 and the through hole 175 in the ink flow direction. However, the length L1 may be substantially the same as the length L2, or the length L1 may be longer than the length L2.

The configuration in which the length L1 is substantially the same as the length L2 prevents such a situation that any one of an ink flow distance between the first ink chamber 131 and the third communicating channel 173 and an ink flow distance between the second ink chamber 132 and the third communicating channel 173 has a very short distance. Thus, the ink stored in the first ink chamber 131 and the second ink chamber 132 is prevented from entering the third communicating channel 173.

Figures 20A, 20B, 20C:
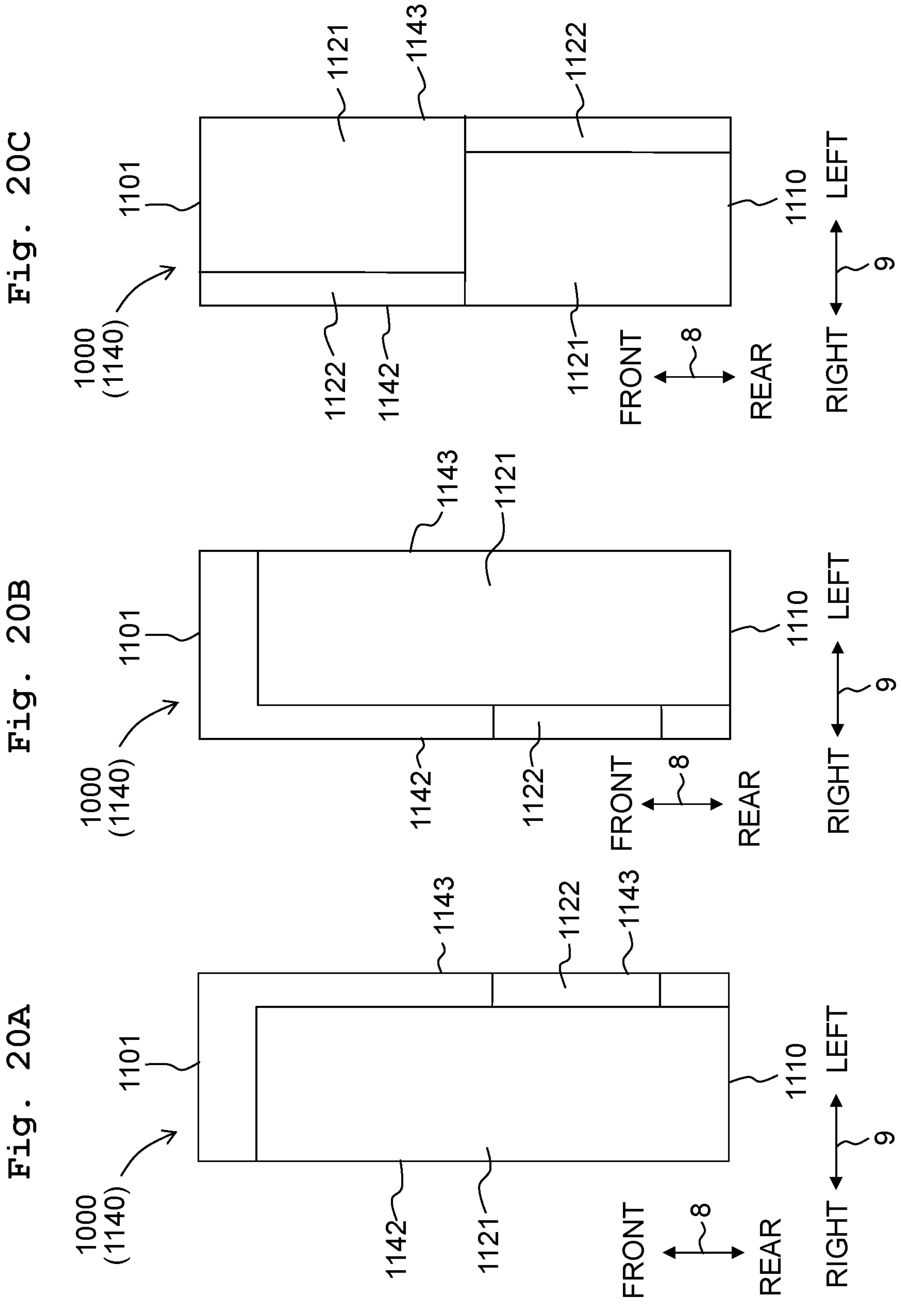

In the above embodiment(s), as depicted in FIG. 20A, a first part 1121 (a part configured by the first and second communicating channels 1171 and 1172 in the above embodiment) is entirely positioned at a right part of the casing 1140, and a second part 1122 (a part configured by the rear communicating channel 1178 and the labyrinth 1179 in the above embodiment) is entirely positioned at a left part of the casing 1140. In other words, the first part 1121 is defined by the film 1142 and the second part 1122 is defined by the film 1143.

On the other hand, as depicted in FIG. 20B, the first part 1121 may be entirely at the left part of the casing 1140, and the second part 1122 may be entirely positioned at the right part of the casing 1140. In other words, the first part 1121 may be defined by the film 1143, and the second part 1122 may be defined by the film 1142. In that case, the inner wall 1071 is provided at a position close to the right end of the frame 1141 in the left/right direction 9.

Further, as depicted in FIG. 20C, a part of the first part 1121 may be positioned at the right part of the casing 1140, and a remaining part, of the first part 1121, except for the part of the first part 1121 may be positioned at the left part of the casing 1140. A part of the second part 1122 may be positioned at the left part of the casing 1140, and a remaining part, of the second part 1122, except for the part of the second part 1122 may be positioned at the right part of the casing 1140. In that case, the part of the first part 1121 faces the part of the second part 1122 in the left/right direction 9, and the remaining part of the first part 1121 faces the remaining part of the second part 1122 in the left/right direction 9. In FIG. 20C, although an entire part of the first part 1121 faces an entire part of the second part 1122 in the left/right direction 9, a part of the first part 1121 may face a part of the second part 1122 in the left/right direction 9.

In the configurations depicted in FIGS. 20B and 20C, the extending direction of the first channel 1176, second channel 1177, and third channel 1170 may be opposite to that of the above embodiment. For example, the first channel 1176 may be communicated with the first part 1121 at a position close to the film 1143 to extend rightwardly toward the film 1142. The second channel 1177 may be communicated with the first channel 1176 at a position close to the film 1142 to extend leftwardly toward the film 1143. The third channel 1170 may be communicated with the second channel 1177 at a position close to the film 1143 to extend rightwardly toward the film 1142.

Further, in the first embodiment, one piece of the inlet port 112 is provided on each of the ink tanks 100. It is allowable, however, that two or more pieces of the inlet port 112 are provided on each of the ink tanks 100. This is similarly applicable to the inlet port 1112 of the second embodiment.

Furthermore, in the first embodiment, one piece of the atmosphere open port 187 is provided on each of the ink tanks 100. It is allowable, however, that two or more pieces of the atmosphere open port 187 are provided on each of the ink tanks 100. This is similarly applicable to the atmosphere open port 1187 of the second embodiment.

Moreover, in the first embodiment, one piece of the opening 158 via which the ink inside the ink chamber 111 is allowed to flow out of the ink chamber 111 is provided on each of the ink tanks 100. It is allowable, however, that two or more pieces of the opening 158 are provided on each of the ink tanks 100. This is similarly applicable to the opening 1158 of the second embodiment.

Further, in the first embodiment, the second ink chamber 132 is provided with the buffer chamber 148 and the ink outflow channel 114. It is allowable, however, that the first ink chamber 131 is provided with the buffer chamber 148 and the ink outflow channel 114. In such a case, the buffer chamber 148 is interposed between the first ink chamber 131 and the ink outflow channel 114. Furthermore, it is allowable that both of the first and second ink chambers 131 and 132 are provided with the buffer chamber 148 and the ink outflow channel 114.

Further, in the second embodiment, the second ink chamber 1132 is provided with the buffer chamber 1148 and the ink outflow channel 1114. It is allowable, however, that the first ink chamber 1131 is provided with the buffer chamber 1148 and the ink outflow channel 1114. In such a case, the buffer chamber 1148 is interposed between the first ink chamber 1131 and the ink outflow channel 1114. Furthermore, it is allowable that both of the first and second ink chambers 1131 and 1132 are provided with the buffer chamber 1148 and the ink outflow channel 1114.

Moreover, in the each of the first and second embodiments, the ink is explained as an example of the liquid. However, the present teaching is not limited to this. Namely, instead of being an ink, the liquid may be exemplified by a pre-treatment liquid which is to be jetted (discharged) to a recording sheet before the ink is jetted (discharged) during the printing; or the liquid may be exemplified by water, etc., which is to be sprayed in the vicinity of the nozzles 40 of the recording head 39 for the purpose of preventing drying of the nozzles 40 of the recording head 39, and the like.

What is claimed is:

1. A tank for storing ink to be supplied to an ink consuming device, comprising:

a casing;

an ink chamber located in the casing and configured to store the ink;

an ink inlet port via which the ink is poured into the ink chamber;

an ink outlet port via which the ink stored in the ink chamber is allowed to flow out of the ink chamber;

an atmosphere communicating channel including an atmosphere open port, the atmosphere communicating channel being located in the casing and communicating the ink chamber with an outside of the casing via the atmosphere open port; and a labyrinth channel forming a part of the atmosphere communicating channel, wherein the casing includes a wall that separates the labyrinth channel from a portion of the atmosphere communicating channel different from the labyrinth channel in a horizontal direction orthogonal to an up-down direction and a front-rear direction, wherein the ink inlet port is independent of the ink outlet port and is located above the ink outlet port in the up-down direction, and wherein the entire labyrinth channel overlaps the portion of the atmosphere communicating channel different from the labyrinth channel in the horizontal direction orthogonal to the up-down direction and the front-rear direction when viewed in the horizontal direction.

2. The tank according to claim 1, wherein the casing includes:

a front wall of which an outer surface has a line extending in the horizontal direction; and an upper wall through which the atmosphere open port penetrates.

3. The tank according to claim 1, wherein the casing includes:

a front wall;

a rear wall arranged to face the front wall in the front-rear direction; and a pair of lateral walls located between the front wall and the rear wall in the front-rear direction, a length of the front wall in the horizontal direction being shorter than a length of the pair of lateral walls in the front-rear direction.

4. The tank according to claim 1, wherein a depth of the labyrinth channel in the horizontal direction is shorter than a depth of the portion of the atmosphere communicating channel different from the labyrinth channel in the horizontal direction.

5. The tank according to claim 1, wherein the labyrinth channel includes at least three of channels extending in the up-down direction, the at least three of channels forming at least two of U-turn channels in the up-down direction.

6. The tank according to claim 3, wherein at least a part of one of the pair of the lateral walls is a film, and wherein the film defines a part of the ink chamber and a part of the labyrinth channel.

7. The tank according to claim 6, wherein the film defining the part of the ink chamber and the part of the labyrinth channel is a single film.

8. The tank according to claim 1, wherein the atmosphere communicating channel is located above the ink chamber.

9. A tank for storing liquid to be supplied to an ink consuming device, comprising:

a casing;

an ink chamber located in the casing and configured to store ink;

an ink inlet port via which the ink is poured into the ink chamber;

an ink outflow port via which the ink stored in the ink chamber is allowed to flow out of the ink chamber;

an atmosphere communicating channel including an atmosphere open port, the atmosphere communicating channel being located in the casing and communicating the ink chamber with an outside of the casing via the atmosphere open port; and a labyrinth channel forming a part of the atmosphere communicating channel, the labyrinth channel including a U-turn channel facing downward, wherein the casing includes a wall that separates the labyrinth channel from a portion of the atmosphere communicating channel different from the labyrinth channel in a horizontal direction orthogonal to an up-down direction and a front-rear direction, wherein the ink inlet port is independent of the ink outlet port and is located above the ink inlet port in the up-down direction, and wherein a lower end of the U-turn channel of the labyrinth channel is located between both ends of the portion of the atmosphere communicating channel different from the labyrinth channel in the up-down direction.

10. The tank according to claim 9, wherein the labyrinth channel includes a U-turn channel facing upward, and wherein an upper end of the U-turn channel facing upward of the labyrinth channel is located between both ends of the portion of the atmosphere communicating channel different from the labyrinth channel in the up-down direction.

11. The tank according to claim 9, wherein both ends of the labyrinth channel in the up-down direction are located between both ends of the portion of the atmosphere communicating channel different from the labyrinth channel in the up-down direction.

12. The tank according to claim 9, wherein both ends of the labyrinth channel in the front-rear direction are located between both ends of the portion of the atmosphere communicating channel different from the labyrinth channel in the front-rear direction.

13. A tank for storing ink to be supplied to an ink consuming device, comprising:

a casing;

an ink chamber located in the casing and configured to store ink;

an ink inlet port via which the ink is poured into the ink chamber;

an ink outlet port via which the ink stored in the ink chamber is allowed to flow out of the ink chamber;

an atmosphere communicating channel including an atmosphere open port, the atmosphere communicating channel being located in the casing and communicating the ink chamber with an outside of the casing via the atmosphere open port; and a labyrinth channel forming a part of the atmosphere communicating channel, wherein the ink inlet port is independent of the ink outlet port and is located above the ink outlet port in the up-down direction, wherein the labyrinth channel includes at least three channels extending in an up-down direction, the at least three channels forming at least two U-turn channels in the up-down direction, and wherein the labyrinth channel overlaps a portion of the atmosphere communicating channel different from the labyrinth channel when viewed in a horizontal direction orthogonal to the up-down direction and a front-rear direction.

14. The tank according to claim 13, wherein the entire labyrinth channel overlaps the portion of the atmosphere communicating channel different from the labyrinth channel when viewed in the horizontal direction.

* * * * *